(12) United States Patent
Visser et al.

(10) Patent No.: US 9,495,591 B2
(45) Date of Patent: Nov. 15, 2016

(54) OBJECT RECOGNITION USING MULTI-MODAL MATCHING SCHEME

(71) Applicant: QUALCOMM Incorporated, San Diego, CA (US)

(72) Inventors: Erik Visser, San Diego, CA (US); Haiyin Wang, San Diego, CA (US); Hasib A. Siddiqui, San Diego, CA (US); Lae-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 702 days.

(21) Appl. No.: 13/664,295

(22) Filed: Oct. 30, 2012

(65) Prior Publication Data

US 2013/0272548 A1 Oct. 17, 2013

Related U.S. Application Data

(60) Provisional application No. 61/623,910, filed on Apr. 13, 2012.

(51) Int. Cl.
*H04R 3/00* (2006.01)
*G06K 9/00* (2006.01)
(Continued)

(52) U.S. Cl.
CPC .............. *G06K 9/00624* (2013.01); *G06K 9/00* (2013.01); *G06K 9/3233* (2013.01);
(Continued)

(58) Field of Classification Search
CPC ..................... G06K 9/00771; G06K 9/00624; G06K 9/00355; G06K 9/0063; G06K 9/00; G06K 9/3233; G06K 9/4671; G06K 9/6293

USPC .......... 382/103, 348, 61, 170, 226; 381/122, 381/56, 306, 388
See application file for complete search history.

(56) References Cited

U.S. PATENT DOCUMENTS 8,391,615 B2 * 3/2013 Wu ..................... G06K 9/00664
382/190
8,548,193 B2 * 10/2013 Saund ................... G06T 7/0028
348/169

(Continued)

FOREIGN PATENT DOCUMENTS

EP 1643769 A1 4/2006

OTHER PUBLICATIONS

Aryananda, L., "Attending to Learn and Learning to Attend for a Social Robot", Humanoid Robots, 2006 6th IEEE-RAS International Conference on, IEEE, PI, Dec. 1, 2006, pp. 618-623, XP031053086, ISBN: 978-1-4244-0199-4 p. 68; figure 4.1.

(Continued)

*Primary Examiner* — Disler Paul
(74) *Attorney, Agent, or Firm* — Austin Rapp & Hardman

(57) ABSTRACT

Methods, systems and articles of manufacture for recognizing and locating one or more objects in a scene are disclosed. An image and/or video of the scene are captured. Using audio recorded at the scene, an object search of the captured scene is narrowed down. For example, the direction of arrival (DOA) of a sound can be determined and used to limit the search area in a captured image/video. In another example, keypoint signatures may be selected based on types of sounds identified in the recorded audio. A keypoint signature corresponds to a particular object that the system is configured to recognize. Objects in the scene may then be recognized using a shift invariant feature transform (SIFT) analysis comparing keypoints identified in the captured scene to the selected keypoint signatures.

40 Claims, 35 Drawing Sheets

(51) Int. Cl.
G06K 9/62 (2006.01)
G06K 9/32 (2006.01)
G06K 9/46 (2006.01)
H04S 7/00 (2006.01)
G06T 7/20 (2006.01)

(52) U.S. Cl.
CPC ......... *G06K 9/4671* (2013.01); *G06K 9/6293* (2013.01); *G06T 7/20* (2013.01); *H04R 3/00* (2013.01); *H04R 3/005* (2013.01); *H04S 7/30* (2013.01); *G06K 9/0063* (2013.01); *H04S 2400/11* (2013.01); *H04S 2400/15* (2013.01)

(56) References Cited

U.S. PATENT DOCUMENTS

| | | | |
|---|---|---|---|
| 8,964,994 | B2 | 2/2015 | Jaillet et al. |
| 2003/0103647 | A1* | 6/2003 | Rui .................... G06K 9/00234 382/103 |
| 2004/0120554 | A1 | 6/2004 | Lin et al. |
| 2011/0075851 | A1* | 3/2011 | LeBoeuf et al. ................. 381/56 |
| 2011/0081082 | A1* | 4/2011 | Jiang et al. .................... 382/170 |
| 2011/0300929 | A1* | 12/2011 | Tardif .................... A63F 13/06 463/30 |
| 2013/0094696 | A1* | 4/2013 | Zhang ........................... 382/103 |

OTHER PUBLICATIONS

Aryananda, L., et al., "A Few Days of a Robots Life in the Human's World: Toward Incremental Individual Recognition", PhD Thesis, Apr. 3, 2007, XP055060888, Retrieved from the Internet: URL:http://dspace.mit.edu/handle/1721.1/37144 [retrieved on Apr. 24, 2013] sect. II; figure 1.

Chen M Y et al., "Long Term Activity Analysis in Surveillance Video Archives", CMU phD Thesis, Sep. 12, 2010, XP055067853, Retrieved from the Internet: URL:http://www.lti.cs.cmu.edu/research/thesis/2010/mingyu_chen.pdf.

Chen M Y et al., "MoSiFT: Recognizing Human Actions in Surveillance Videos", CMU-CS Report, Sep. 24, 2009, XP055067839.

Ekvall, S., et al., "Integrating Active Mobile Robot Object Recognition and SLAM in Natural Environments", Intelligent Robots and Systems, 2006 IEEE/RSJ International Conference on, IEEE, PI, Oct. 1, 2006, pp. 5792-5797, XP031006097, ISBN: 978-1-4244-0258-8 sect III, III.B, IV, V.B.

Fransen B., et al., "Using Vision, Acoustics, and Natural Language for disambiguation", Human-Robot Interaction (HRI), 2007 2nd ACM/IEEE International Conference on, IEEE, Mar. 9, 2007, pp. 73-80, XP032211851.

Friedland G., et al., "Visual Speaker Localization aided by Acoustic Models", Proceedings of the Seventeen ACM International Conference on Multimedia, MM '09, Jan. 1, 2009, p. 195, XP055060737.

Inoue N. et al., "High-Level Feature Extraction Using SIFT GMMS and Audio Models", Pattern Recognition on, IEEE, Piscataway, NJ, USA, Aug. 23, 2010, pp. 3220-3223, XP031772106.

International Search Report and Written Opinion—PCT/US2013/029558—ISA-EPO—Jul. 1, 2013.

Khoury E, "Unsupervised Video Indexing based on Audiovisual Characterization of Persons", These Doctorat Uni Toulouse, Jun. 3, 2010, XP55067931, Retrieved from the Internet: URL:http://thesesups.ups-tlse.fr/1025/1/E1-Khoury_Elie.pdf.

Lo., D., et al., "Multimodal talker localization in video conferencing environments", Haptic, Audio and Visual Environments and Their Applications, 2004. HA VE 2004. Proceedings. The 3rd IEEE International Workshop on Ottawa, Ont., Canada Oct. 2-3, 2004, Piscataway, NJ, USA,IEEE, USA, Oct. 2, 2004, pp. 195-200, XP010765318, DOI: 10.1109/HAVE.2004.1391905 ISBN: 978-0-7803-8817-8 sect. III; figures 1-4.

Partial International Search Report—PCT/US2013/029558—ISA/EPO May 15, 2013.

Strobel, N., et al., "Joint Audio-Video Object Localization and Tracking", IEEE Signal Processing Magazine, IEEE Service Center, Piscataway, NJ, US, Jan. 1, 2001, pp. 22-31, XP002358730, ISSN: 1053-5888, DOI: 10.1109/79.911196 sect. Object Localization; p. 24.

Talantzis F et al., "Audio Visual Active Speaker Tracking in Cluttered Indoors Environments", IEEE Transactions on Systems, Man and Cybernetics. Part B: Cybernetics, IEEE Service Center, Piscataway, NJ, US, vol. 38, No. 3, Jun. 1, 2008, pp. 799-807, XP011344943.

Vermaak, J., et al., "Sequential Monte Carlo fusion of sound and vision for speaker tracking", Proceedings of the Eight IEEE International Conference on Computer Vision. (ICCV). Vancouver, British Columbia, Canada, July 7-14, 2001; [International Conference on Computer Vision], Los Alamitos, CA: IEEE Comp. soc, us, vol. 1, Jul. 7, 2001, pp. 741-746, XP010554056, DOI: 10.1109/ICCV.2001.937600 ISBN: 978-0-7695-1143-6 abstract.

* cited by examiner

FIG. 8 — *Exemplary Image Processing Stage — Gaussian Scale Space Generation*

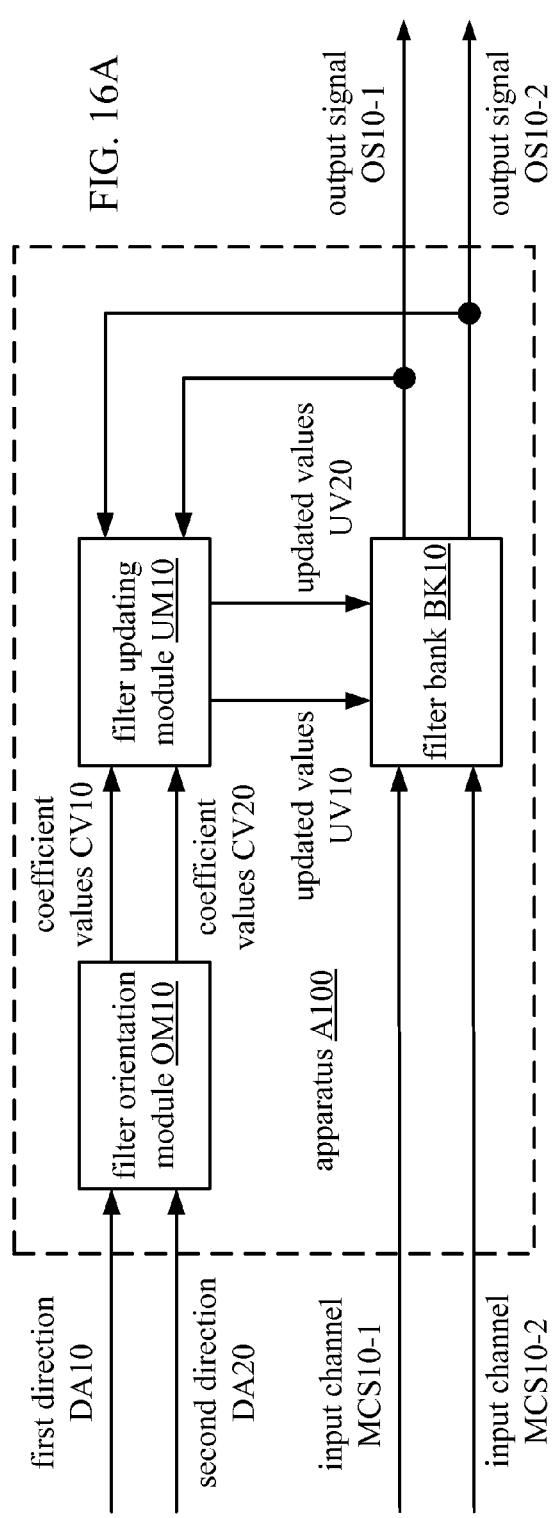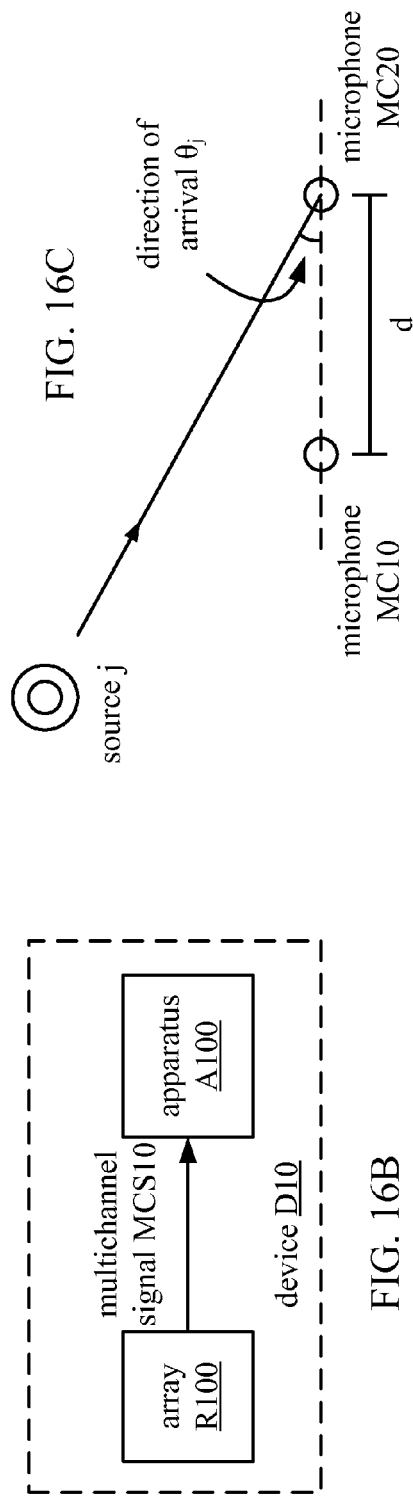

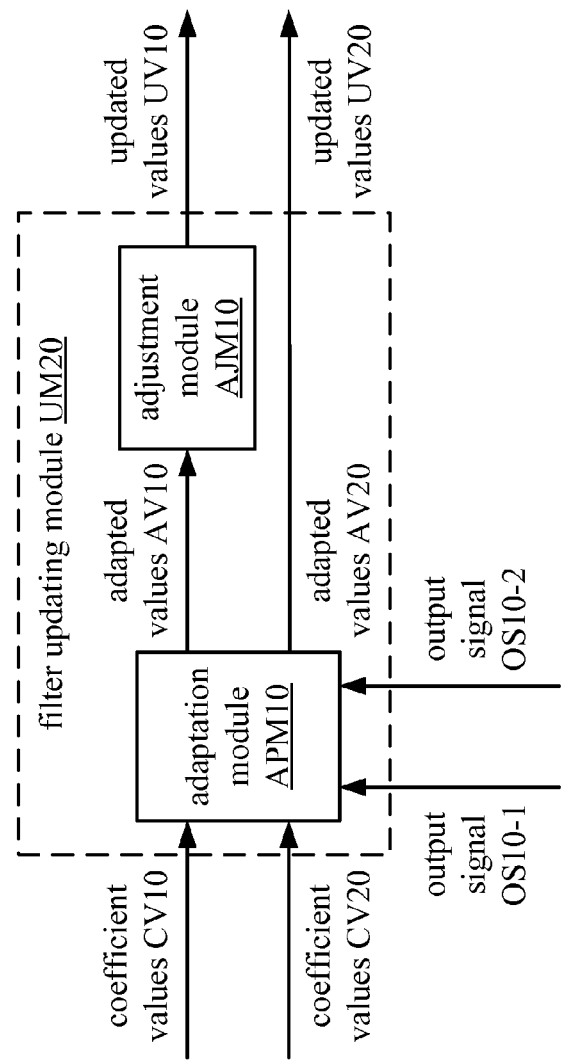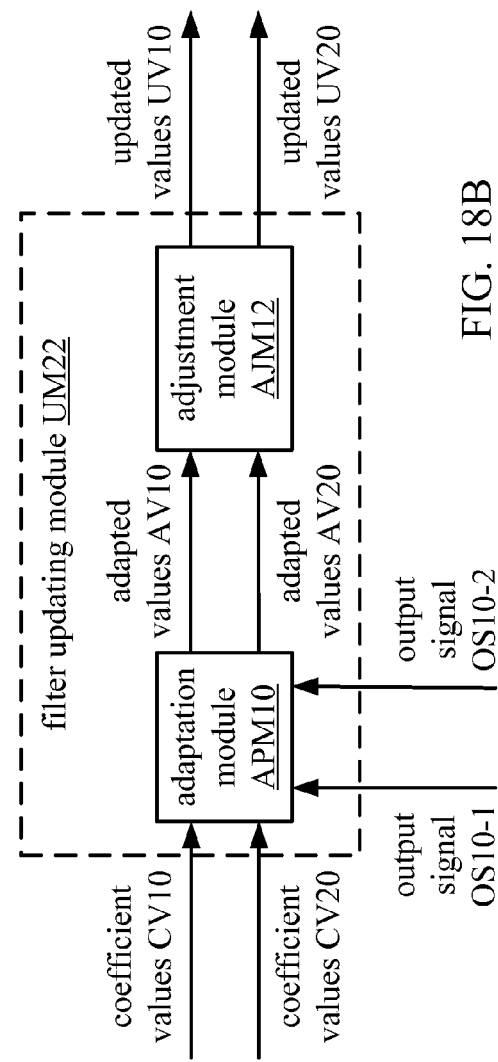

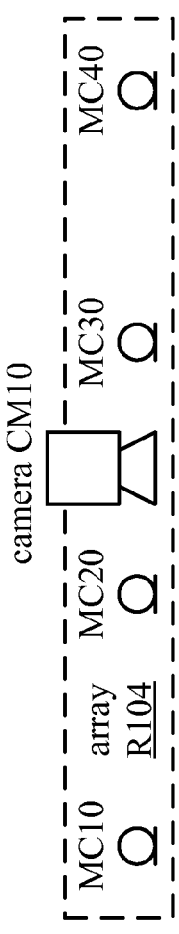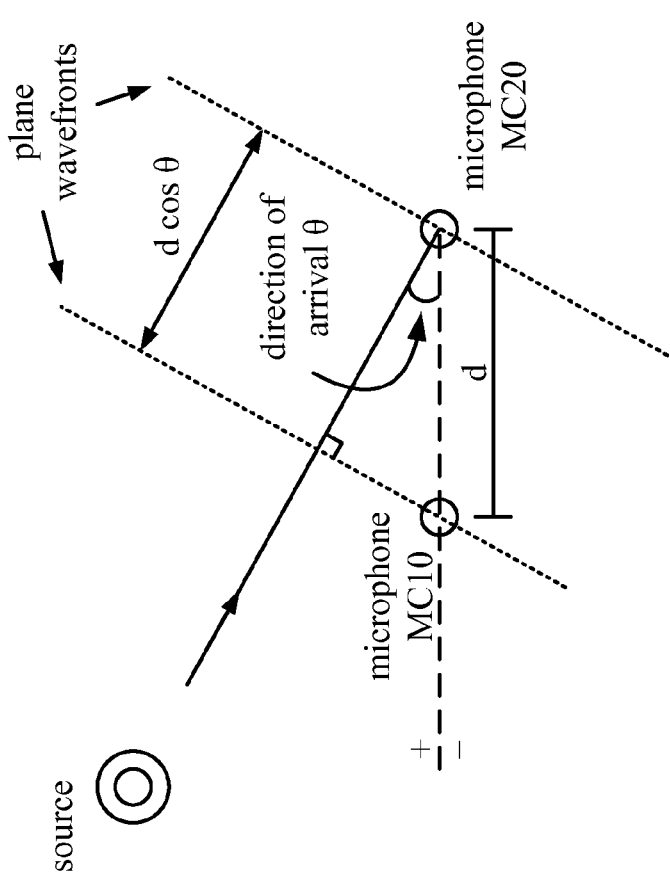

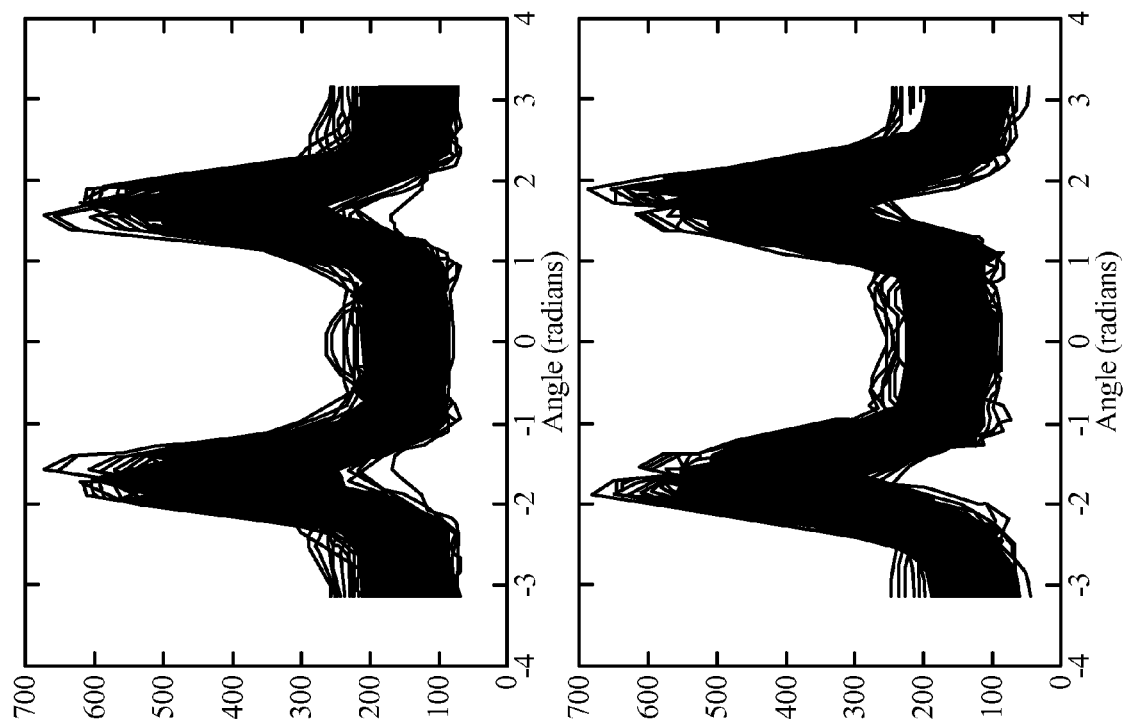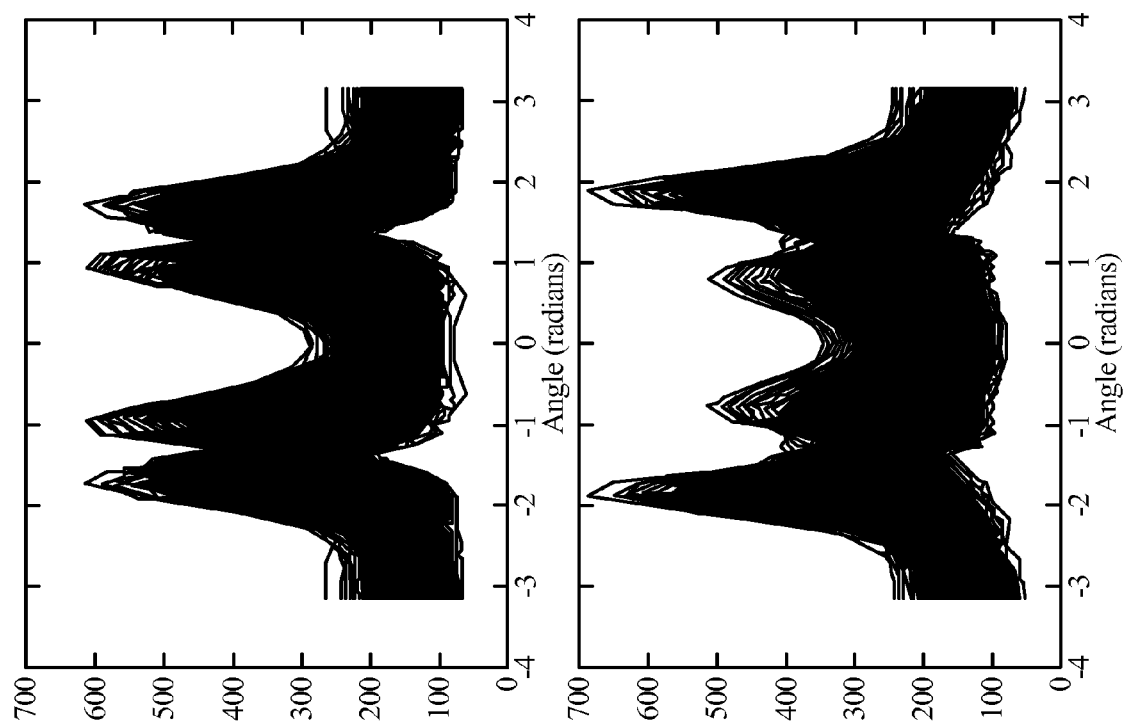
FIG. 22

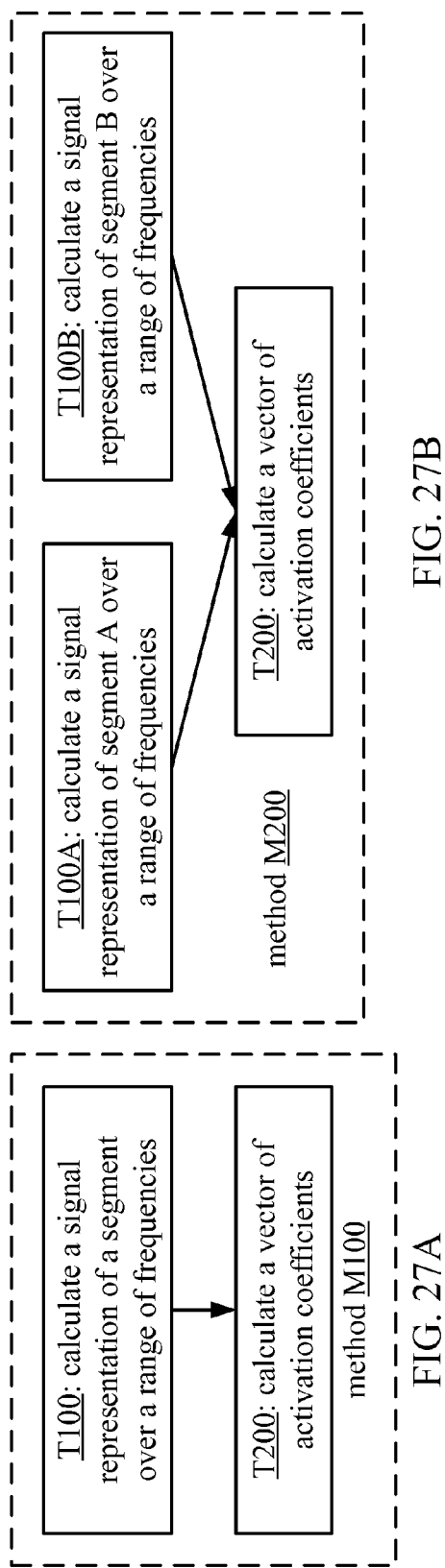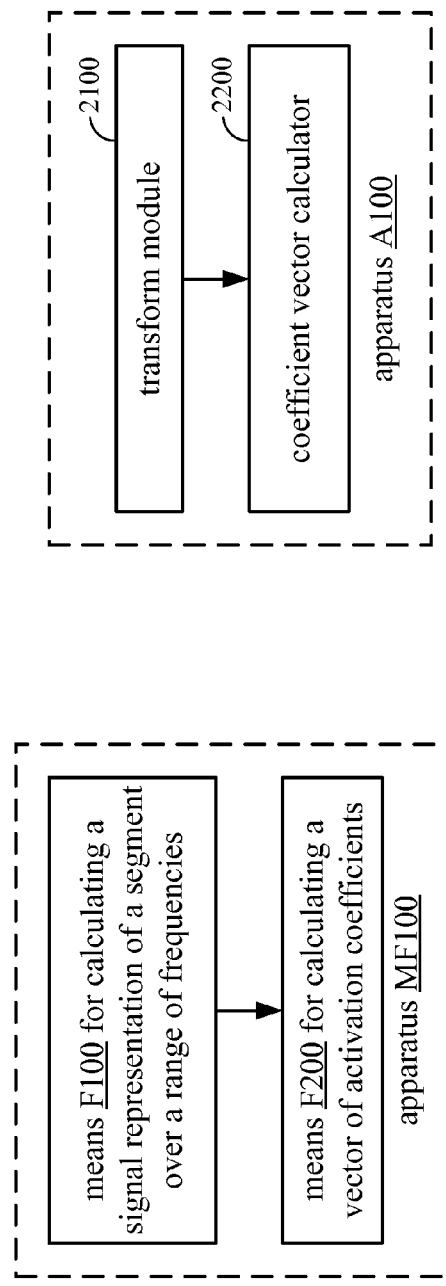

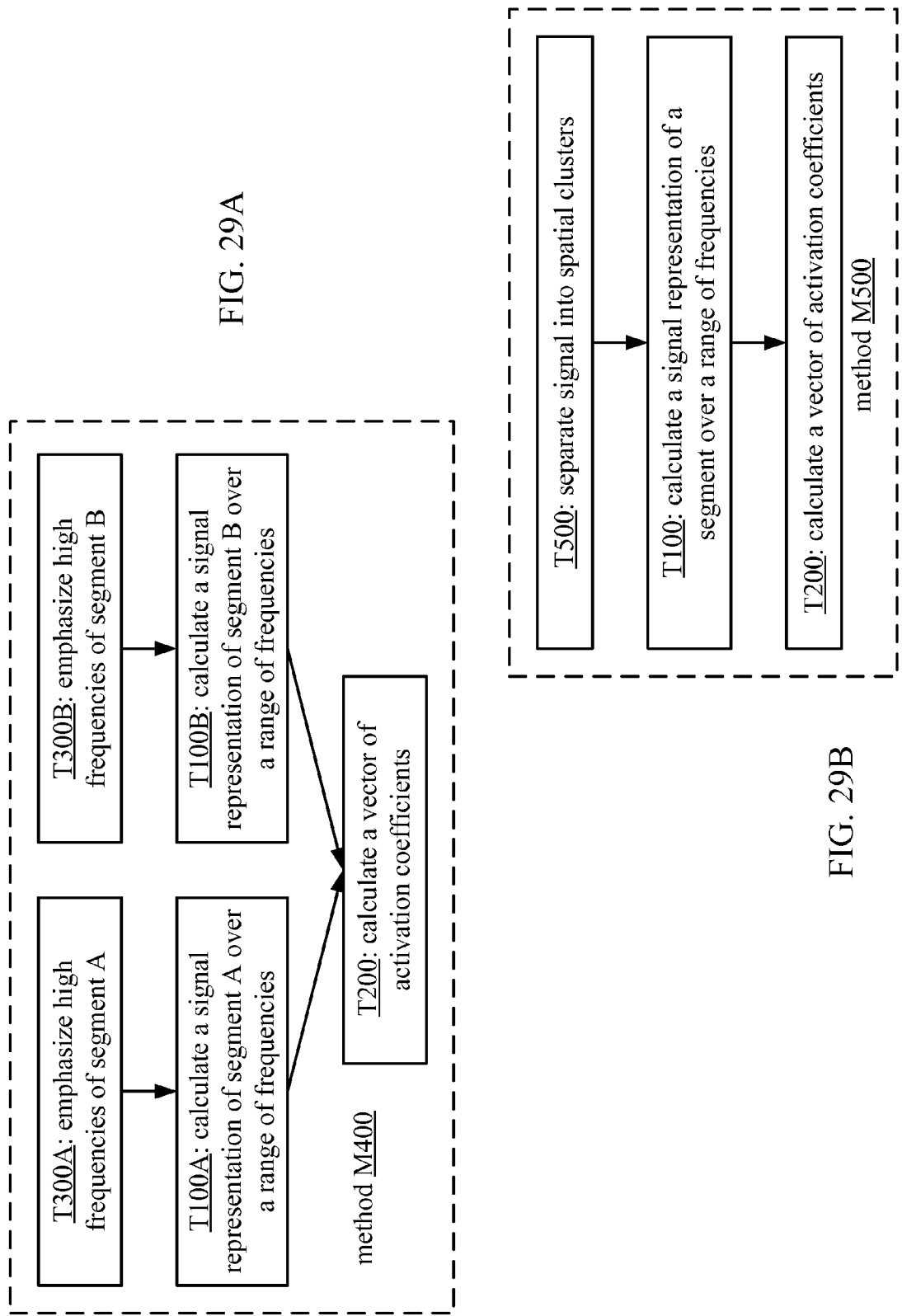

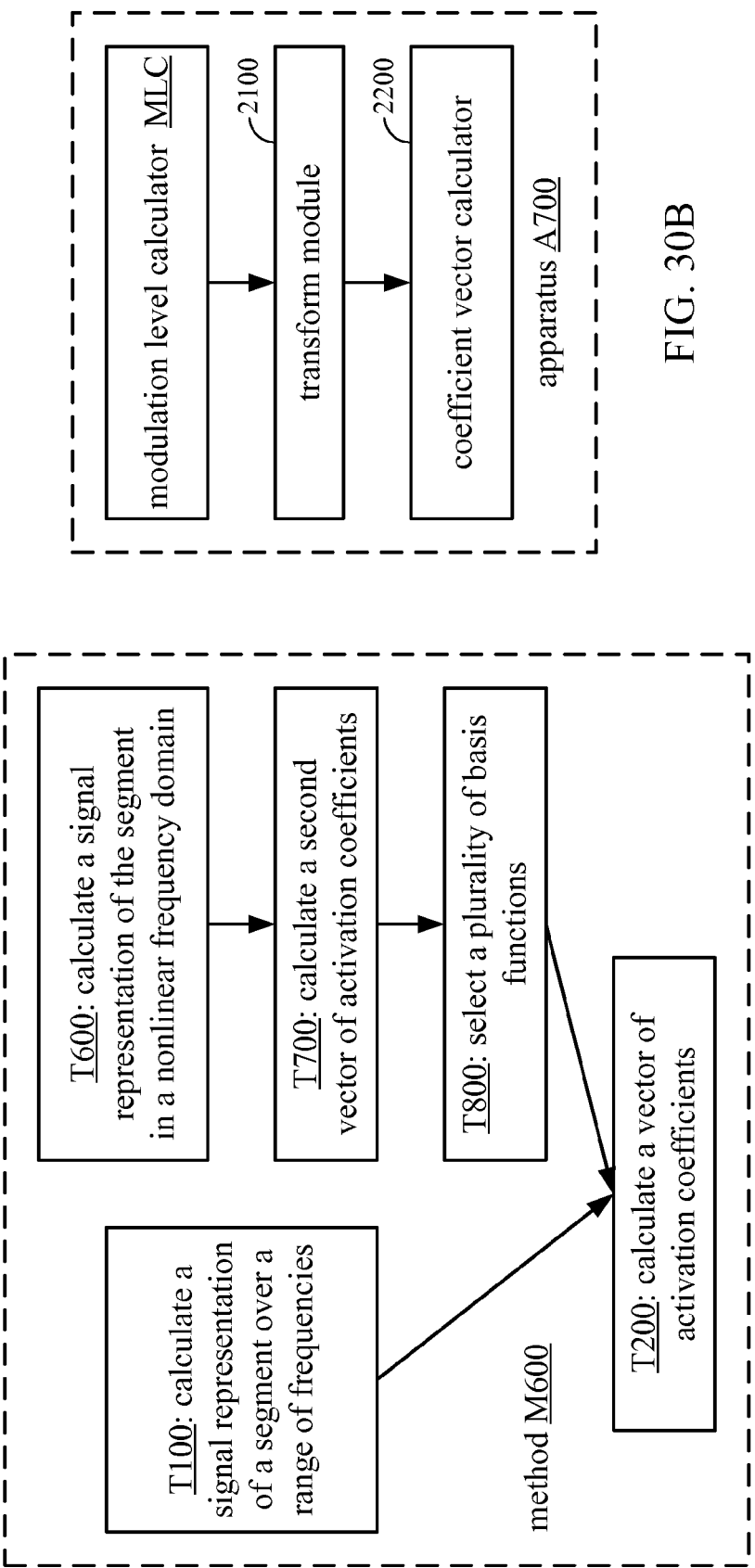

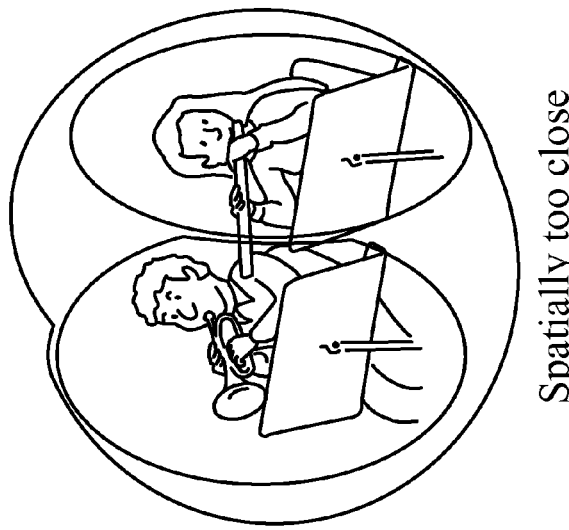
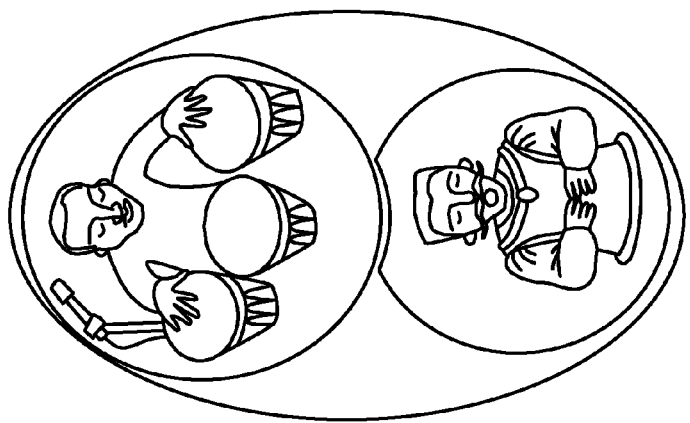
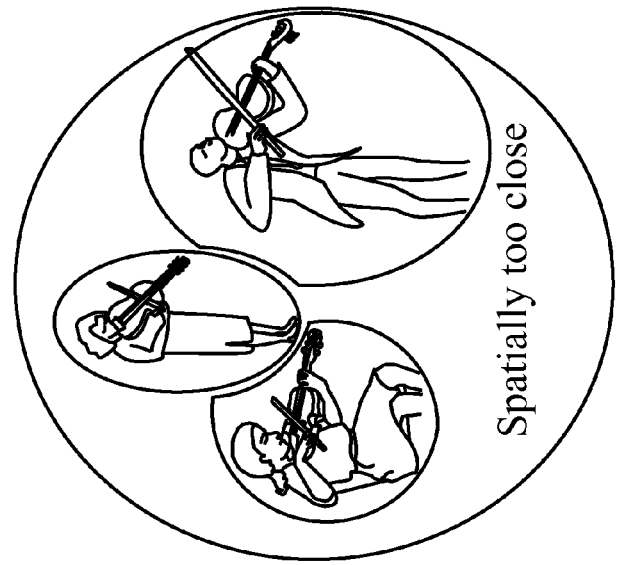
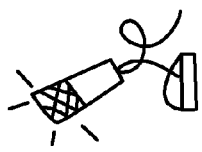
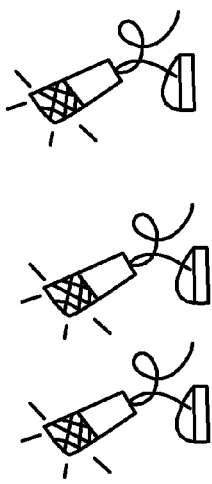
FIG. 34

OBJECT RECOGNITION USING MULTI-MODAL MATCHING SCHEME

CLAIM OF PRIORITY UNDER 35 U.S.C. §119

The present Application for Patent claims priority to U.S. Provisional Application No. 61/623,910, filed Apr. 13, 2012, assigned to the assignee hereof and hereby expressly incorporated by reference herein.

BACKGROUND

1. Field

The present disclosure relates generally to object recognition apparatuses and methods.

2. Background

Various applications may benefit from having a machine or processor that is capable of identifying objects in a visual scene. The field of computer vision attempts to provide techniques and/or algorithms that permit identifying objects or features in a scene, where an object or feature may be characterized by descriptors identifying one or more keypoints. These techniques, such as SIFT (Scale Invariant Feature Transform), are often also applied to object recognition, object detection, image matching, 3-dimensional structure construction, stereo correspondence, and/or motion tracking, face recognition, among other applications.

Most object recognition techniques rely only on visual information, e.g., video, image or picture, captured from the scene.

SUMMARY

This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Improved techniques for recognizing and locating one or more objects in a scene are disclosed. These techniques incorporate the use of audio as well as visual information recorded at the scene to aid in recognizing objects in the scene. According to an aspect of these techniques, an apparatus includes a keypoint selector configured to select keypoints corresponding to an object in a scene based on audio recorded at the scene, and a keypoint matching device configured to identify the object based on the selected keypoints.

According to a further aspect, a method of recognizing an object in a scene includes selecting keypoints corresponding to the object based on audio recorded at the scene, and identifying the object based on the selected keypoints.

According to a further aspect, a computer-readable medium embodying a set of instructions executable by one or more processors is provided. The medium stores programming code for selecting keypoints corresponding to an object in a scene based on audio recorded at the scene, and programming code for identifying the object based on the selected keypoints.

Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the techniques and devices described herein. In the figures, like reference numerals designate corresponding parts throughout the different views.

FIG. 16A shows a block diagram of an apparatus A100 according to a general configuration.

FIG. 16B shows a block diagram of a device D10 that includes a microphone array R100 and an instance of apparatus A100.

FIG. 16C illustrates a direction of arrival $\theta_j$, relative to an axis of microphones MC10 and MC20 of array R100, of a signal component received from a point source j.

FIG. 18A shows a block diagram of an implementation UM20 of filter updating module UM10.

FIG. 18B shows a block diagram of an implementation UM22 of filter updating module UM20.

FIG. 19A shows a top view of one example of an arrangement of a four-microphone implementation R104 of array R100 with a camera CM10.

FIG. 19B shows a far-field model for estimation of direction of arrival.

FIG. 22 shows examples of histograms resulting from using SRP-PHAT for DOA estimation.

FIG. 27A shows a flowchart of a method M100 according to a general configuration.

FIG. 27B shows a flowchart of an implementation M200 of method M100.

FIG. 27C shows a block diagram for an apparatus MF100 for decomposing an audio signal according to a general configuration.

FIG. 27D shows a block diagram for an apparatus A100 for decomposing an audio signal according to another general configuration.

FIG. 29A shows a flowchart of an implementation M400 of method M200.

FIG. 29B shows a flowchart of an implementation M500 of method M200.

FIG. 30A shows a flowchart for an implementation M600 of method M100

FIG. 30B shows a block diagram of an implementation A700 of apparatus A100.

FIG. 34 illustrates a scenario in which multiple sound sources are active.

DETAILED DESCRIPTION

Figure 1:
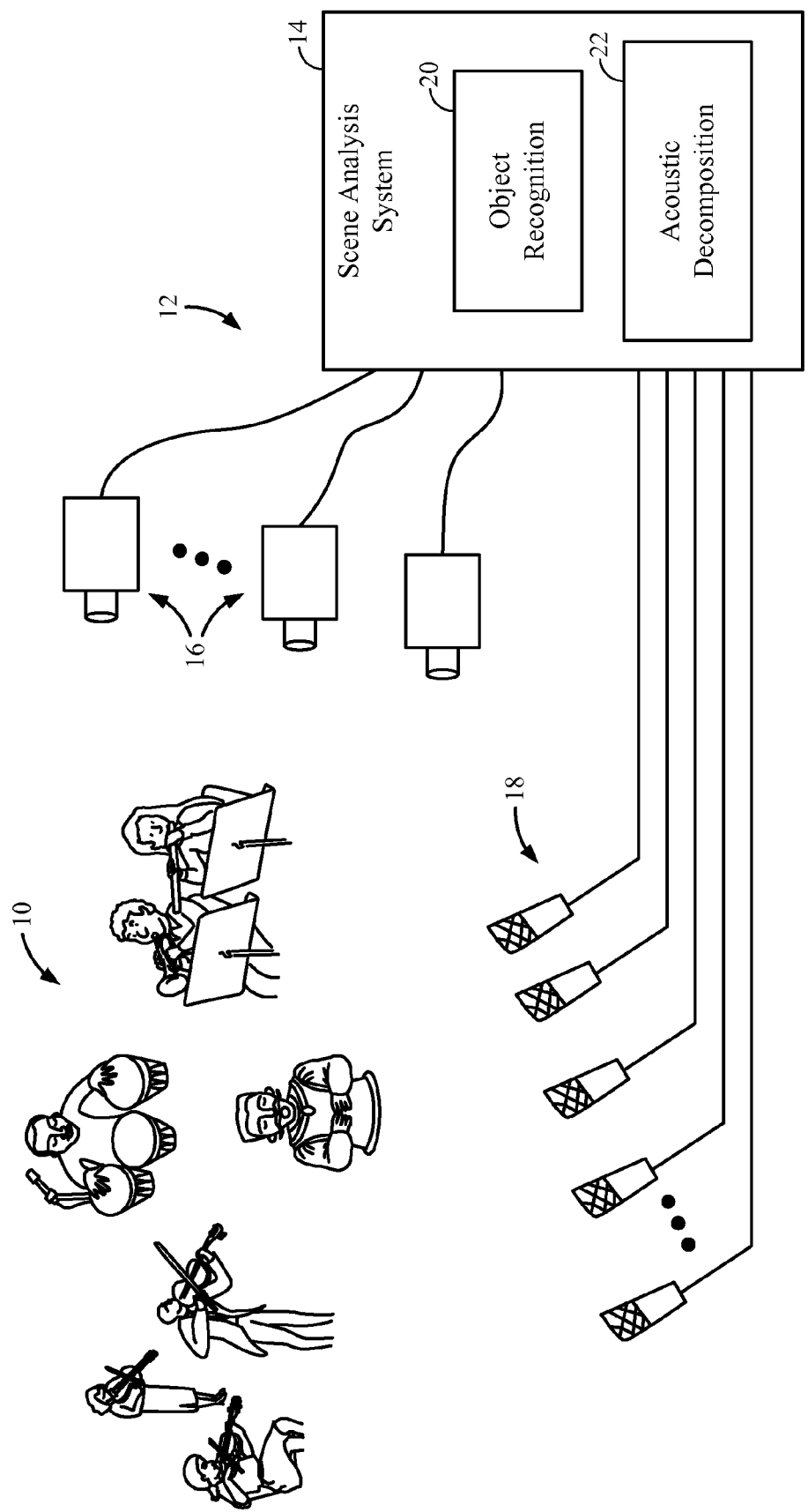
FIG. 1 is a conceptual diagram illustrating an exemplary auditory scene and audio-visual scene analysis system.

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features. Unless expressly limited by its context, the term "signal" is used herein to indicate any of its ordinary meanings, including a state of a memory location (or set of memory locations) as expressed on a wire, bus, or other transmission medium.

Although the object recognition techniques described herein can be applied to many different scenes, the examples described herein pertain to music scenes where many sound sources, e.g., musicians, performers, instruments and the like are present in a single scene. Certain video games (e.g., Guitar Hero®, Rock Band®) and concert music scenes may involve multiple instruments and vocalists playing at the same time. Current commercial game and music production systems require these scenarios to be played sequentially or with closely positioned microphones to be able to analyze, post-process and up-mix audio recorded from them separately. These constraints may limit the ability to control interference and/or to record spatial effects in the case of music production and may result in a limited user experience in the case of video games.

Music auditory scene decomposition can be greatly simplified if some a priori knowledge or other information is made available that helps narrow down what musical instruments are being played and how many musicians/sound sources are present in the scene.

The object recognition techniques disclosed herein overcome many of the limitations of prior attempts to decompose audio recorded at scenes having multiple sound sources. Generally, object or feature recognition may involve identifying points of interest (also called keypoints) in an image and/or localized features around those keypoints for the purpose of feature identification and/or object recognition. In the systems and methods disclosed herein, certain image-based instrument and audio-based note/instrument recognition techniques are combined. A number of different devices may be capable of performing feature identification and/or object recognition using computer vision. Examples of such devices may be implemented in a telephone handset (e.g., a cellular handset); a handheld mobile device capable of video recording, a person media player to record audio and video content; a personal digital assistant (PDA) or other handheld computing device; and a notebook, a notebook computer, laptop computer, tablet computer, or other portable computing device. In addition, devices capable of performing video games (e.g., Guitar Hero®, Rock Band®) and concert music scenes which may involve multiple instruments and vocalists playing at the same time. The class of portable computing devices currently includes devices having names such as laptop computers, notebook computers, ultra-portable computers, tablet computers, mobile internet devices, smartbooks and smartphones.

In a first method, information based on audio knowledge alone helps define the type of sound source being searched for in a scene and reduces the search universe of keypoint signatures of object shapes that should be considered in an image-based scale invariant feature transform (SIFT) search. In addition, such a keypoint search is not necessarily restricted to still images, but may also involve analysis of surrounding video frames for typical musician motion patterns using single or multiple cameras depending on the need for depth (range) layer search. The keypoint search is integrated via multi-modal Bayesian estimation to yield a recognized instrument with an associated likelihood.

In a second method, the sound source (e.g., instrument) location is estimated from both multi-microphone sound localization information and instrument shape recognition to compute stable instrument keypoints in certain parts of the image. This method may be combined with the first method to improve object recognition.

In a third method, acoustic features, such as mel-frequency cepstral coefficients (MFCCs) as used in speech/audio recognition, along with associated multi-microphone sound source localization information such as that determined using the second method, are used directly in the multi-modal Bayesian estimation to provide sound source recognition. The third method may be combined with the first method to improve object recognition.

The above methods may permit, for example, a more refined definition of the size of the basis function inventory in the case of a sparse recovery decomposition approach to decomposing audio recorded from the scene.

FIG. 1 is a conceptual diagram illustrating an exemplary auditory scene 10 and an exemplary auditory scene analysis system 12. The auditory scene analysis system 12 includes a scene analysis system 14, an array of microphones 18 and one or more cameras 16. The cameras 16 may include one or more still image cameras and/or one or more video cameras arranged at various locations and angles relative to the scene 10.

The scene analysis system 14 includes an object recognition subsystem 20 and an acoustic decomposition subsystem 22. The object recognition subsystem 20 is configured to recognize and locate sound sources in the scene 10 based on audio, image(s) and/or video recorded at the scene, according to the methods described herein. The acoustic decomposition subsystem 22 is configured to decompose the scene into separate sound sources, based on information from the object recognition subsystem 20, so that the separated audio can be individually processed.

Figure 2:
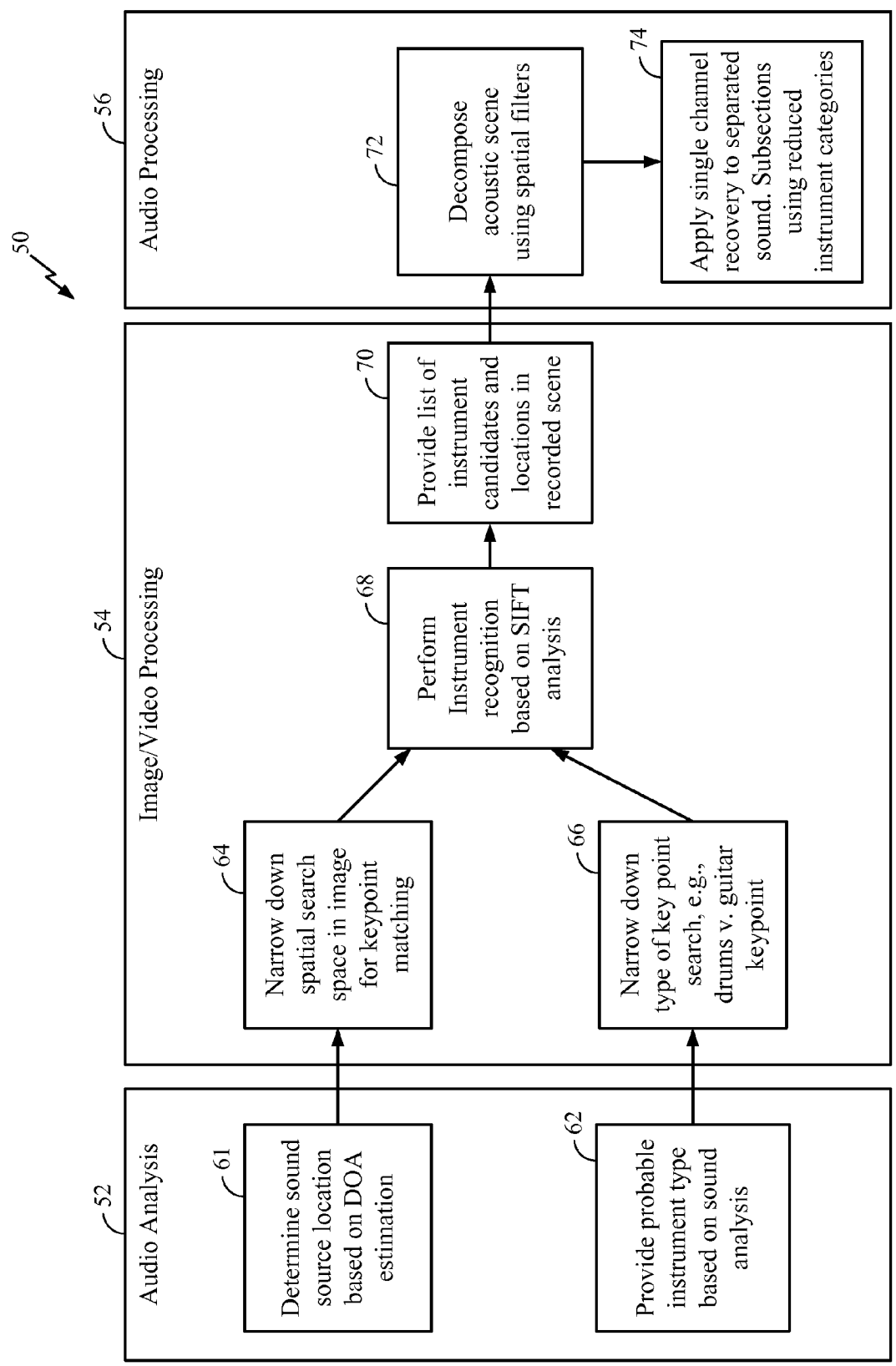
FIG. 2 is a process block diagram depicting a method of operating the audio-visual scene analysis system of FIG. 1

FIG. 2 is a process block diagram 50 depicting an exemplary method of operating the audio-visual scene analysis system 10 of FIG. 1. The process illustrates steps for analyzing audio-visual information recorded at a scene to locate and identify one or more musical instruments in the scene. The method includes an audio analysis block 52, an image and/or video processing block 54 and an audio processing block 56.

The disclosed method may process the captured audio and/or video signals as a series of segments. Typical segment lengths range from about one to ten seconds. In one particular example, the signal is divided into a series of non-overlapping segments or "frames", each having a length of about one second. A segment as processed by such a method may also be a segment (i.e., a "subframe") of a larger segment as processed by a different operation, or vice versa.

The audio analysis block 52 includes the step of determining the sound source location(s) in a scene based on audio information recorded at the scene (box 61). The audio information can be captured by the microphone array 18. The sound locations can be determined based on estimated direction of arrival (DOA) of the sound from a source in the scene and/or range information determined for the source. The DOA of a source can be estimated using the audio DOA estimation techniques described herein below, and the range of a sound source can be estimated using the range finding techniques described herein below with reference to FIGS. 18-29.

The audio analysis block 52 also includes the step of providing a probable type of sound source for each source in the scene (box 62). For example, for musical instruments the sound recorded at the scene can be analyzed using instrument note libraries to match a sound source with a likely type of instrument producing the sound.

The sound source location and type estimates from boxes 61, 62 are passed to the image/video processing block 54 and are used to limit searches for visual identification of the sound sources. In box 64, the estimated location information is used to narrow down the spatial search space in a record image of the scene for keypoint matching. In box 66, the image keypoint search is narrowed down based on the probable instrument type. Both of these steps may significantly improve the reliability of identifying the instrument(s) in the scene and may also reduce the amount of processing needed to carry out the visual recognition of the instrument(s).

In box 68, visual objection recognition analysis is performed on image and/or video data recorded at the scene to identify the instrument(s) in the scene. The analysis can involve a visual feature analysis scheme, e.g., a scale invariant feature transform (SIFT) analysis of the scene, where the keypoints and areas of the image to be analyzed are narrowed down based on the audio-derived information from boxes 61, 62. Details of an exemplary SIFT analysis method are disclosed herein below in reference to FIGS. 7-17.

The results of the visual feature analysis (box 70) are a list of sound source (e.g., instrument) candidates and their corresponding locations in the scene, which are provided to the audio processing block 56.

The audio processing block 56 further analyzes the audio recorded from the scene to decompose the audio so that separate sound sources can be better isolated, identified and processed to enhance the quality of the recorded audio. In box 72, the location information from the image/video processing block 52 is used to generate spatial filters for the multi-microphone array steered toward each of the identified source location subsectors, respectively. This assists in separating the sound sources in the recorded audio data. In box 74, a single-channel basis-function inventory-based sparse recovery technique is applied to each of the separated sound subsectors to improve the identification of the instrument sound source. The signal-channel recovery technique can use a reduced set of instrument category notes to reduce the basis-function inventory, where the reduction is guided by the list of instrument candidates provided by the image/video processing block 54 (box 70). Exemplary sparse recovery techniques that can be used in box 70 are described herein below in connection with FIGS. 30-37.

Figure 3:
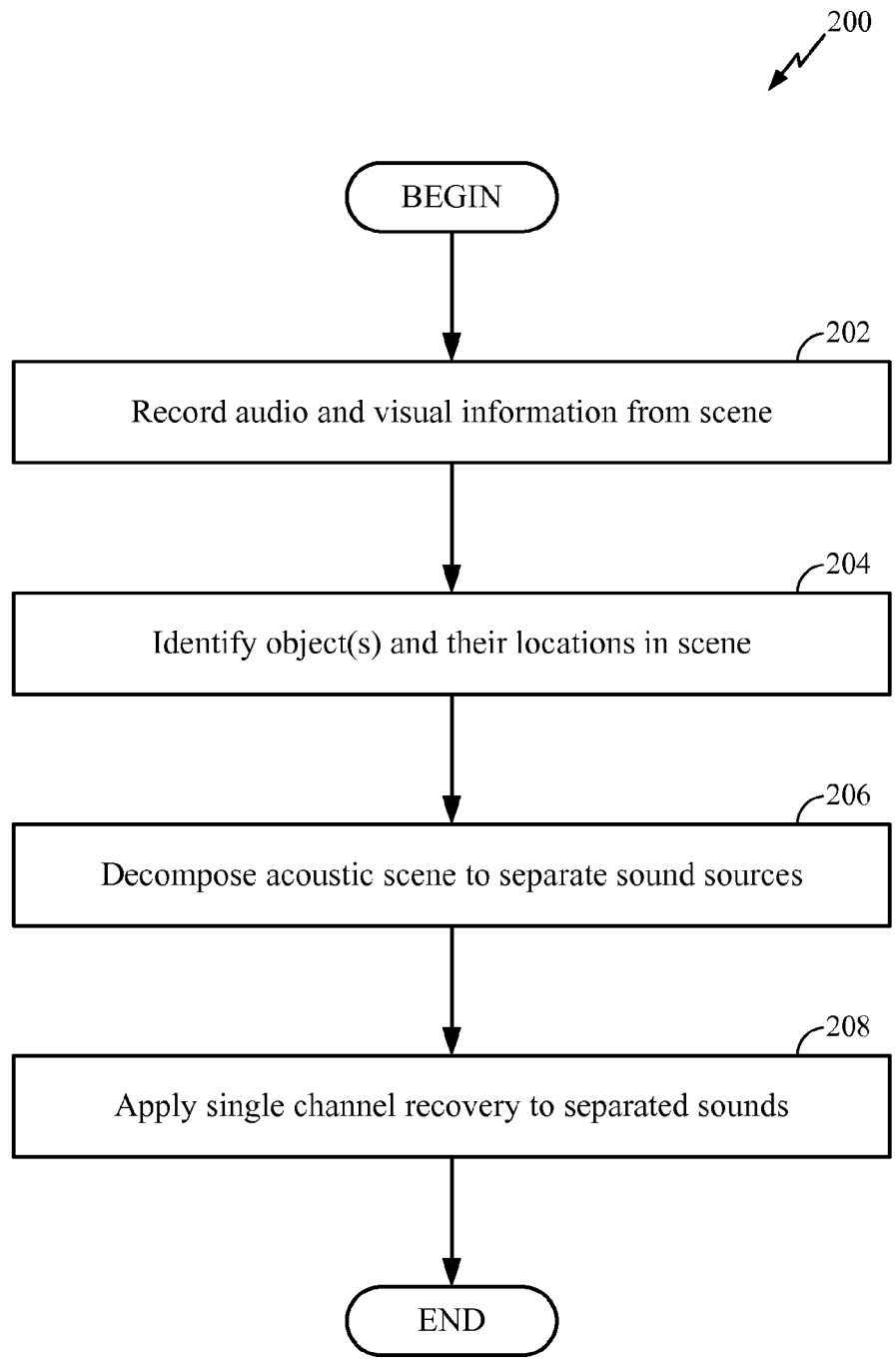
FIG. 3 is a flowchart showing an exemplary method of decomposing and processing an auditory scene using the auditory scene analysis system of FIG. 1.

FIG. 3 is a flowchart 200 showing an exemplary method of decomposing an auditory scene using the auditory scene analysis system 12 of FIG. 1. In step 202, the audio and visual information (still image and/or video) are recorded by the system 12. In step 204, one or more of the sound producing objects in the scene 10 is identified and located by the object recognition subsystem 20. In step 206, the acoustic scene is decomposed into separate the sound sources acoustic decomposition subsystem 22. In step 208, the acoustic decomposition subsystem 22 applies signal-channel basis-function inventory-based sparse recovery to the separated sounds.

Figure 4:
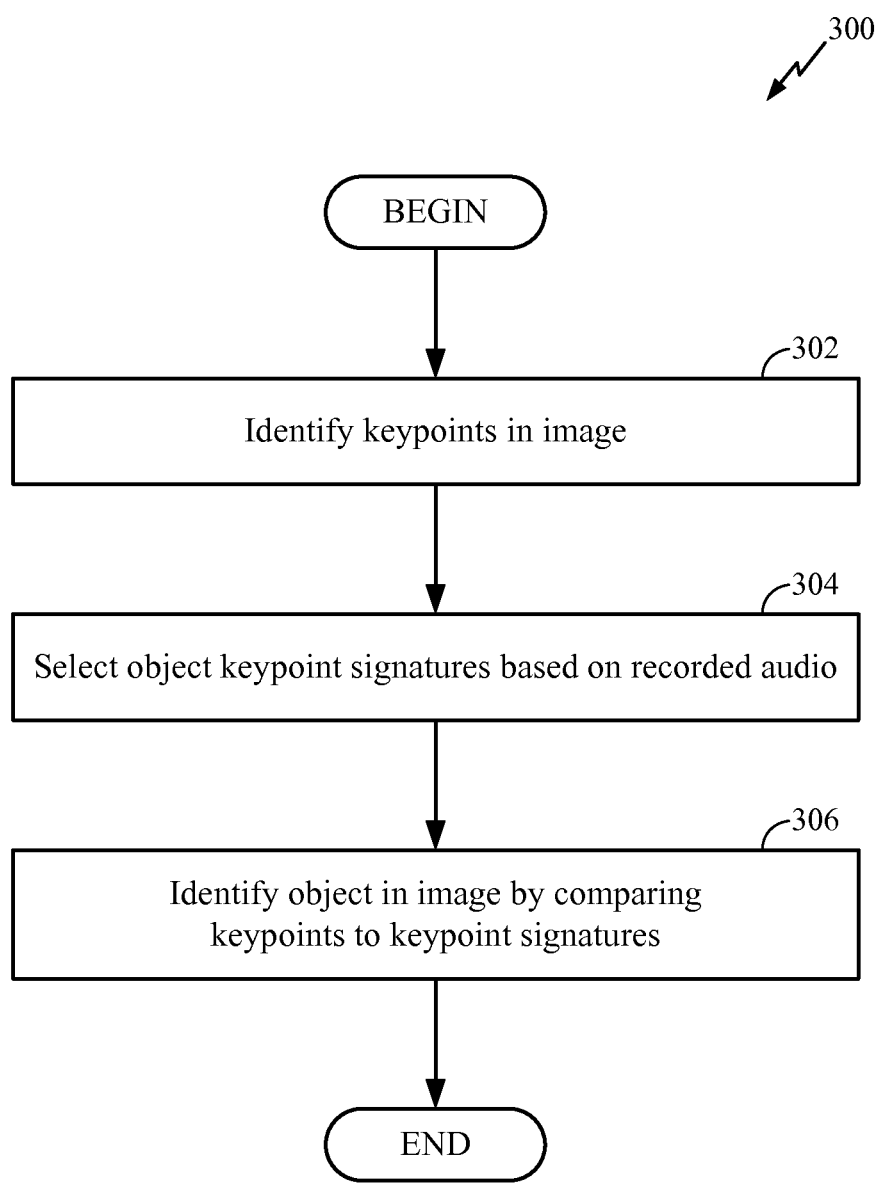
FIG. 4 is a flowchart showing an exemplary method of identifying sound-producing objects in an auditory scene.

FIG. 4 is a flowchart 300 showing a first exemplary method of identifying sound-producing objects in an auditory scene. This method can be performed by the object recognition subsystem 20. In step 302, keypoints in a captured image are identified. In step 304, one or more keypoint signatures corresponding to sound-producing objects, such as musical instruments, are selected based on audio recorded at the scene. In step 306, at least one object in the scene is identified by comparing the keypoints in the image to the selected keypoint signatures.

Figure 5A:
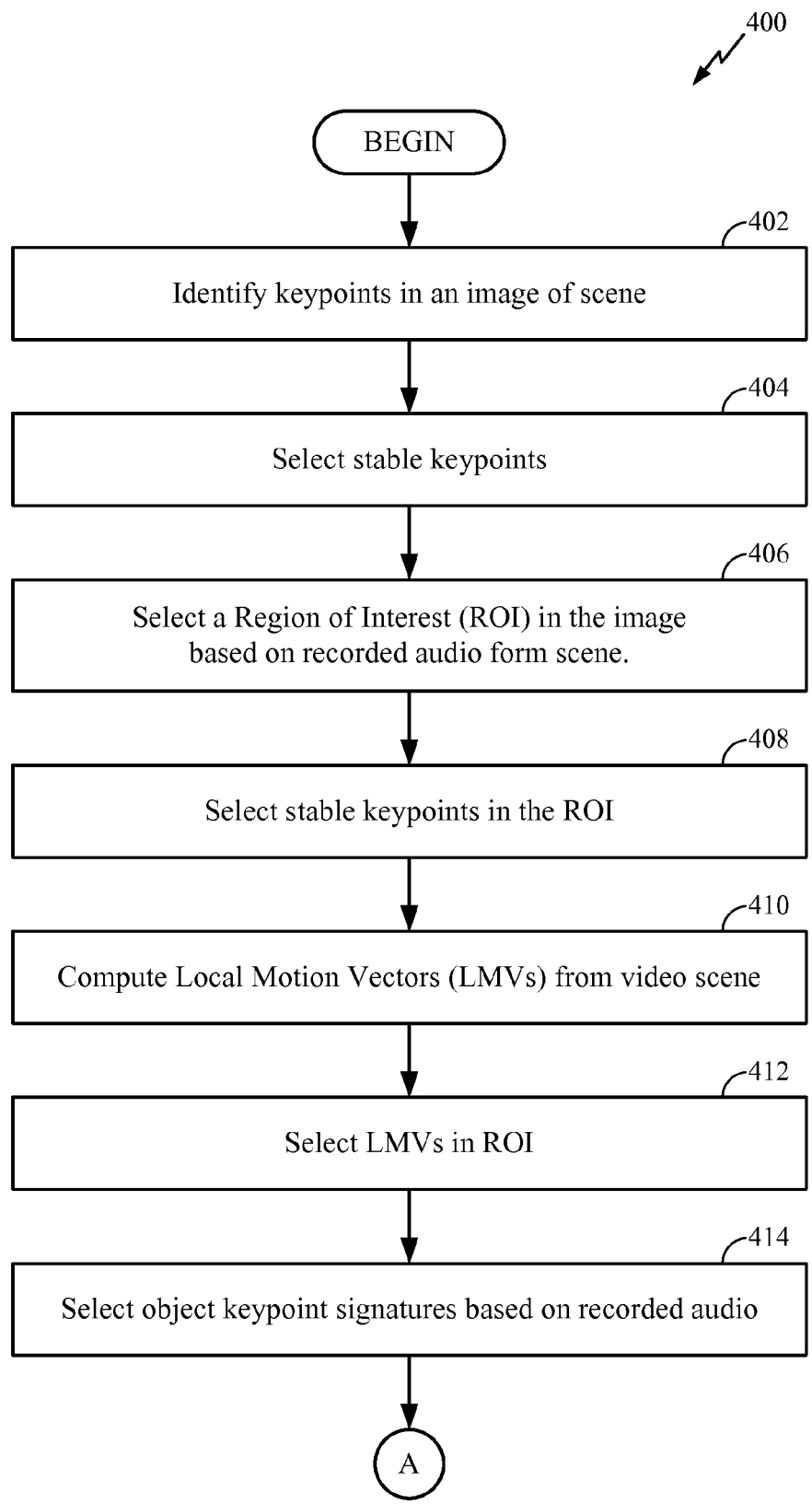
FIGS. 5A-B show a flowchart of a second exemplary method of identifying sound-producing objects in an auditory scene.
Figure 5B:
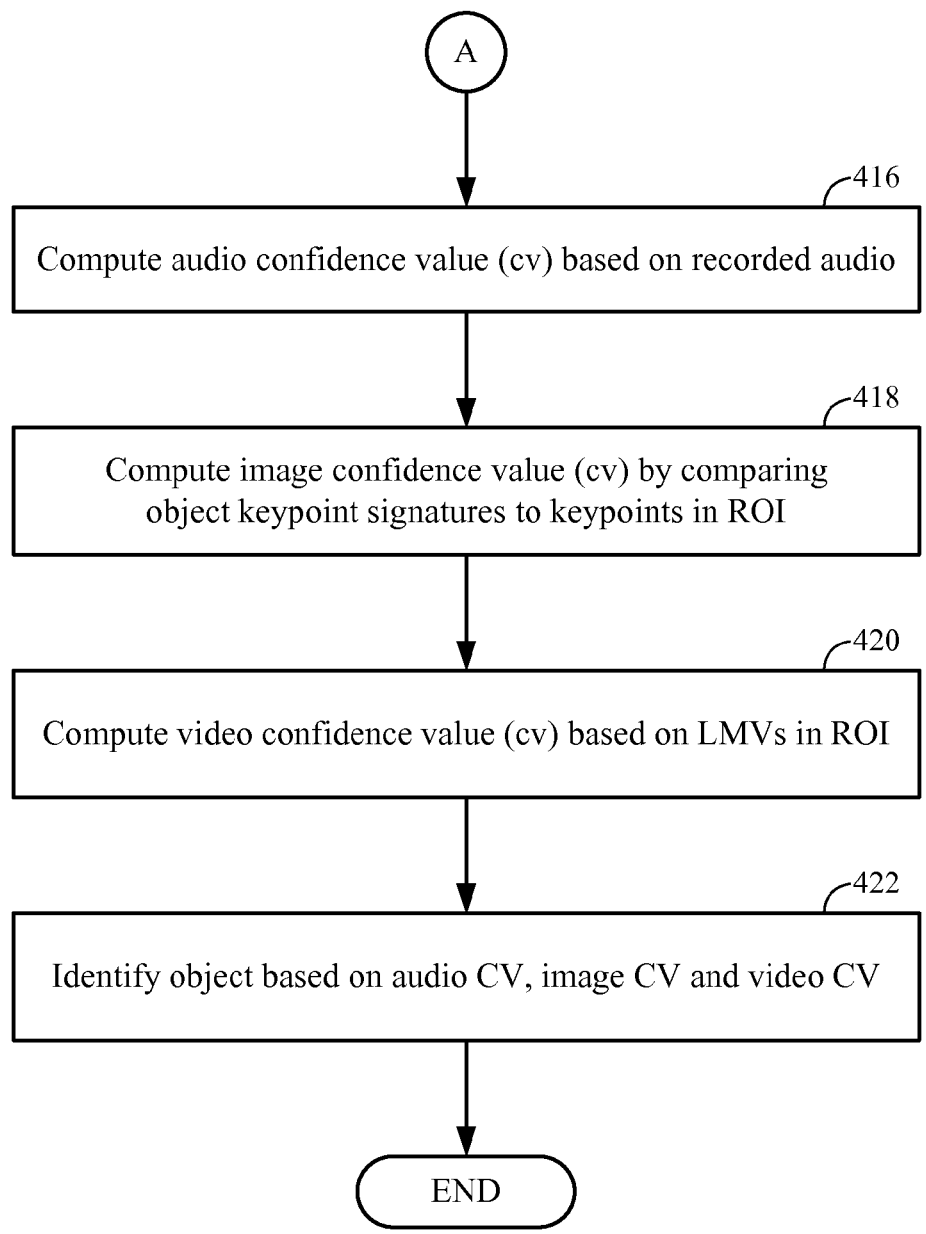

FIGS. 5A-B show a flowchart 400 of a second exemplary method of identifying sound-producing objects in an auditory scene. This method can be performed by the object recognition subsystem 20. In step 402, keypoints in a captured image are identified. In step 404, stable keypoints are selected from the identified keypoints. In step 406, a region of interest (ROI) in the image of the scene is selected, based on audio recorded from the scene. In step 408, stable keypoints in the ROI are selected.

In step 410, local motion vectors (LMVs) are computed from a video of the scene. In step 412, LMVs in the ROI are selected.

In step 414, one or more keypoint signatures corresponding to sound-producing objects, such as musical instruments, are selected based on audio recorded at the scene.

In step 416, an audio confidence value (CV) is computed based on the recorded audio from the scene. The audio CV can be based on the output of an audio feature matching device, for example, a MFCC classifier. The audio CV can be a vector, where each element of the vector indicates the likelihood that the object is a particular type of object, e.g., a trumpet, piano, etc.

In step 418, an image confidence value (CV) is computed based on the captured digital image of the scene. The image CV can be based on the output of a matching device, for example, a SIFT matching device. The SIFT matching device compares the stable keypoints in the ROI to the selected keypoint signatures to produce the image CV. The image CV can be a vector, where each element of the vector indicates the likelihood that the object is a particular type of object, e.g., a trumpet, piano, etc.

In step 420, a video confidence value (CV) is computed based on the recorded video from the scene. The video CV can be based on the output of a histogram matching process that compares the LMVs selected in the ROI. The video CV can be a vector, where each element of the vector indicates the likelihood that the object is a particular type of object, e.g., a trumpet, piano, etc.

The audio, image and video CVs can each be normalized.

In step 422, the object in the scene is identified based on the audio, image and video CVs. For example, a final CV may be calculated as a weighted sum of audio, image and video CVs. The weighting coefficient for each CV can be based on the signal-to-noise ratio (SNR) for the respective recording modality, and can in particular be a function of the SNR of the current recording frame.

In the case where the modality CVs are vectors, the final CV is also a vector where each element of the vector indicates the likelihood that the object is a particular type of object, e.g., a trumpet, piano, etc. The element indicating the largest likelihood identifies the object.

Figure 6:
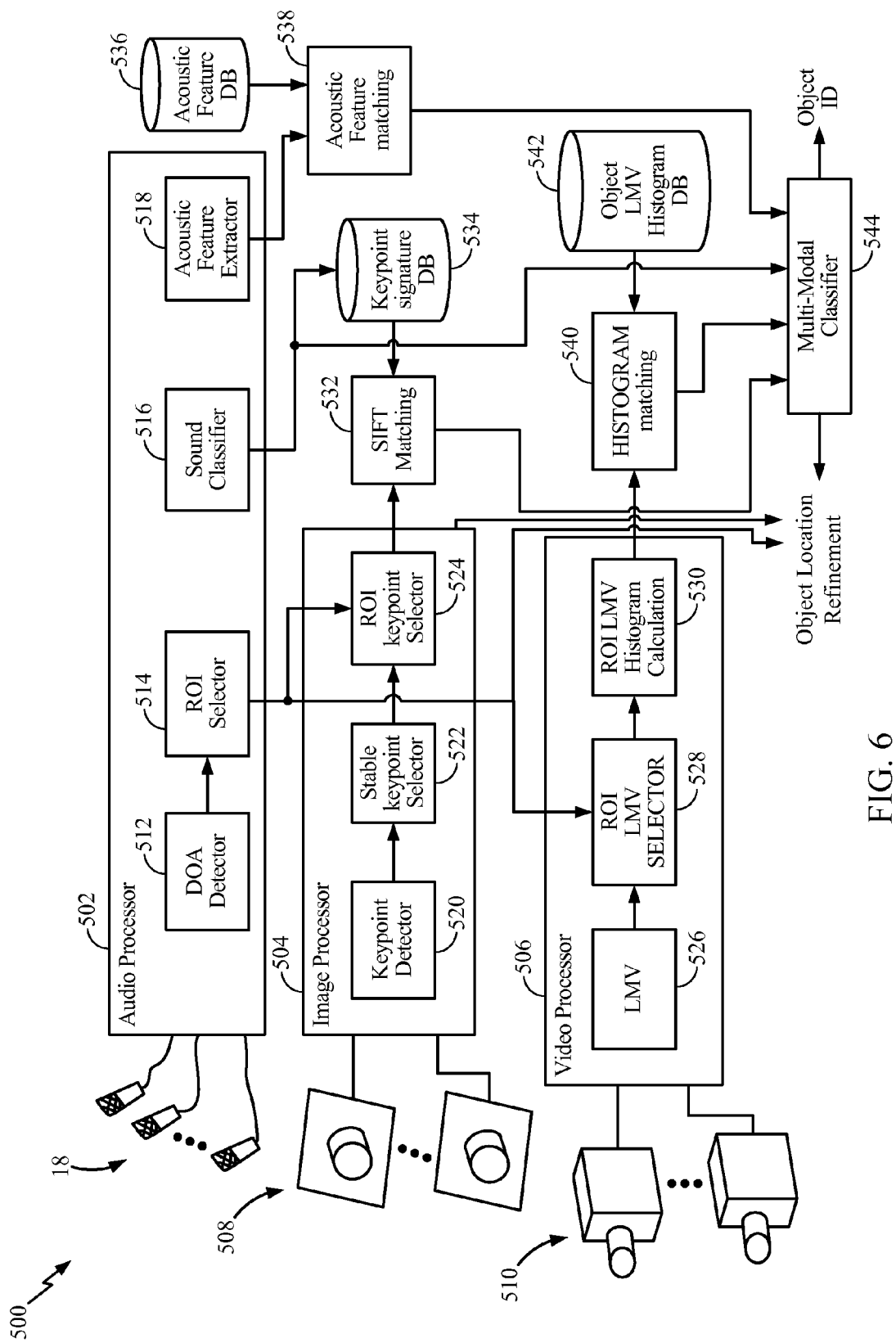
FIG. 6 is a block diagram an illustrating certain components of an exemplary object recognition subsystem that can be used with the auditory scene analysis system of FIG. 1.

FIG. 6 is a block diagram an illustrating certain components of an exemplary object recognition subsystem 500 that can be used with the auditory scene analysis system 12 of FIG. 1. The subsystem 500 includes an audio processor 502, image processor 504, video processor 506, SIFT matching device 532, keypoint signature database (DB) 534, acoustic feature database 536, acoustic feature matching device 538, histogram matching device 540, object local motion vector (LMV) histogram database 542, and multi-modal classifier 544.

The audio processor 502 receives and records audio signals from the microphone array 18 at the scene. The image processor 504 receives and records one or more images of the scene from one or more cameras 508 taking pictures of the scene. The video processor 506 receives and records video signals from one or more video cameras 510 recording the scene.

The audio processor 502 includes a direction of arrival (DOA) detector 512, a region of interest (ROI) selector 514, a sound classifier 516, and an acoustic feature extractor 518. From the microphone signals received from the microphone array 18, the DOA detector 512 determines the direction of arrival of sound emanating from a sound source located within the scene. Exemplary components and functions of the DOA detector 512 are described herein in connection with FIGS. 18-25. From the DOA and position of the array, an estimate of the location of the sound source in the scene can be determined. This DOA information is passed to the ROI selector 514. The ROI selector 514 estimates the location of the sound source based on the DOA information and known position of microphone array 18. The ROI selector 514 then selects a specific portion of the image of the scene based on the location information. The selected portion or ROI contains the sound source, and thus, can be used to limit the keypoint searching and LMV calculations to only part of the scene.

The sound classifier 516 classifies the type of the sound source based on characteristics of the recorded audio. For example, musical instrument note libraries may be used by the classifier 516 to identify a type of instrument as the sound source.

The output of the sound classifier 516 is the audio confidence value, and it is provided as input to the keypoint signature database 534. One or more keypoint signatures are selected from the keypoint signature database 534 based on the audio confidence value. These selected keypoint signatures are provided to the SIFT matching device 532.

The acoustic feature extractor 518 computes acoustic features, such as MFCCs or the like, derived from the microphone signals. These extracted features are provided to the acoustic feature matching device 538, which identifies the sound source by comparing the extracted features to a database of acoustic features 536 for different types of sound sources. The output of the acoustic feature matching device may be an acoustic feature confidence value, which may be a vector having elements similar to those discussed above for the other CVs.

The image processor 504 includes a keypoint detector 520, a stable keypoint detector 522, and an ROI keypoint selector 524. The keypoint detector 520 determines keypoints in a captured digital image of the scene, using the methods described herein. The stable keypoint detector 522 refines the keypoint search, and selects only those detected keypoints that are stable. The ROI keypoint selector 524 receives coordinate information from the ROI selector 514 identifying the ROI in the captured image. Based on the coordinate information, the ROI keypoint select narrows down the image keypoint selection to those stable keypoints located within the ROI.

The stable keypoints detected within the ROI are then provided to the SIFT matching device 532.

In essence, the SIFT matching device 532 compares the stable ROI keypoints to the keypoint signatures retrieved from the keypoint signature database 534 to generate the image CV.

The video processor 506 includes an LMV calculator 526, an ROI LMV selector 528, and an ROI LMV histogram calculator 530. The LMV calculator 526 receives the digital video signals from the camera(s) 510 and computes LMVs for a predetermined recording duration of the scene. The LMVs are then passed to the ROI LMV selector 528. The ROI LMV selector 528 receives the coordinate information for the ROI from the ROI selector 514, and selects those LMVs within the ROI based on the coordinate information.

The LMVs within the ROI are then passed to the ROI LMV histogram calculator 530, which calculates an LMV histogram from the ROI. The LMV histogram for the scene is then passed to the histogram matching device 540. The histogram matching device 540 compares the scene LMV histogram to object LMV histograms stored in the object LMV histogram database 542 to find the closest matches. The histogram matching device 540 outputs the video CV based on this comparison.

The multi-modal classifier 544 identifies the object in the scene based on the outputs of the SIFT matching device 532, the sound classifier 516, the acoustic feature matching device 538, and the histogram matching device 540. The multi-modal classifier 544 can accomplish this by computing the final confidence value vector, which may be the weighted sum of the audio CV, image CV, video CV, acoustic feature CV. The classifier 544 may perform a Bayesian estimation to yield a recognized instrument with an associated likelihood. The weighting coefficients for the CVs may be similar to those described in connection with FIGS. 4A-B.

In addition, the subsystem 500 may also output a refined object location for each object recognized in the scene. The refined object location(s) can be based on output from the multi-modal classifier 544, the cameras 508, and the estimated object locations from the ROI selector 514 of the audio processor 502. The refined object location(s) can be fed back to the DOA detector 512 and/or ROI selector 514 to improve their accuracy and speed in estimating a region of interest or object location, e.g., the estimated DOA or object location determined in a previous video/image frame may be handed to the next frame as initial coordinates for use by the audio processor 502 in its ROI selection process.

Keypoint Selection and Sift Matching Device

The operations of the exemplary keypoint detector 520, keypoint selector 522 and SIFT matching device 532 are described as follows.

Generally, object or feature recognition may involve identifying points of interest (also called keypoints) in an image and/or localized features around those keypoints for the purpose of object recognition. Although such distinctive elements in the image data are referred to herein as "keypoints" it should be understood that the term keypoint as used herein may refer to individual pixels, groups of pixels, fractional pixel portions, one or more descriptors, other image components, or any combination thereof. Having high stability and repeatability of features is of great importance in these recognition algorithms. Thus, the keypoints may be selected and/or processed such that they are invariant to image scale changes and/or rotation and provide robust matching across a substantial range of distortions, changes in point of view, and/or noise and change in illumination. Further, in order to be well suited for tasks such as object recognition, the feature descriptors may preferably be distinctive in the sense that a single feature can be correctly matched with high probability against a large database of features from a plurality of target images.

After the keypoints in an image are detected and located, they may be identified or described by using various descriptors. For example, descriptors may represent the visual features of the content in images, such as shape, color, texture, rotation, and/or motion, among other image characteristics. The individual features corresponding to the keypoints and represented by the descriptors are then matched to a database of features from known objects.

As part of identifying and selecting keypoints for an image, some points that have been selected may need to be discarded due to lack of precision or confidence. For instance, some initially detected keypoints may be rejected on the grounds of poor contrast and/or poor localization along edges. Such rejections are important in increasing keypoint stability with respect to illumination, noise and orientation variations. It is also important to minimize false keypoint rejections which would decrease repeatability of feature matching.

Generally, it is recognized that illumination in an image can be represented by a spatially varying function. Therefore, the effect of illumination (e.g., shading, light image, dark image, etc.) can be neutralized for purposes of feature/keypoint detection by a normalization process that factors out the illumination function. For example, an image may be processed by progressively blurring the image using a function G (i.e., kernel or filter) with a range of smoothening factors to generate a smoothened scale space L of the image. A difference of scale space D for the image may then be obtained by taking the difference between adjacent pairs of smoothened scale space levels ($L_i$-$L_{i-1}$). Normalization of the difference of scale space L is then achieved by dividing each difference of scale space level $D_i$ by a smoothened scale space level $L_k$ that is as smooth or smoother than the smoothest of the scale space levels $L_j$ used to obtain the particular difference of scale space level $D_i$.

Figure 7:
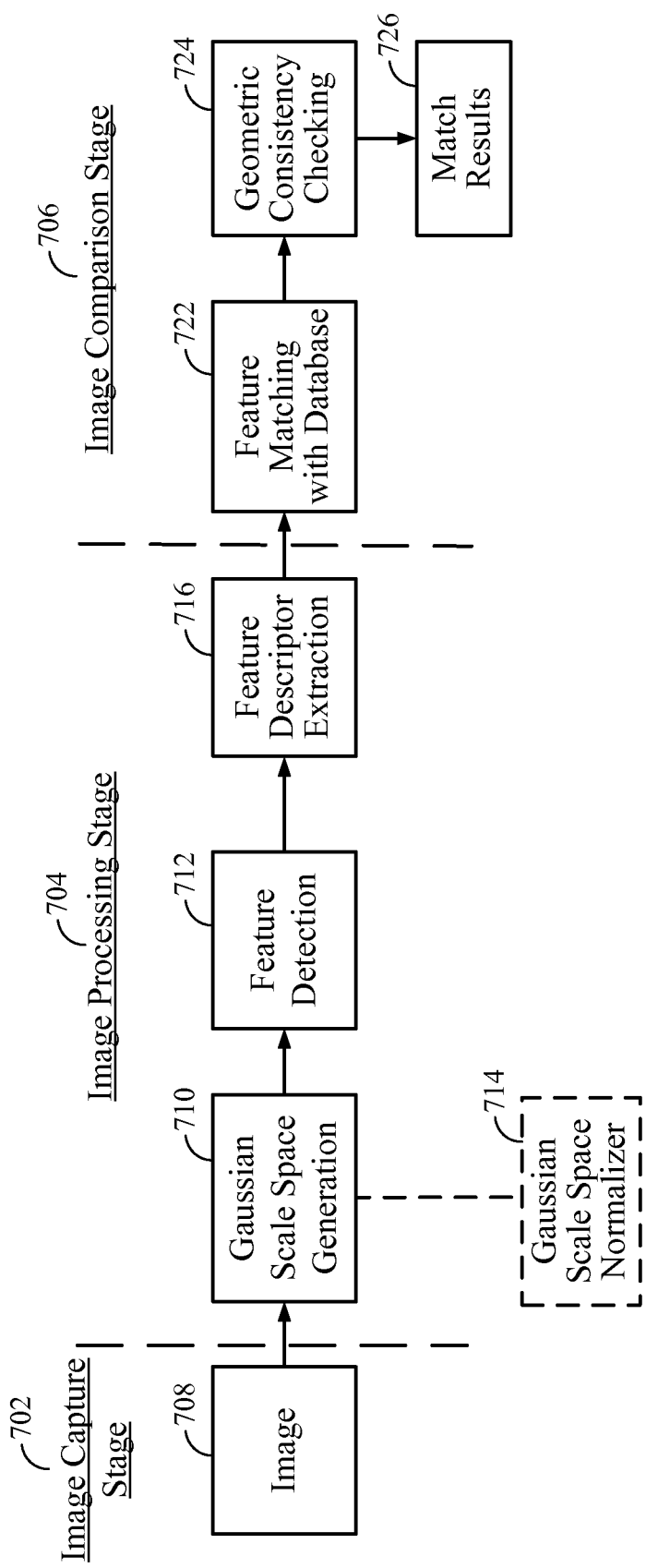
FIG. 7 is a block diagram illustrating the functional stages for performing object recognition on a recorded image.

FIG. 7 is a block diagram illustrating the functional stages for performing object recognition on a recorded image. At an image capture stage 702, an image 708 of interest (i.e., the recorded image) may be captured. The image 708 may be captured by an image capturing device, which may include one or more image sensors and/or an analog-to-digital converter, to obtain a digital captured image. The image sensors (e.g., charge coupled devices (CCD), complementary metal semiconductors (CMOS)) may convert light into electrons. The electrons may form an analog signal that is then converted into digital values by the analog-to-digital converter. In this manner, the image 708 may be captured in a digital format that may define the image I(x, y), for example, as a plurality of pixels with corresponding color, illumination, and/or other characteristics.

In an image processing stage 704, the captured image 708 is then processed by generating a corresponding scale space 710 (e.g., Gaussian scale space), performing feature detection 712, and performing feature descriptor extraction 716. Feature detection 712 may identify highly distinctive keypoints and/or keypoints of geometrical interest for the captured image 708 which can subsequently be used in feature descriptor extraction 716 to obtain a plurality of descriptors. At an image comparison stage 706, these descriptors are used to perform feature matching 722 (e.g., by comparing keypoints and/or other characteristics of keypoints or patches surrounding the keypoints) with a database of known descriptors. Geometric verification or consistency checking 724 is then performed on keypoint matches to ascertain correct feature matches and provide match results 726. In this manner a recorded image may be compared to, and/or identified from, a database of target images.

It has been observed that changes in illumination in an image can have a deleterious impact on the stability and/or repeatability of feature/keypoint recognition for an image. That is, local and/or global illumination changes in an image may affect the detection of features/keypoints for an image. For instance, the number and/or location of features/keypoints may change depending on the illumination (e.g., shading, contrast, etc.) in an image. Therefore, it would be beneficial to substantially eliminate or minimize the effects of local and/or global illumination changes prior to feature/keypoint detection in an image.

One way to do this may be to process the image itself to remove or compensate for local and/or global illumination changes prior to starting feature/keypoint detection. However, such process may be computationally intensive. Additionally, it is often difficult to determine whether local and/or global illumination changes are present in an image. Such process would also have to be applied to images in a database. Without first processing both a target image and the database images to correct for illumination changes, feature/keypoint matching may not succeed. But without prior knowledge of how illumination may affect a particular image, this is process is rather difficult to implement automatically.

Therefore, an alternative is needed that can be performed without substantial processing overhead. According to one example, the effects of illumination (either uniform or non-uniform) across an image for the purpose of feature detection may be eliminated or reduced by normalizing a difference of scale space prior to feature/keypoint detection being performed on the difference of scale space. This normalization process may be performed using a smoothened scale space that is already available, therefore minimizing any additionally computation.

According to one example, a scale space normalizer 714 may be implemented as part of scale space generation 710 to reduce or eliminate the effects that illumination changes have on keypoint/feature recognition in an image.

Figure 8:
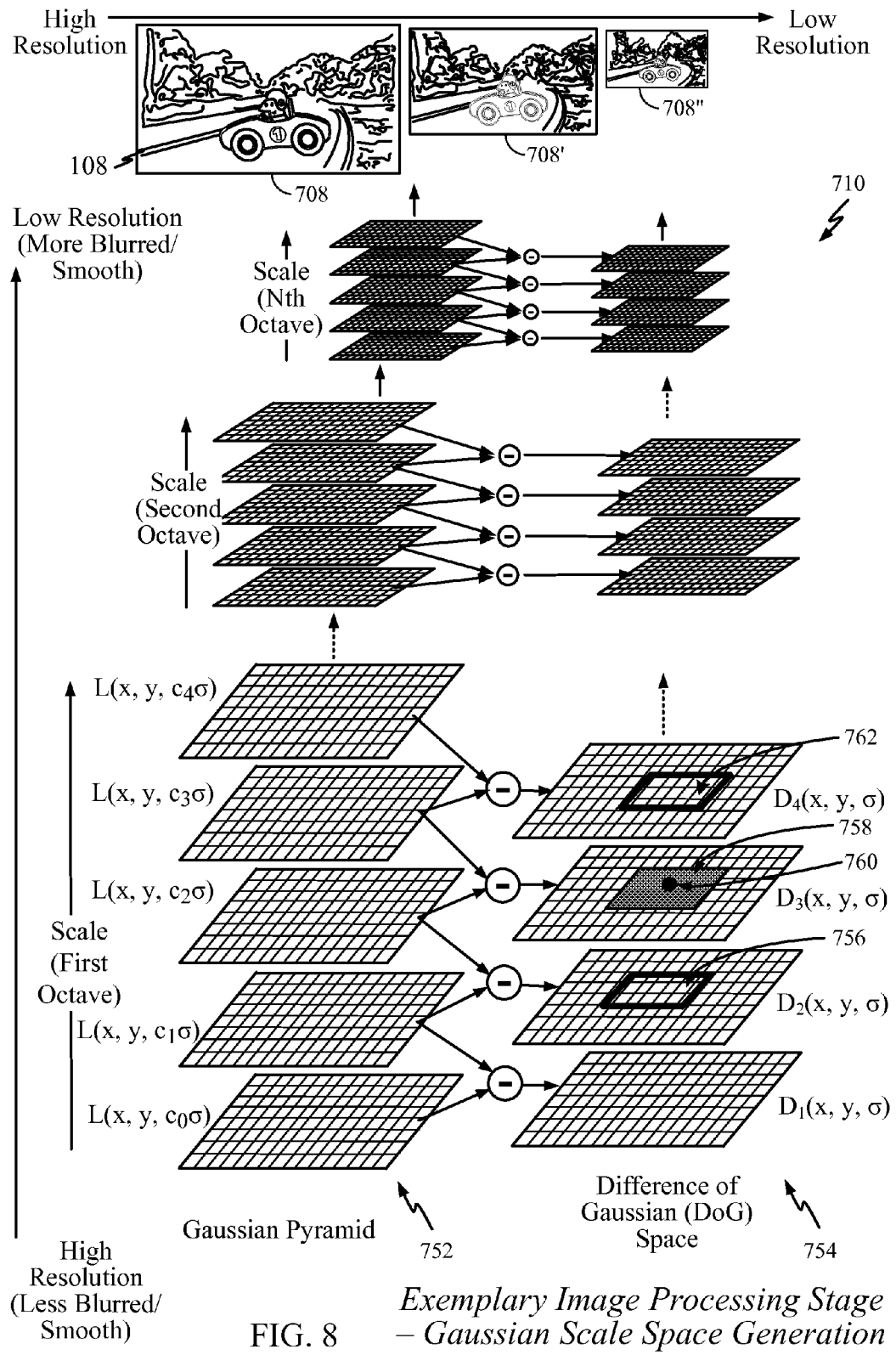
FIG. 8 illustrates Gaussian scale space generation in an exemplary image processing stage.

FIG. 8 illustrates Gaussian scale space generation in an exemplary image processing stage 704. A number of algorithms, such as Scale Invariant Feature Transform (SIFT), have been developed to perform feature detection in images. A first step towards detection of particular objects in an image is classifying the recorded object based on its local features. The goal is to identify and select features that are invariant and/or robust to, for example, illumination, image noise, rotation, scaling, and/or small changes in viewpoint. That is, matches between a query image and a comparison target image should be found despite differences in illumination, image noise, rotation, scale, and/or viewpoint between the two images. One way to do this is to perform extrema detection (e.g., local maxima or minima) on patches of an image to identify highly distinctive features (e.g., distinctive points, pixels, and/or regions in the image).

SIFT is one approach for detecting and extracting local features that are reasonably invariant to changes in illumination, image noise, rotation, scaling, and/or small changes in viewpoint. The image processing stage 704 for SIFT may include: (a) scale-space extrema detection, (b) keypoint localization, (c) orientation assignment, and/or (d) generation of keypoint descriptors. It should be clear that alternative algorithms for feature detection and, subsequent feature descriptor generation, including Speed Up Robust Features (SURF), Gradient Location and Orientation Histogram (GLOH), Local Energy based Shape Histogram (LESH), Compressed Histogram of Gradients (CHoG), among others, may also benefit from the features described herein.

In Gaussian scale space generation 710, the digital image I(x, y) 708 is gradually Gaussian blurred (i.e., smoothened) to construct the Gaussian pyramid 752. Gaussian blurring (smoothing) generally involves convolving the original image I(x, y) with the Gaussian blurring/smoothing function G(x, y, cs) at scale cs such that the Gaussian blurring/smoothing function L(x, y, cs) is defined as L(x, y, cs)=G(x, y, cs)*I(x, y). Here, G is a Gaussian kernel, cs denotes the standard deviation of the Gaussian function that is used for blurring the image I(x, y). As multiplier c, is varied ($c_0 < c_1 < c_2 < c_3 < c_4$), the standard deviation cs varies and a gradual blurring/smoothing is obtained. Sigma s is the base scale variable (e.g., the width of the Gaussian kernel). Higher scales (i.e., lower resolution) are blurred/smoothened more than lower scales (i.e., higher resolution). Thus, the wider scale levels (i.e., lower resolution), the smoother (more blurred) the image.

When the initial image I(x, y) is incrementally convolved with Gaussians G to produce the blurred images L, the blurred images L are separated by the constant factor c in the scale space. As the number of Gaussian blurred (smoothened) images L increase and the approximation provided for the Gaussian pyramid 752 approaches a continuous space, the two scales also approach one scale. In one example, the convolved images L may be grouped by octave, where an octave may correspond to a doubling of the value of the standard deviation s. Moreover, the values of the multipliers c (e.g., $c_0 < c_1 < c_2 < c_3 < c_4 \ldots$), are selected such that a fixed number of convolved images L are obtained per octave. Each octave of scaling corresponds to an explicit image resizing. Thus, as the original image I(x,y) is blurred/smoothened by the gradually blurring/smoothening function, the number of pixels is progressively reduced. Note that while Gaussian smoothening functions are used herein for purposes of illustration, other types of smoothening kernels/functions may be employed.

A difference of Gaussian (DoG) pyramid 754 constructed by computing the difference of any two consecutive Gaussian-blurred images in the Gaussian pyramid 752. In the DoG space 754, $D(x, y, a) = L(x, y, c_n s) - L(x, y, c_{n-1} s)$. A DoG image D(x, y, s) is the difference between two adjacent Gaussian blurred images L at scales $c_n s$ and $c_{n-1} s$. The scale of the D(x, y, s) lies somewhere between $c_n s$ and $c_{n-1} s$. The DoG images D may be obtained from adjacent Gaussian-blurred images L per octave. After each octave, the Gaussian image may be down-sampled by a factor of 2 and then the process is repeated. In this manner an image may be transformed into local features that are robust or invariant to translation, rotation, scale, and/or other image parameters and/or distortions.

Once generated, the DoG space 754 for a recorded image may be utilized for extrema detection to identify features of interest (e.g., identify highly distinctive points in the image). These highly distinctive points are herein referred to as keypoints. These keypoints may be identified by the characteristics of a patch or local region surrounding each keypoint. A descriptor may be generated for each keypoint and its corresponding patch, which can be used for comparison of keypoints between a query image and stored target images. A "feature" may refer to a descriptor (i.e., a keypoint and its corresponding patch). A group of features (i.e., keypoints and corresponding patches) may be referred to as a cluster.

Figure 9:
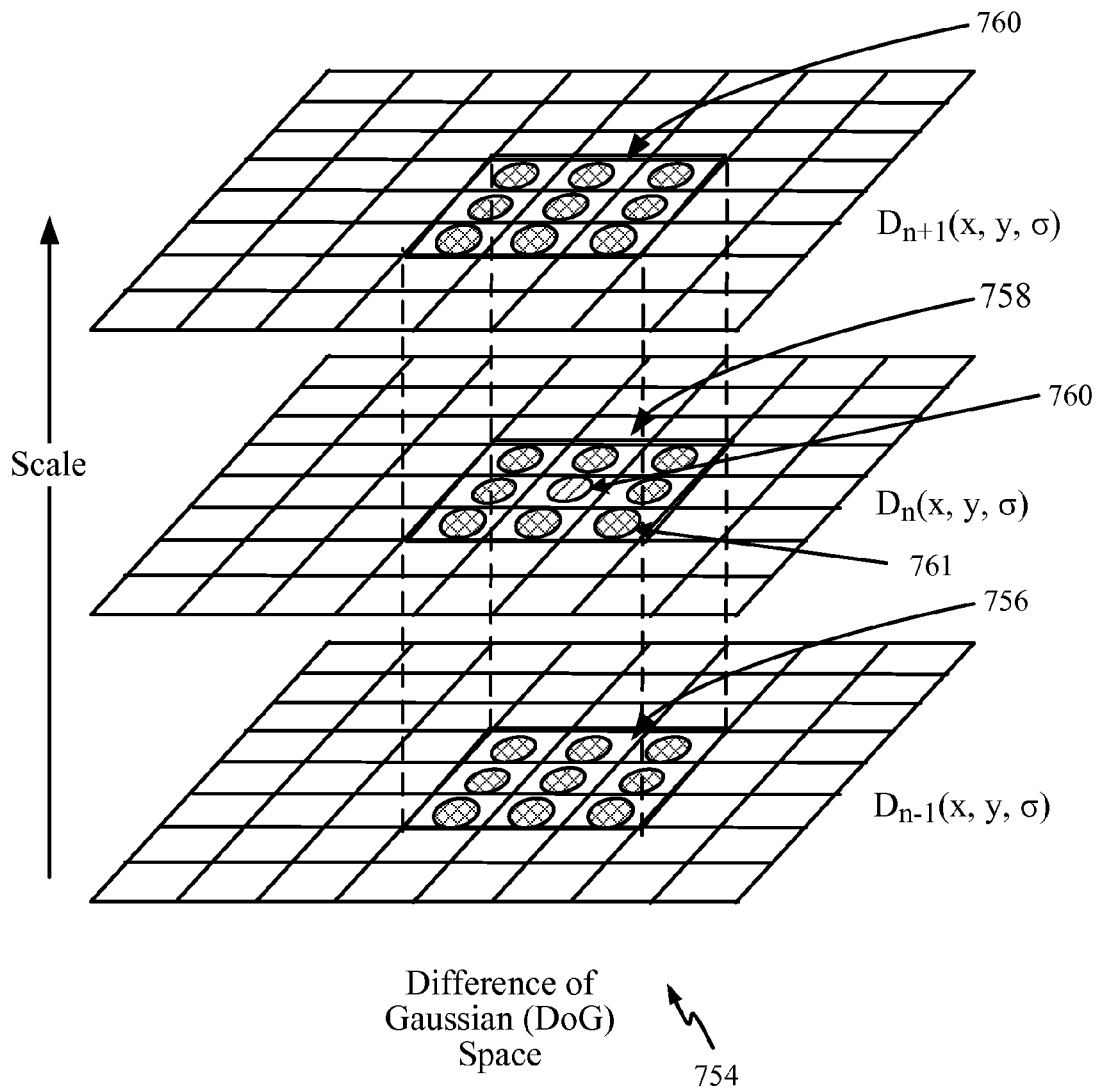
FIG. 9 illustrates feature detection in the exemplary image processing stage.

FIG. 9 illustrates feature detection in the exemplary image processing stage 704. In feature detection 712, the DoG space 754 may be used to identify keypoints for the image I(x, y). Feature detection 712 seeks to determine whether a local region or patch around a particular sample point or pixel in the image is a potentially interesting patch (geometrically speaking).

Generally, local maxima and/or local minima in the DoG space 754 are identified and the locations of these maxima and minima are used as keypoint locations in the DoG space 754. In the example illustrated in FIG. 9, a keypoint 760 has been identified with a patch 758. Finding the local maxima and minima (also known as local extrema detection) may be achieved by comparing each pixel (e.g., the pixel for keypoint 760) in the DoG space 754 to its eight neighboring pixels at the same scale and to the nine neighboring pixels (in adjacent patches 756 and 762) in each of the neighboring scales on the two sides of the keypoint 808, for a total of 26 pixels (9×2+8=26). Here, the patches are defined as 3×3 pixel regions. In general, if the pixel value for the keypoint 758 is a maximum or a minimum among all twenty-six (26) compared pixels in the patches 758, 756, and 760, then it is selected as a keypoint. The keypoints may be further processed such that their location is identified more accurately and some of the keypoints, such as the low contrast keypoints and edge keypoints may be discarded.

Figure 10:
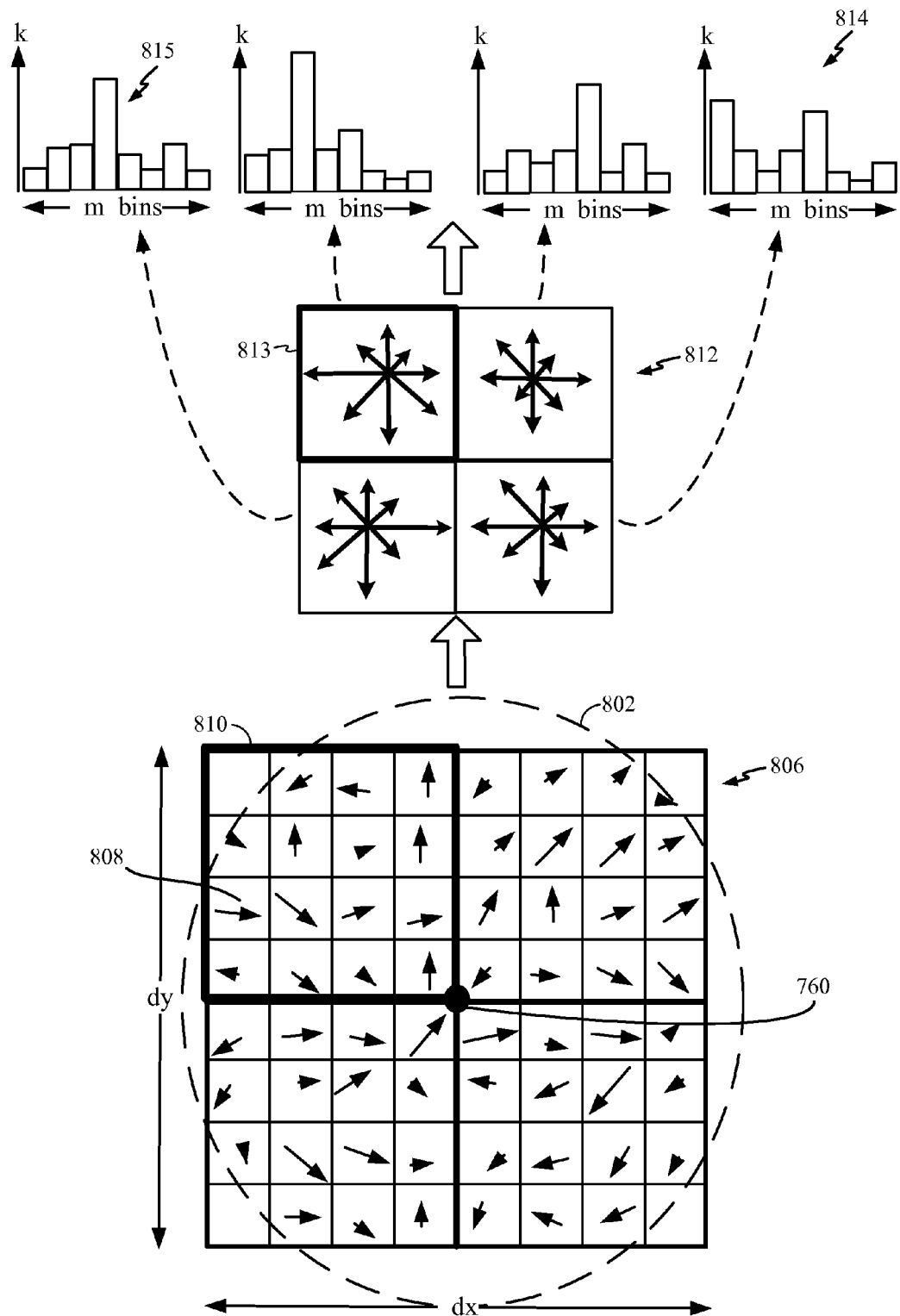
FIG. 10 illustrates feature descriptor extraction in the exemplary image processing stage.

FIG. 10 illustrates feature descriptor extraction in the exemplary image processing stage 704. Generally, a feature (e.g., a keypoint and its corresponding patch) may be represented by a descriptor, which allows for efficient comparison of the feature (from a query image) to features stored in a database of target images. In one example of feature descriptor extraction 716, each keypoint may be assigned one or more orientations, or directions, based on the directions of the local image gradient. By assigning a consistent orientation to each keypoint based on local image properties, the keypoint descriptor can be represented relative to this orientation and therefore achieve invariance to image rotation. Magnitude and direction calculations may be performed for every pixel in the neighboring region around the keypoint 760 in the Gaussian-blurred image L and/or at the keypoint scale. The magnitude of the gradient for the keypoint 760 located at (x, y) may be represented as m(x, y) and the orientation or direction of the gradient for the keypoint at (x, y) may be represented as Γ(x, y). The scale of the keypoint is used to select the Gaussian smoothed image, L, with the closest scale to the scale of the keypoint 760, so that all computations are performed in a scale-invariant manner. For each image sample, L(x, y), at this scale, the gradient magnitude, m(x, y), and orientation, Γ(x, y), are computed using pixel differences. For example the magnitude m(x,y) may be computed as:

$$m(x, y) = \sqrt{(L(x+1, y) - L(x-1, y))^2 + (L(x, y+1) - L(x, y-1))^2}.$$ (Equation 1)

The direction or orientation Γ(x, y) may be calculated as:

$$\Gamma(x, y) = \arctan\left[\frac{(L(x, y+1)L(x, y-1)}{(L(x+1, y) - L(x-1, y)}\right].$$ (Equation 2)

Here, L(x, y) is a sample of the Gaussian-blurred image L(x, y, s), at scale s which is also the scale of the keypoint.

The gradients for the keypoint 760 may be calculated consistently either for the plane in the Gaussian pyramid that lies above, at a higher scale, than the plane of the keypoint in the DoG space or in a plane of the Gaussian pyramid that lies below, at a lower scale, than the keypoint. Either way, for each keypoint, the gradients are calculated all at one same scale in a rectangular area (e.g., patch) surrounding the keypoint. Moreover, the frequency of an image signal is reflected in the scale of the Gaussian-blurred image. Yet, SIFT simply uses gradient values at all pixels in the patch (e.g., rectangular area). A patch is defined around the keypoint; sub-blocks are defined within the block; samples are defined within the sub-blocks and this structure remains the same for all keypoints even when the scales of the keypoints are different. Therefore, while the frequency of an image signal changes with successive application of Gaussian smoothing filters in the same octave, the keypoints identified at different scales may be sampled with the same number of samples irrespective of the change in the frequency of the image signal, which is represented by the scale.

To characterize a keypoint orientation, a vector of gradient orientations may be generated (in SIFT) in the neighborhood of the keypoint 760 (using the Gaussian image at the closest scale to the keypoint's scale). However, keypoint orientation may also be represented by a gradient orientation histogram (see FIG. 10) by using, for example, Compressed Histogram of Gradients (CHoG). The contribution of each neighboring pixel may be weighted by the gradient magnitude and a Gaussian window. Peaks in the histogram correspond to dominant orientations. All the properties of the keypoint may be measured relative to the keypoint orientation, this provides invariance to rotation.

In one example, the distribution of the Gaussian-weighted gradients may be computed for each block where each block is 2 sub-blocks by 2 sub-blocks for a total of 4 sub-blocks. To compute the distribution of the Gaussian-weighted gradients, an orientation histogram with several bins is formed with each bin covering a part of the area around the keypoint. For example, the orientation histogram may have 36 bins, each bin covering 10 degrees of the 360 degree range of orientations. Alternatively, the histogram may have 8 bins each covering 45 degrees of the 360 degree range. It should be clear that the histogram coding techniques described herein may be applicable to histograms of any number of bins. Note that other techniques may also be used that ultimately generate a histogram.

Gradient distributions and orientation histograms may be obtained in various ways. For example, a two-dimensional gradient distribution (dx, dy) (e.g., block 806) is converted to a one-dimensional distribution (e.g., histogram 814). The keypoint 760 is located at a center of a patch 806 (also called a cell or region) that surrounds the keypoint 760. The gradients that are pre-computed for each level of the pyramid are shown as small arrows at each sample location 808. As shown, 4×4 regions of samples 808 form a sub-block 810 and 2×2 regions of sub-blocks form the block 806. The block 806 may also be referred to as a descriptor window. The Gaussian weighting function is shown with the circle 802 and is used to assign a weight to the magnitude of each sample point 808. The weight in the circular window 802 falls off smoothly. The purpose of the Gaussian window 802 is to avoid sudden changes in the descriptor with small changes in position of the window and to give less emphasis to gradients that are far from the center of the descriptor. A 2×2=4 array of orientation histograms 812 is obtained from the 2×2 sub-blocks with 8 orientations in each bin of the histogram resulting in a (2×2)×8=32 dimensional feature descriptor vector. For example, orientation histograms 813 and 815 may correspond to the gradient distribution for sub-block 810. However, using a 4×4 array of histograms with 8 orientations in each histogram (8-bin histograms), resulting in a (4×4)×8=128 dimensional feature descriptor vector for each keypoint may yield a better result. Note that other types of quantization bin constellations (e.g., with different Voronoi cell structures) may also be used to obtain gradient distributions.

As used herein, a histogram is a mapping $k_i$ that counts the number of observations, sample, or occurrences (e.g., gradients) that fall into various disjoint categories known as bins. The graph of a histogram is merely one way to represent a histogram. Thus, if k is the total number of observations, samples, or occurrences and m is the total number of bins, the frequencies in histogram $k_i$ satisfy the following condition:

$$n = \sum_{i=1}^{m} k_i, \quad \text{(Equation 3)}$$

where $\Sigma$ is the summation operator.

The histograms from the sub-blocks may be concatenated to obtain a feature descriptor vector for the keypoint. If the gradients in 8-bin histograms from 16 sub-blocks are used, a 128 dimensional feature descriptor vector may result.

In this manner, a descriptor may be obtained for each keypoint identified, where such descriptor may be characterized by a location (x, y), an orientation, and a descriptor of the distributions of the Gaussian-weighted gradients. Note that an image may be characterized by one or more keypoint descriptors (also referred to as image descriptors). Additionally, a descriptor may also include a location information (e.g., coordinates for the keypoint), a scale (e.g., Gaussian scale at with the keypoint was detected), and other information such as a cluster identifier, etc.

By operating in the difference of Gaussian space 754, any level shifts in the luminance (spatially uniform additive bias to the luminance) of an image are entirely ignored. But scale shifts in luminance will impact the way in which keypoints are judged and ultimately selected or rejected. This applies to both uniform as well as spatially varying multiplicative luminance factors. Just as important as the keypoint detection is its localization within an image. An object is categorized by the geometric contents of its features and their spatial interrelationships. Therefore, the computed location of the keypoint is an important element so that even if the keypoint is detected, its localization should be computed in an invariant way with respect to any luminance scale changes.

Consequently, prior to identifying keypoints and generating descriptors, one feature provides for normalizing the difference of Gaussian space 754 in order to reduce, remove, and/or filter the influence of illumination from the scale space in which the keypoints are detected.

Exemplary Difference of Scale Space Normalization

Figure 11:
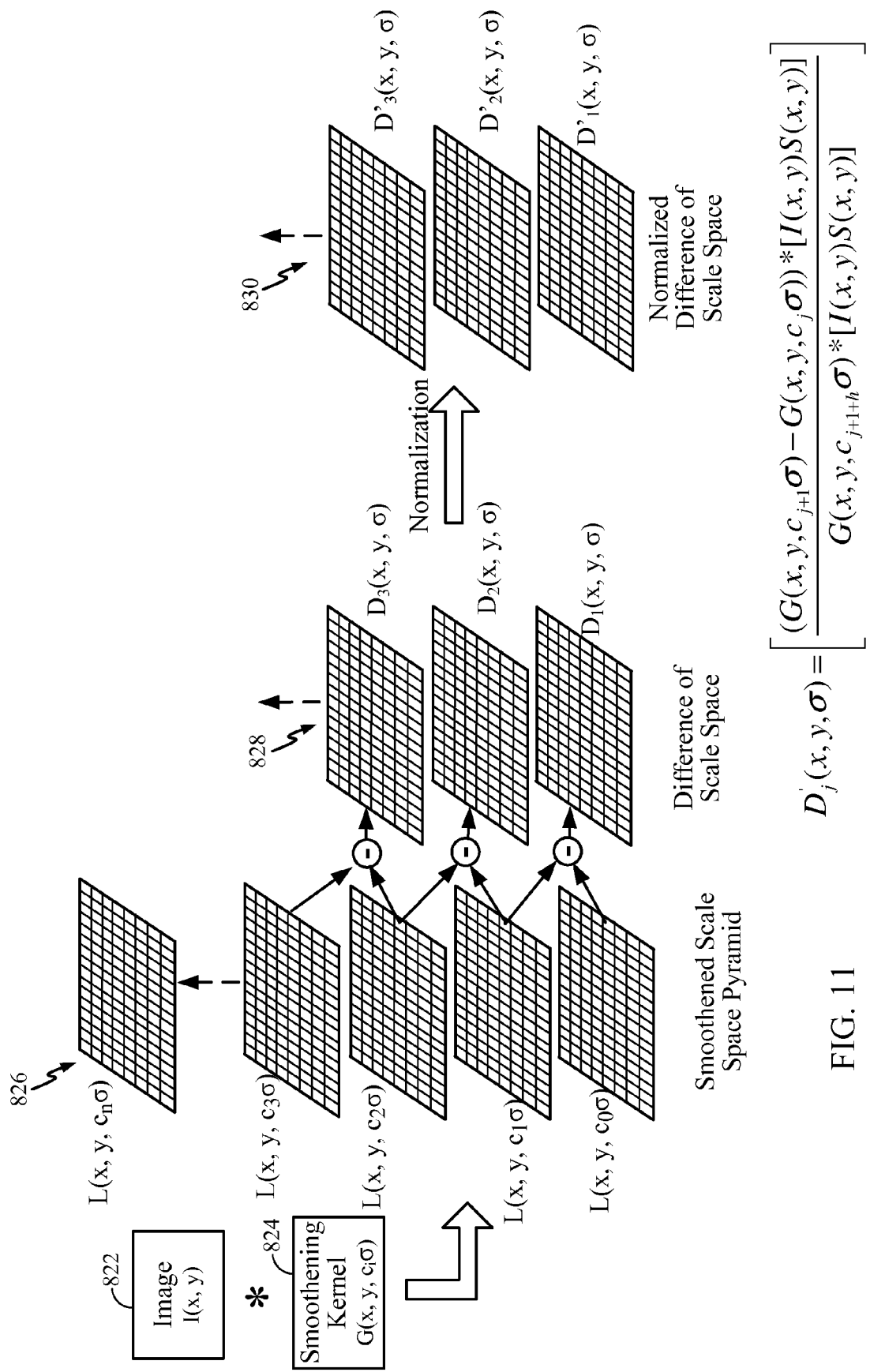
FIG. 11 illustrates an example of scale space normalization for illumination invariant feature/keypoint detection.

FIG. 11 illustrates an example of scale space normalization for illumination invariant feature/keypoint detection. An image I(x, y) 822 may be convolved with a smoothening kernel G(x, y, $c_i\sigma$) 824 at different scales $c_i\sigma$ to generate a smoothened scale space pyramid 826, where i is an integer between 0 and n. Note that the smoothening kernels may be a Gaussian kernel and/or other types of smoothening functions. The difference between two adjacent scale spaces of the smoothened scale space pyramid 826 may be taken to obtain a difference of scale space 828.

It is first observed that each level of the difference of scale space 828 may be defined as the difference of the smoothening kernel at different scales 824 (e.g., G(x, y, $c_{j+1}\sigma$)−G(x, y, $c_i\sigma$)) convolved with the image I(x, y) 822. This is equal to the difference of two corresponding smoothened scale spaces (e.g., L(x, y, $c_{j+1}\sigma$)−L(x, y, $c_i\sigma$)). Therefore, the difference of two smoothening scale spaces may be represented as:

$$D(x,y,\sigma) = (G(x,y,c_{j+1}\sigma) - G(x,y,c_j\sigma)) * I(x,y) = L(x,y,c_{j+1}\sigma) - L(x,y,c_j\sigma). \quad \text{(Equation 4)}$$

It is also observed that if illumination is represented as a scaling function S(x, y), then illumination changes for a difference of two smoothening scale spaces may be represented as:

$$D(x,y,\sigma) = (G(x,y,c_{j+1}\sigma) - G(x,y,c_j\sigma)) * (I(x,y)S(x,y)). \quad \text{(Equation 5)}$$

Here, in the general case, the illumination scaling function S(x, y) may be spatially varying or spatially constant.

However, it is not practical and/or feasible to model illumination in runtime to obtain the illumination scaling function S(x,y). Therefore, an alternative approach is disclosed herein that brings out the underlying feature (e.g., keypoint) which is unbiased by illumination from the feature space (e.g., DoG Space 828) on which feature selection and/or pruning is typically performed. According to this alternative approach, the luminance distribution of the image I(x, y) 822 is normalized by making use of scale space information that is extracted from the image I(x, y) 822. No prior information about the illumination is needed. This method enables choosing stable features and increase repeatability on a consistent level across different illumination changes without introducing any major computation and processing.

To do this, the difference of scale space 828 on which feature detection takes place may be normalized by a wider scale space. This approach may be defined by:

$$D'(x, y, \sigma) = \left[ \frac{[G(x, y, c_{j+1}\sigma) - G(x, y, c_j\sigma)] * [I(x, y)S(x, y)]}{G(x, y, c_{j+1+h}\sigma) * [I(x, y)S(x, y)]} \right] \quad \text{(Equation 6)}$$

where a first Gaussian smoothening kernel G(x, y, $c_{j+1}\sigma$) is wider than a second Gaussian smoothening kernel G(x, y, $c_j\sigma$) (i.e., scale $c_{j+1}$s is wider than scale $c_j$s, where j is a positive integer between 0 and n);

I(x, y) is the image being processed or a derivative thereof (e.g., reflective property of image);

S(x, y) an illumination scaling function; and

G(x, y, $c_{j+1+h}\sigma$) is a third smoothening kernel having a scale space that is as wide or wider than the second smoothening kernel G(x, y, $c_{j+1}\sigma$), where h is a positive integer between 0 and n. By repeating this process on every level of the difference of scale space 828, a normalized difference of scale space 830 may be generated. For example, for a differential scale space defined by G(x, y, $c_{j+1}\sigma$) and G(x, y, $c_j\sigma$), the normalizing function may be G(x, y, $c_{j+1}\sigma$) or anything higher (i.e., G(x, y, $c_{j+2}\sigma$), G(x, y, $c_{j+3}\sigma$), . . . ). The normalizing function need not be greater than both the smoothening kernels used in the differential scale space, it just needs to be as smoother. In another example, the normalizing function may be the sum of the first and second smoothening kernels used (i.e., G(x, y, $c_{j+1}\sigma$)+G(x, y, $c_j\sigma$)) such that:

$$D'(x, y, \sigma) = \left[ \frac{[G(x, y, c_{j+1}\sigma) - G(x, y, c_j\sigma)] * [I(x, y)S(x, y)]}{[G(x, y, c_{j+1}\sigma) + G(x, y, c_j\sigma)] * [I(x, y)S(x, y)]} \right]. \quad \text{(Equation 7)}$$

Note that Equation 6 may also be represented as:

$$D'(x, y, \sigma) = \left[ \frac{[L(x, y, c_{j+1}\sigma) - L(x, y, c_j\sigma)] * S(x, y)}{L(x, y, c_{j+1+h}\sigma) * S(x, y)} \right] \quad \text{(Equation 8)}$$

Because the illumination scaling function S(x, y) appears in both the numerator and denominator (of Equations 6, 7 and 8), its scaling effect is cancelled out. That is, because the illumination scaling function S(x, y) is present in the smoothened image L(x, y, $c_{j+1+h}\sigma$)*S(x, y) used for normalization, it completely or substantially cancels out the effect of illumination scaling function S(x, y) in the difference of scale space [L(x, y, $c_{j+1}\sigma$)−L(x, y, $c_j\sigma$)]*S(x, y). As before L(x, y, $c_{j+1+h}\sigma$) may be equal to L(x, y, $c_{j+1}\sigma$) or a higher scale image (i.e., L(x, y, $c_{j+2}\sigma$), L(x, y, $c_{j+3}\sigma$), . . . ). In this manner, the image content in the denominator is smoothed to such an extent that it introduces very little spatial artifacts.

In normalizing the difference of scale space, the normalizing smoothened image L(x, y, $c_{j+1+h}\sigma$) should be selected so as not to change the feature space (i.e., difference of scale space) too much so as not to shift the local extrema positions (which identify keypoints/features). That is, a close approximation of the difference of scale space should be retained after normalization since it is known that a difference of scale space is best to achieve scale invariant features. To this end, the smoothened image L(x, y, $c_{j+1+h}\sigma$) is selected such that its scale level is sufficient smooth so that high frequency contents are averaged out. That is, if the smoothened image L(x, y, $c_{j+1+h}\sigma$) is sufficiently flat, then the shape of the difference of scale space L(x, y, $c_{j+1}\sigma$)−L(x, y, $c_j\sigma$) is largely unchanged (i.e., position of features/keypoints are unchanged. Note that, in one embodiment, selecting a normalizing function at a scale level that is close (the same as or next highest) to the scale levels used to obtain the differential scale level being normalized may be preferred since this avoids introducing too much noise. For example, by picking a smooth scale like G(x, y, $c_{j+1}\sigma$) for a differential scale space defined by G(x, y, $c_{j+1}\sigma$) and G(x, y, $c_j\sigma$), the local irregularities typical for that particular level in scale space may be preserved.

As previously noted, the number of the features detected in an image may be greatly affected (e.g., reduced) by the multiplicative luminance scale changes in the image. Scaling caused by luminance tends to act like a mask on the image, which drastically reduces the content in the final feature space even without any geometrical transformations. Thus, the normalization achieved by application of Equations 6 and 7 makes sure that features that are "equal" in their geometric significance are detected irrespective of illumination changes, thereby increasing repeatability.

Figure 12:
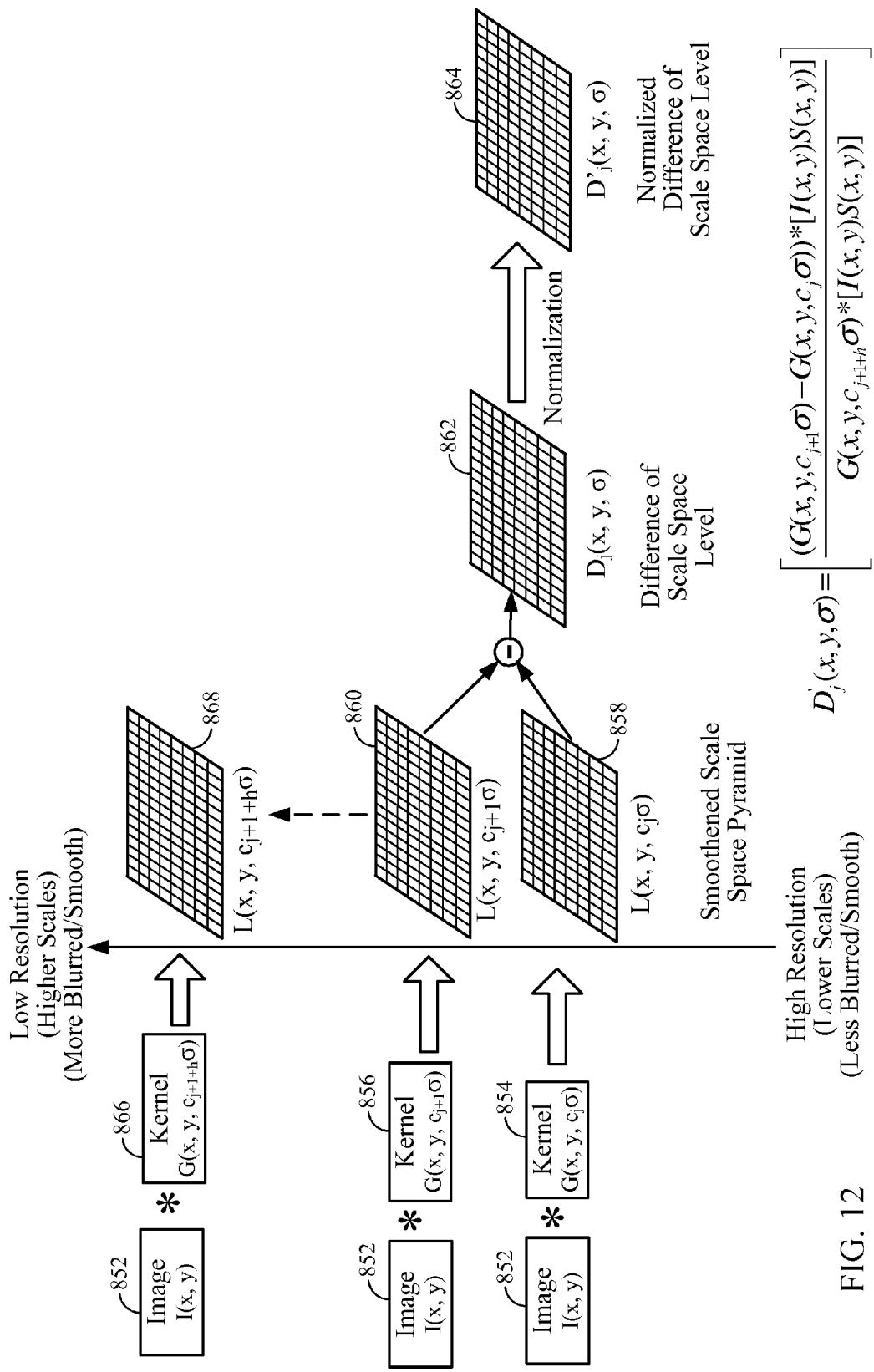
FIG. 12 illustrates one example how one level of a normalized difference of scale space may be obtained.

FIG. 12 illustrates one example how one level of a normalized difference of scale space may be obtained. Here, an image I(x, y) 852 may be convolved with a first smoothening kernel G(x, y, $c_j\sigma$) 854 to obtain a first smoothened scale space image L(x, y, $c_j\sigma$) 858. The image I(x, y) 852 may also be convolved with a second smoothening kernel G(x, y, $c_{j+1}\sigma$) 856 to obtain a second smoothened scale space image L(x, y, $c_{j+1}\sigma$) 860. A difference between the second and first smoothened images 860 and 858 may be taken to obtain a difference of scale space level $D_j$(x, y, σ) 862. This difference of scale space level $D_j$(x, y, σ) 862 may be normalized (i.e., according to Equation 6 and/or 7) based on a higher scale smoothening kernel G(x, y, $c_{j+1+h}\sigma$) 866 or smoothened scale space image L(x, y, $c_{j+1+h}\sigma$) 868 to obtain a normalized scale space level $D'_j$(x, y, σ) 864. This process may be repeated by applying different smoothening kernels of different widths (set by scaling factors $c_j\sigma$) to the image I(x, y), thereby building a smoothened scale space pyramid. A difference of scale space (e.g., 828 in FIG. 11) may be built by taking the difference between adjacent levels of the smoothened scale space pyramid (e.g., 826 in FIG. 11). A normalized difference of scale space (e.g., 830 in FIG. 11) may be generated, according to Equations 6 and/or 7.

Figure 13:
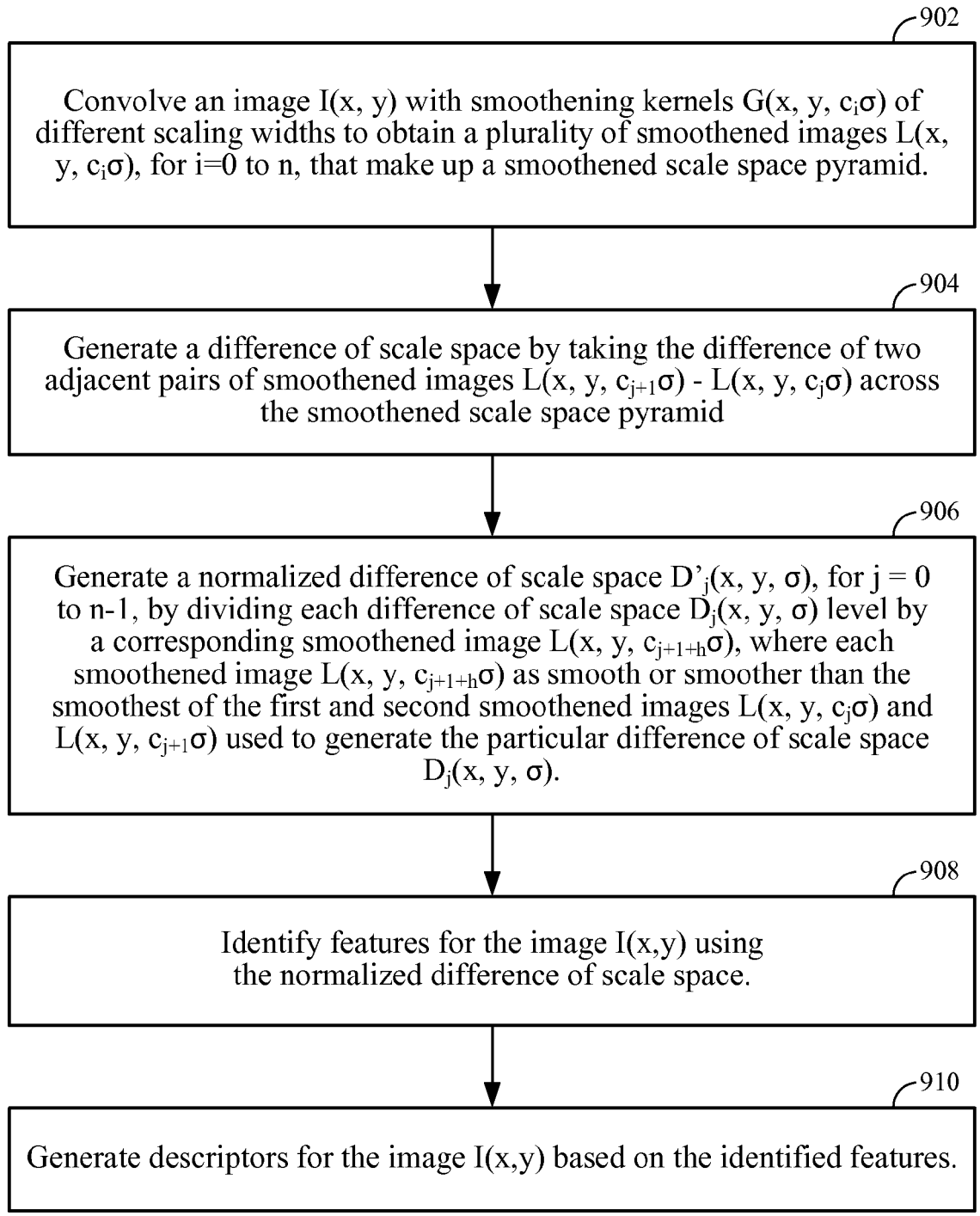
FIG. 13 illustrates a method for generating a normalized difference of scale space for improved feature detection.

FIG. 13 illustrates a method for generating a normalized difference of scale space for improved feature detection that is resistant to changes in illumination. Convolve an image I(x, y) with smoothening kernels G(x, y, $c_i\sigma$) of different scaling widths (set by different $c_i\sigma$, for i=0 to n) to obtain a plurality of smoothened images L(x, y, $c_i\sigma$), for i=0 to n, that make up a smoothened scale space pyramid 902. The image I(x, y) may be characterized by a base image $I_0$(x, y) that has been modified, completely or on a pixel-by-pixel basis, by the illumination function S(x,y). In one example, the smoothening kernels G(x, y, $c_i\sigma$) may be Gaussian kernels such that the smoothened scale space pyramid is a Gaussian scale space pyramid.

Next, generate a difference of scale space $D_j$(x, y, σ), for j=0 to n−1, by taking the difference of adjacent pairs of smoothened images L(x, y, $c_{j+1}\sigma$)−L(x, y, $c_j\sigma$) across the smoothened scale space pyramid 904. This process is repeated for multiple sets of adjacent smoothened images to obtain the difference of scale space having multiple levels. Note that a second smoothening kernel G(x, y, $c_{j+1}\sigma$), used to obtain the second smoothened image L(x, y, $c_{j+1}\sigma$), may be wider than the first smoothening kernel G(x, y, $c_j\sigma$) used to obtain the first smoothened image L(x, y, $c_{j+1}\sigma$).

A normalized difference of scale space $D'_j$(x, y, σ), for j=0 to n−1, may then be generated by dividing each difference of scale space $D_j$(x, y, σ) level by a corresponding smoothened image L(x, y, $c_{j+1+h}\sigma$), where each smoothened image L(x, y, $c_{j+1+h}\sigma$) is as smooth or smoother than the smoothest of the two different smoothened versions of the image L(x, y, $c_{j+1}\sigma$) and L(x, y, $c_j\sigma$) 906. That is, the normalizing smoothened image L(x, y, $c_{j+1+h}\sigma$) may have an equal or wider scale (e.g., smoothening kernel) than the greater of the scales (e.g., smoothening kernels) for the two different smoothened versions of the image L(x, y, $c_{j+1}\sigma$) and L(x, y, $c_j\sigma$).

The normalized difference of scale space $D'_j$(x, y, σ), for j=0 to n−1, may then be used to identify features for the image I(x, y) 908. For example, local extrema (i.e., minima or maxima) may be identified as a keypoint around which a feature may be defined. Descriptors may then be generated for the image I(x, y) based on the identified features 910.

The method illustrated in FIGS. 11, 12, and 13 require no prior information about the illumination of an image. This method enables choosing stable features in an image and increase repeatability on a consistent level across different illumination changes without introducing any major (significant) computation and processing. That is, because the smoothened scale space already includes the smoothened image L(x, y, $c_{j+1+h}\sigma$) used to normalize a difference of scale space $D_j$(x, y, σ), no additional processing is needed for normalization aside from a division operation.

Additionally, by adapting the confidence with which features are selected, more stable features may be obtained according to the scale (e.g., smoothening level) at which the features is detected. That is, higher scales generally include a smoother version of the image (i.e., more blurred) and keypoints/features detected at such scales have a higher degree of confidence.

Figure 14:
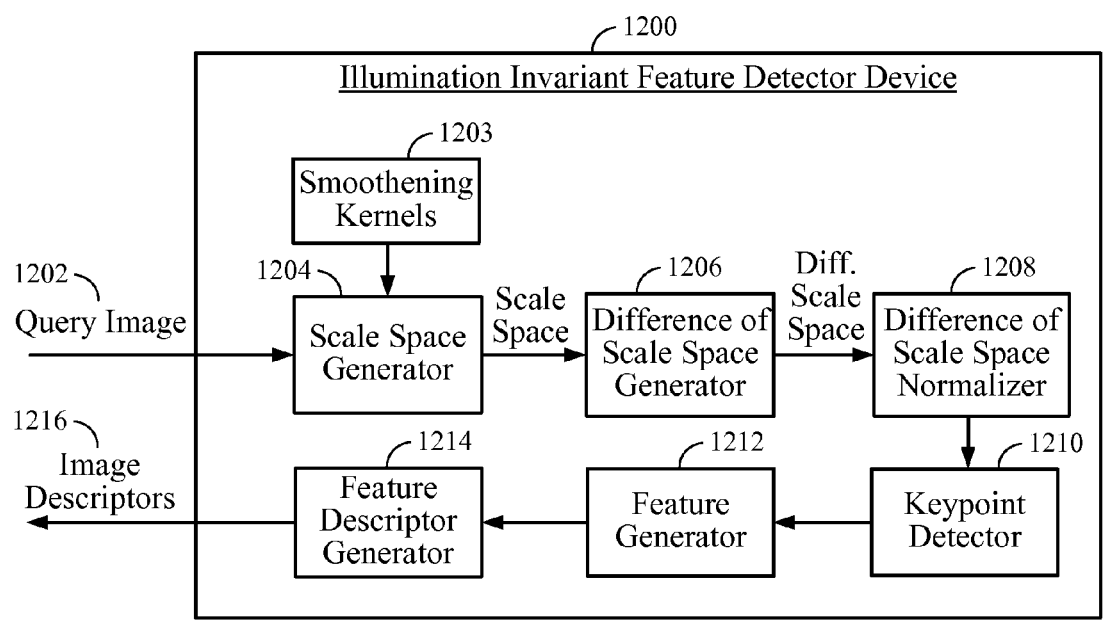
FIG. 14 is a block diagram illustrating an example of a feature/keypoint detection device.

FIG. 14 is a block diagram illustrating an example of an illumination invariant feature detection device. The feature detection device 1200 may receive or obtain a digital query image 1202. A scale space generator 1204 (e.g., Gaussian scale space generator) may then convolve the query image 1202 with a plurality of different smoothening kernels 1203 of different scale widths to generate a scale space. The scale space may comprise a plurality of smoothened versions of the image that are smoothened to different scaling widths. A difference of scale space generator 1206 then generates a difference of scale space from the scale space. A difference of scale space normalizer 1208 then normalizes the difference of scale space by, for example, dividing each difference of scale space level by a corresponding smoothened image, where such smoothened image is has a scale that is as wide or wider than the greater of the smoothened images used to generate the difference of scale space being divided. A keypoint generator 1210 then identifies or detects keypoints in the normalized difference of scale space. This may be done, for example, by finding local extrema (i.e., maxima or minima) among pixels of the normalized difference of scale space. A feature generator 1212 may then generate features by, for example, characterizing local pixels around the identified keypoint. Note that the functions of the keypoint generator 1210 and feature generator 1212 may be performed by a feature detector. A feature descriptor generator 1214 then generates a descriptor for each feature to provide a plurality of image descriptors 1216 that can serve to identify the query image. The functions illustrated in FIG. 14 may be performed by separate circuits or by one or more processors.

Figure 15:
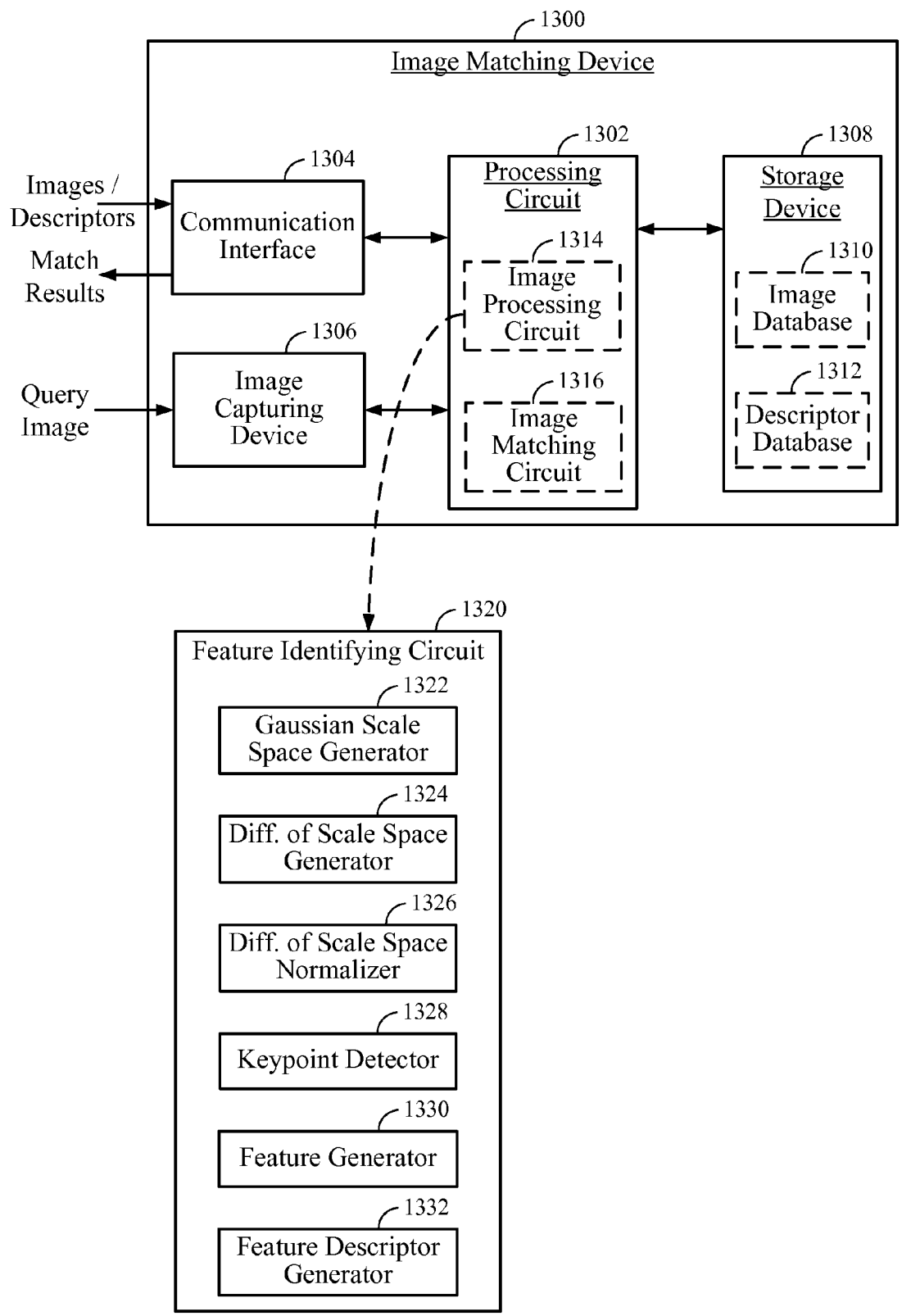
FIG. 15 is a block diagram illustrating an example of an image matching device.

FIG. 15 is a block diagram illustrating an example of an image matching device that uses a normalized difference of scale space for feature detection. The image matching device 1300 may include a processing circuit 1302, coupled to a communication interface 1304, an image capturing device 1306, and/or a storage device 1308. The communication interface 1304 may be adapted to communicate over a wired/wireless network and receive images and/or feature descriptors for one or more images. The image capturing device 1306 may be, for example, a digital camera that can capture a query image. The processing circuit 1302 may include an image processing circuit 1314 to extract features from images and an image matching circuit 1316 that uses the extracted features to match a query image to a database of target images 1310 and/or query image descriptors to a descriptor database 1312. According to one exemplary implementation, an image matching application attempts to match a query image to one or more images in an image database. The image database may include millions of feature descriptors associated with the one or more images stored in the database 1310.

The image processing circuit 1314 may include a feature identifying circuit 1320 that includes a Gaussian scale space generator 1322, a difference of scale space generator 1324, a difference of scale space normalizer 1326, a keypoint detector 1328, a feature generator 1330, and/or a feature descriptor generator 1332. The Gaussian scale space generator 1322 may serve to convolve an image with a blurring function (e.g., smoothening kernel) to generate a plurality of different scale spaces as illustrated, for example, in FIGS. 8 and 11. The difference of scale space generator 1324 then generates a difference of scale space from the scale space. The difference of scale space normalizer 1326 then normalizes the difference of scale space by, for example, dividing each difference of scale space level by a corresponding smoothened image, where such smoothened image is wider than either the smoothened images used to generate the difference of scale space being divided (illustrated in FIG. 12). The keypoint generator 1328 then identifies or detects keypoints in the normalized difference of scale space. This may be done, for example, by finding local extrema (i.e., maxima or minima) among pixels of the normalized difference of scale space. The feature generator 1330 may then generate features by, for example, characterizing local pixels around the identified keypoint (illustrated in FIG. 9). The feature descriptor generator 1332 then generates a descriptor for each feature to provide a plurality of image descriptors that can serve to identify the query image (illustrated in FIG. 10).

The image matching circuit 1316 may then attempt to match the query image to an image in the image database 1310 based on the feature descriptors. A match result may be provided via the communication interface (e.g., to a mobile device that sends the image or feature descriptors).

Note that, in some implementations, a set of feature descriptors associated with keypoints for a query image may be received by the image matching device. In this situation, the query image has already been processed (to obtain the descriptors). Therefore, the image processing circuit 1314 may be bypassed or removed from the image matching device 1300.

DOA Detector and Audio Scene Decomposition

In some configurations of the systems and methods disclosed herein, the function of the exemplary DOA detector 512 and the process of decomposing an audio scene using spatial filters 72 may be accomplished using the techniques described in this section.

Applications for far-field audio processing (e.g., audio source enhancement) may arise when the sound source or sources are located at a relatively large distance from the sound recording device (e.g., a distance of two meters or more).

In a first example of a far-field use case, a recording of an acoustic scene that includes several different sound sources is decomposed to obtain respective sound components from one or more of the individual sources. For example, it may be desirable to record a live musical performance such that sounds from different sources (e.g., different voices and/or instruments) are separated. In another such example, it may be desirable to distinguish between voice inputs (e.g., commands and/or singing) from two or more different players of a videogame, such as a "rock band" type of videogame.

In a second example of a far-field use case, a multi-microphone device is used to perform far-field audio source enhancement by narrowing the acoustic field of view (also called "zoom-in microphone"). A user watching a scene through a camera may use the camera's lens zoom function to selectively zoom the visual field of view to an individual speaker or other sound source, for example. It may be desirable to implement the camera such that the acoustic region being recorded is also narrowed to the selected source, in synchronism with the visual zoom operation, to create a complementary acoustic "zoom-in" effect.

Discriminating a sound component arriving from a particular distant source is not simply a matter of narrowing a beam pattern to a particular direction. While the spatial width of a beam pattern may be narrowed by increasing the size of the filter (e.g., by using a longer set of initial coefficient values to define the beam pattern), relying only on a single direction of arrival for a source may actually cause the filter to miss most of the source energy. Due to effects such as reverberation, for example, the source signal typically arrives from somewhat different directions at different frequencies, such that the direction of arrival for a distant source is typically not well-defined. Consequently, the energy of the signal may be spread out over a range of angles rather than concentrated in a particular direction, and it may be more useful to characterize the angle of arrival for a particular source as a center of gravity over a range of frequencies rather than as a peak at a single direction.

It may be desirable for the filter's beam pattern to cover the width of a concentration of directions at different frequencies rather than just a single direction (e.g., the direction indicated by the maximum energy at any one frequency). For example, it may be desirable to allow the beam to point in slightly different directions, within the width of such a concentration, at different corresponding frequencies.

An adaptive beamforming algorithm may be used to obtain a filter that has a maximum response in a particular direction at one frequency and a maximum response in a different direction at another frequency. Adaptive beamformers typically depend on accurate voice activity detection, however, which is difficult to achieve for a far-field speaker. Such an algorithm may also perform poorly when the signals from the desired source and the interfering source have similar spectra (e.g., when both of the two sources are people speaking). As an alternative to an adaptive beamformer, a blind source separation (BSS) solution may also be used to obtain a filter that has a maximum response in a particular direction at one frequency and a maximum response in a different direction at another frequency. However, such an algorithm may exhibit slow convergence, convergence to local minima, and/or a scaling ambiguity.

It may be desirable to combine a data-independent, open-loop approach that provides good initial conditions (e.g., an MVDR beamformer) with a closed-loop method that minimizes correlation between outputs without the use of a voice activity detector (e.g., BSS), thus providing a refined and robust separation solution. Because a BSS method performs an adaptation over time, it may be expected to produce a robust solution even in a reverberant environment.

In contrast to existing BSS initialization approaches, which use null beams to initialize the filters, a solution as described herein uses source beams to initialize the filters to focus in specified source directions. Without such initialization, it may not be practical to expect a BSS method to adapt to a useful solution in real time.

FIG. 16A shows a block diagram of an apparatus A100 that includes a filter bank BK10, a filter orientation module OM10, and a filter updating module UM10 and is arranged to receive a multichannel signal (in this example, input channels MCS10-1 and MCS10-2). Filter bank BK10 is configured to apply a plurality of first coefficients to a first signal that is based on the multichannel signal to produce a first output signal OS10-1. Filter bank BK10 is also configured to apply a plurality of second coefficients to a second signal that is based on the multichannel signal to produce a second output signal O510-2. Filter orientation module OM10 is configured to produce an initial set of values CV10 for the plurality of first coefficients that is based on a first source direction DA10, and to produce an initial set of values CV20 for the plurality of second coefficients that is based on a second source direction DA20 that is different than the first source direction DA10. Filter updating module UM10 is configured to update the initial sets of values for the pluralities of first and second coefficients to produce corresponding updated sets of values UV10 and UV20, based on information from the first and second output signals.

It may be desirable for each of source directions DA10 and DA20 to indicate an estimated direction of a corresponding sound source relative to a microphone array that produces input channels MCS10-1 and MCS10-2 (e.g., relative to an axis of the microphones of the array). FIG. 16B shows a block diagram of a device D10 that includes a microphone array R100 and an instance of apparatus A100 that is arranged to receive a multichannel signal MCS10 (e.g., including input channels MCS10-1 and MCS10-2) from the array. The array R100 may be included in the array 18 of FIG. 1 and the apparatus A100 in the system 14 of FIG. 1.

FIG. 16C illustrates a direction of arrival $\theta_j$, relative to an axis of microphones MC10 and MC20 of array R100, of a signal component received from a point source j. The axis of the array is defined as a line that passes through the centers of the acoustically sensitive faces of the microphones. In this example, the label d denotes the distance between microphones MC10 and MC20.

Filter orientation module OM10 may be implemented to execute a beamforming algorithm to generate initial sets of coefficient values CV10, CV20 that describe beams in the respective source directions DA10, DA20. Examples of beamforming algorithms include DSB (delay-and-sum beamformer), LCMV (linear constraint minimum variance), and MVDR (minimum variance distortionless response). In one example, filter orientation module OM10 is implemented to calculate the N×M coefficient matrix W of a beamformer such that each filter has zero response (or null beams) in the other source directions, according to a data-independent expression such as $$W(\omega) = D^H(\omega,\theta)[D(\omega,\theta)D^H(\omega,\theta) + r(\omega) \times I]^{-1},$$

where $r(\omega)$ is a regularization term to compensate for noninvertibility. In another example, filter orientation module OM10 is implemented to calculate the N×M coefficient matrix W of an MVDR beamformer according to an expression such as $$W = \frac{\Phi^{-1} D(\omega)}{D^H(\omega) \Phi^{-1} D(\omega)}. \tag{1}$$

In these examples, N denotes the number of output channels, M denotes the number of input channels (e.g., the number of microphones), $\Phi$ denotes the normalized cross-power spectral density matrix of the noise, $D(\omega)$ denotes the M×N array manifold matrix (also called the directivity matrix), and the superscript H denotes the conjugate transpose function. It is typical for M to be greater than or equal to N.

Each row of coefficient matrix W defines initial values for coefficients of a corresponding filter of filter bank BK10. In one example, the first row of coefficient matrix W defines the initial values CV10, and the second row of coefficient matrix W defines the initial values CV20. In another example, the first row of coefficient matrix W defines the initial values CV20, and the second row of coefficient matrix W defines the initial values CV10.

Each column j of matrix D is a directivity vector (or "steering vector") for far-field source j over frequency $\omega$ that may be expressed as $$D_{mj}(\omega) = \exp(-i \times \cos(\theta_j) \times \text{pos}(m) \times \omega/c).$$

In this expression, i denotes the imaginary number, c denotes the propagation velocity of sound in the medium (e.g., 340 m/s in air), $\theta_j$ denotes the direction of source j with respect to the axis of the microphone array (e.g., direction DA10 for j=1 and direction DA20 for j=2) as an incident angle of arrival as shown in FIG. 16C, and pos(m) denotes the spatial coordinates of the m-th microphone in an array of M microphones. For a linear array of microphones with uniform inter-microphone spacing d, the factor pos(m) may be expressed as (m−1)d.

For a diffuse noise field, the matrix $\Phi$ may be replaced using a coherence function $\Gamma$ such as $$\Gamma_{ij} = \begin{cases} \text{sinc}\left(\dfrac{\omega d_{ij}}{c}\right) & i \neq j \\ 1, & i = j, \end{cases}$$

where $d_{ij}$ denotes the distance between microphones i and j. In a further example, the matrix $\Phi$ is replaced by $(\Gamma + \lambda(\omega)I)$, where $\lambda(\omega)$ is a diagonal loading factor (e.g., for stability).

Typically the number of output channels N of filter bank BK10 is less than or equal to the number of input channels M. Although FIG. 16A shows an implementation of apparatus A100 in which the value of N is two (i.e., with two output channels OS10-1 and OS10-2), it is understood that N and M may have values greater than two (e.g., three, four, or more). In such a general case, filter bank BK10 is implemented to include N filters, and filter orientation module OM10 is implemented to produce N corresponding sets of initial coefficient values for these filters, and such extension of these principles is expressly contemplated and hereby disclosed.

Figure 17:
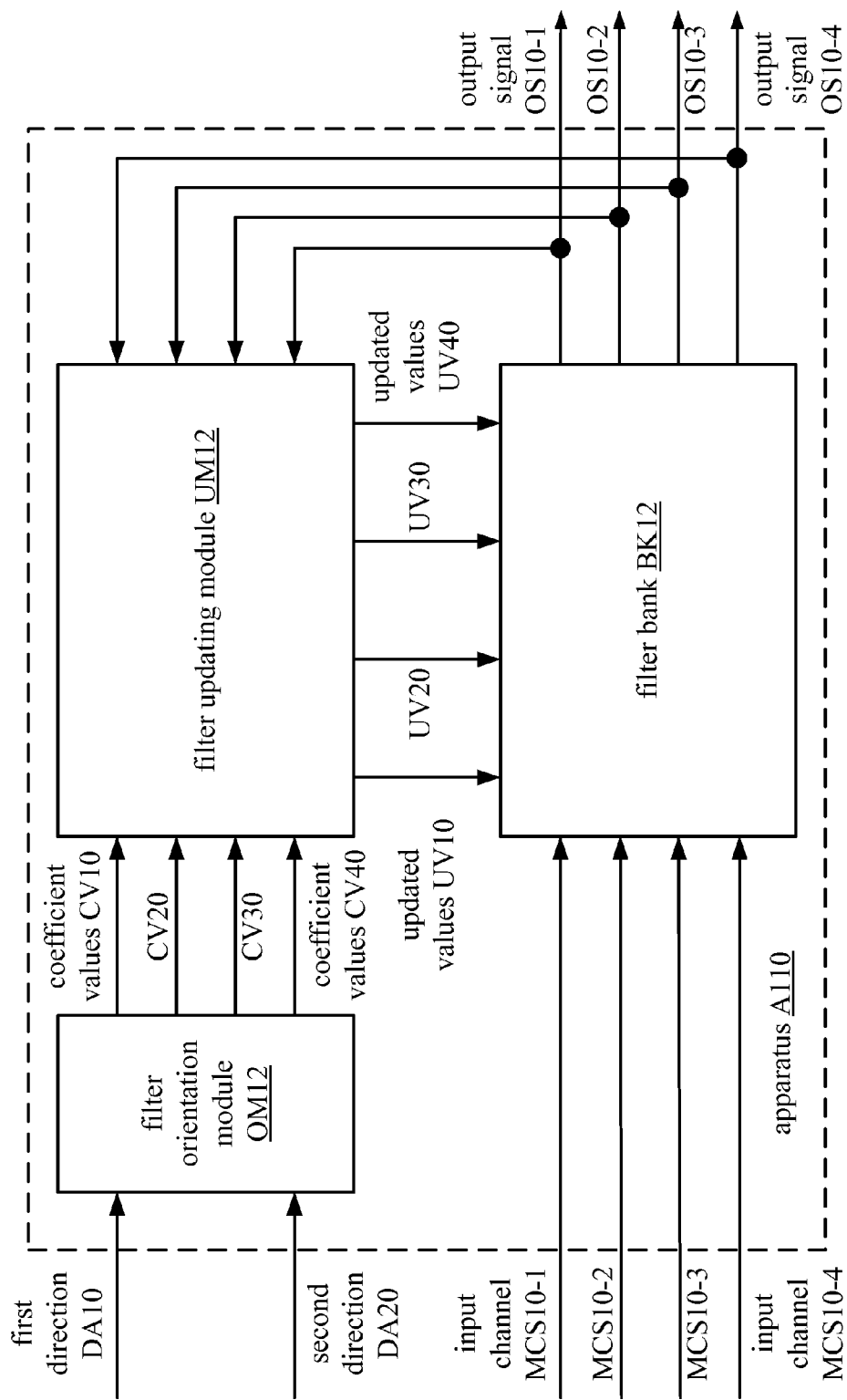
FIG. 17 shows a block diagram of an implementation A110 of apparatus A100.

For example, FIG. 17 shows a block diagram of an implementation A110 of apparatus A100 in which the values of both of N and M are four. Apparatus A110 includes an implementation BK12 of filter bank BK10 that includes four filters, each arranged to filter a respective one of input channels MCS10-1, MCS10-2, MCS10-3, and MCS10-4 to produce a corresponding one of output signals (or channels) OS10-1, OS10-2, OS10-3, and OS10-4. Apparatus A100 also includes an implementation OM12 of filter orientation module OM10 that is configured to produce initial sets of coefficient values CV10, CV20, CV30, and CV40 for the filters of filter bank BK12, and an implementation AM12 of filter adaptation module AM10 that is configured to adapt the initial sets of coefficient values to produce corresponding updated sets of values UV10, UV20, UV30, and UV40.

The initial response of a filter of filter bank BK10, in terms of frequency bin vs. incident angle (also called a "beam pattern"), is determined by the coefficient values of the filter generated by filter orientation module OM10 according to an MVDR beamforming algorithm (e.g., expression (1) above). This response may be symmetrical about the incident angle zero (e.g., the direction of the axis of the microphone array). Variations of this beam pattern under different sets of initial conditions (e.g., different sets of estimated directions of arrival of sound from a desired source and sound from an interfering source) may be had.

It may be desirable to implement filter orientation module OM10 to produce coefficient values CV10 and CV20 according to a beamformer design that is selected according to a compromise between directivity and sidelobe generation which is deemed appropriate for the particular application. Although the examples above describe frequency-domain beamformer designs, alternative implementations of filter orientation module OM10 that are configured to produce sets of coefficient values according to time-domain beamformer designs are also expressly contemplated and hereby disclosed.

Filter orientation module OM10 may be implemented to generate coefficient values CV10 and CV20 (e.g., by executing a beamforming algorithm as described above) or to retrieve coefficient values CV10 and CV20 from storage. For example, filter orientation module OM10 may be implemented to produce initial sets of coefficient values by selecting from among pre-calculated sets of values (e.g., beams) according to the source directions (e.g., DA10 and DA20). Such pre-calculated sets of coefficient values may be calculated off-line to cover a desired range of directions and/or frequencies at a corresponding desired resolution (e.g., a different set of coefficient values for each interval of five, ten, or twenty degrees in a range of from zero, twenty, or thirty degrees to 150, 160, or 180 degrees).

The initial coefficient values as produced by filter orientation module OM10 (e.g., CV10 and CV20) may not be sufficient to configure filter bank BK10 to provide a desired level of separation between the source signals. Even if the estimated source directions upon which these initial values are based (e.g., directions DA10 and DA20) are perfectly accurate, simply steering a filter to a certain direction may not provide the best separation between sources that are far away from the array, or the best focus on a particular distant source.

Filter updating module UM10 is configured to update the initial values for the first and second coefficients CV10 and CV20, based on information from the first and second output signals OS10-1 and OS10-2, to produce corresponding updated sets of values UV10 and UV20. For example, filter updating module UM10 may be implemented to perform an adaptive BSS algorithm to adapt the beam patterns described by these initial coefficient values.

A BSS method separates statistically independent signal components from different sources according to an expression such as $Y_j(\omega, l) = W(\omega)X_j(\omega, l)$, where $X_j$ denotes the j-th channel of the input (mixed) signal in the frequency domain, $Y_j$ denotes the j-th channel of the output (separated) signal in the frequency domain, $\omega$ denotes a frequency-bin index, l denotes a time-frame index, and W denotes the filter coefficient matrix. In general, a BSS method may be described as an adaptation over time of an unmixing matrix W according to an expression such as $$W_{l+r}(\omega) = W_l(\omega) + \mu[I - \langle \Phi(Y(\omega,l))Y(\omega,l)^H \rangle]W_l(\omega), \qquad (2)$$

where r denotes an adaptation interval (or update rate) parameter, $\mu$ denotes an adaptation speed (or learning rate) factor, I denotes the identity matrix, the superscript H denotes the conjugate transpose function, $\Phi$ denotes an activation function, and the brackets $\langle \cdot \rangle$ denote a time-averaging operation (e.g., over frames 1 to 1+L−1, where L is typically less than or equal to r). In one example, the value of $\mu$ is 0.1. Expression (2) is also called a BSS learning rule or BSS adaptation rule. The activation function $\Phi$ is typically a nonlinear bounded function that may be selected to approximate the cumulative density function of the desired signal. Examples of the activation function $\Phi$ that may be used in such a method include the hyperbolic tangent function, the sigmoid function, and the sign function.

Filter updating module UM10 may be implemented to adapt the coefficient values produced by filter orientation module OM10 (e.g., CV10 and CV20) according to a BSS method as described herein. In such case, output signals OS10-1 and OS10-2 are channels of the frequency-domain signal Y (e.g., the first and second channels, respectively); the coefficient values CV10 and CV20 are the initial values of corresponding rows of unmixing matrix W (e.g., the first and second rows, respectively); and the adapted values are defined by the corresponding rows of unmixing matrix W (e.g., the first and second rows, respectively) after adaptation.

In a typical implementation of filter updating module UM10 for adaptation in a frequency domain, unmixing matrix W is a finite-impulse-response (FIR) polynomial matrix. Such a matrix has frequency transforms (e.g., discrete Fourier transforms) of FIR filters as elements. In a typical implementation of filter updating module UM10 for adaptation in the time domain, unmixing matrix W is an FIR matrix. Such a matrix has FIR filters as elements. It will be understood that in such cases, each initial set of coefficient values (e.g., CV10 and CV20) will typically describe multiple filters. For example, each initial set of coefficient values may describe a filter for each element of the corresponding row of unmixing matrix W. For a frequency-domain implementation, each initial set of coefficient values may describe, for each frequency bin of the multichannel signal, a transform of a filter for each element of the corresponding row of unmixing matrix W.

A BSS learning rule is typically designed to reduce a correlation between the output signals. For example, the BSS learning rule may be selected to minimize mutual information between the output signals, to increase statistical independence of the output signals, or to maximize the entropy of the output signals. In one example, filter updating module UM10 is implemented to perform a BSS method known as independent component analysis (ICA). In such case, filter updating module UM10 may be configured to use an activation function as described above or, for example, the activation function $\Phi(Y_j)(\omega, l))=Y_j(\omega, l)/|Y_j(\omega, l)|$. Examples of well-known ICA implementations include Infomax, FastICA (available online at www-dot-cis-dot-hut-dot-fi/projects/ica/fastica), and JADE (Joint Approximate Diagonalization of Eigenmatrices).

Scaling and frequency permutation are two ambiguities commonly encountered in BSS. Although the initial beams produced by filter orientation module OM10 are not permuted, such an ambiguity may arise during adaptation in the case of ICA. In order to stay on a nonpermuted solution, it may be desirable instead to configure filter updating module UM10 to use independent vector analysis (IVA), a variation of complex ICA that uses a source prior which models expected dependencies among frequency bins. In this method, the activation function $\Phi$ is a multivariate activation function, such as $$\Phi(Y_j(\omega, l)) = \frac{Y_j(\omega, l)}{(\sum_\omega |Y_j(\omega, l)|^p)^{1/p}},$$

where p has an integer value greater than or equal to one (e.g., 1, 2, or 3). In this function, the term in the denominator relates to the separated source spectra over all frequency bins. In this case, the permutation ambiguity is resolved.

The beam patterns defined by the resulting adapted coefficient values may appear convoluted rather than straight. Such patterns may be expected to provide better separation than the beam patterns defined by the initial coefficient values CV10 and CV20, which are typically insufficient for separation of distant sources. For example, an increase in interference cancellation from 10-12 dB to 18-20 dB has been observed. The solution represented by the adapted coefficient values may also be expected to be more robust to mismatches in microphone response (e.g., gain and/or phase response) than an open-loop beamforming solution.

Although the examples above describe filter adaptation in a frequency domain, alternative implementations of filter updating module UM10 that are configured to update sets of coefficient values in the time domain are also expressly contemplated and hereby disclosed. Time-domain BSS methods are immune from permutation ambiguity, although they typically involve the use of longer filters than frequency-domain BSS methods and may be unwieldy in practice.

While filters adapted using a BSS method generally achieve good separation, such an algorithm also tends to introduce additional reverberation into the separated signals, especially for distant sources. It may be desirable to control the spatial response of the adapted BSS solution by adding a geometric constraint to enforce a unity gain in a particular direction of arrival. As noted above, however, tailoring a filter response with respect to a single direction of arrival may be inadequate in a reverberant environment. Moreover, attempting to enforce beam directions (as opposed to null beam directions) in a BSS adaptation may create problems.

Filter updating module UM10 is configured to adjust at least one among the adapted set of values for the plurality of first coefficients and the adapted set of values for the plurality of second coefficients, based on a determined response of the adapted set of values with respect to direction. This determined response is based on a response that has a specified property and may have a different value at different frequencies. In one example, the determined response is a maximum response (e.g., the specified property is a maximum value). For each set of coefficients j to be adjusted and at each frequency $\omega$ within a range to be adjusted, for example, this maximum response $R_j(\omega)$ may be expressed as a maximum value among a plurality of responses of the adapted set at the frequency, according to an expression such as $$R_j(\omega) = \max_{\theta=[-\pi,\pi]} |W_{j1}(\omega)D_{\theta 1}(\omega) + W_{j2}(\omega)D_{\theta 2}(\omega) + \ldots + W_{jM}(\omega)D_{\theta M}(\omega)|, \quad (3)$$

where W is the matrix of adapted values (e.g., an FIR polynomial matrix), $W_{jm}$ denotes the element of matrix W at row j and column m, and each element m of the column vector $D_\theta(\omega)$ indicates a phase delay at frequency $\omega$ for a signal received from a far-field source at direction $\theta$ that may be expressed as $$D_{\theta m}(\omega)=\exp(-i\times\cos(\theta)\times\text{pos}(m)\times\omega/c).$$

In another example, the determined response is a minimum response (e.g., a minimum value among a plurality of responses of the adapted set at each frequency).

In one example, expression (3) is evaluated for sixty-four uniformly spaced values of $\theta$ in the range $[-\pi, +\pi]$. In other examples, expression (3) may be evaluated for a different number of values of $\theta$ (e.g., 16 or 32 uniformly spaced values, values at five-degree or ten-degree increments, etc.), at non-uniform intervals (e.g., for greater resolution over a range of broadside directions than over a range of endfire directions, or vice versa), and/or over a different region of interest (e.g., $[-\pi, 0]$, $[-\pi/2, +\pi/2]$, $[-\pi, +\pi/2]$). For a linear array of microphones with uniform inter-microphone spacing d, the factor pos(m) may be expressed as (m−1)d, such that each element m of vector $D_\theta(\omega)$ may be expressed as $$D_{\theta m}(\omega)=\exp(-i\times\cos(\theta)\times(m-1)d\times\omega/c).$$

The value of direction $\theta$ for which expression (3) has a maximum value may be expected to differ for different values of frequency $\omega$. It is noted that a source direction (e.g., DA10 and/or DA20) may be included within the values of $\theta$ at which expression (3) is evaluated or, alternatively, may be separate from those values (e.g., for a case in which a source direction indicates an angle that is between adjacent ones of the values of θ for which expression (3) is evaluated).

FIG. 18A shows a block diagram of an implementation UM20 of filter updating module UM10. Filter updating module UM10 includes an adaptation module APM10 that is configured to adapt coefficient values CV10 and CV20, based on information from output signals OS10-1 and OS10-2, to produce corresponding adapted sets of values AV10 and AV20. For example, adaptation module APM10 may be implemented to perform any of the BSS methods described herein (e.g., ICA, IVA).

Filter updating module UM20 also includes an adjustment module AJM10 that is configured to adjust adapted values AV10, based on a maximum response of the adapted set of values AV10 with respect to direction (e.g., according to expression (3) above), to produce an updated set of values UV10. In this case, filter updating module UM20 is configured to produce the adapted values AV20 without such adjustment as updated values UV20. (It is noted that the range of configurations disclosed herein also includes apparatus that differ from apparatus A100 in that coefficient values CV20 are neither adapted nor adjusted. Such an arrangement may be used, for example, in a situation where a signal arrives from a corresponding source over a direct path with little or no reverberation.)

Adjustment module AJM10 may be implemented to adjust an adapted set of values by normalizing the set to have a desired gain response (e.g., a unity gain response at the maximum) in each frequency with respect to direction. In such case, adjustment module AJM10 may be implemented to divide each value of the adapted set of coefficient values j (e.g., adapted values AV10) by the maximum response $R_j(\omega)$ of the set to obtain a corresponding updated set of coefficient values (e.g., updated values UV10).

For a case in which the desired gain response is other than a unity gain response, adjustment module AJM10 may be implemented such that the adjusting operation includes applying a gain factor to the adapted values and/or to the normalized values, where the value of the gain factor value varies with frequency to describe the desired gain response (e.g., to favor harmonics of a pitch frequency of the source and/or to attenuate one or more frequencies that may be dominated by an interferer). For a case in which the determined response is a minimum response, adjustment module AJM10 may be implemented to adjust the adapted set by subtracting the minimum response (e.g., at each frequency) or by remapping the set to have a desired gain response (e.g., a gain response of zero at the minimum) in each frequency with respect to direction.

It may be desirable to implement adjustment module AJM10 to perform such normalization for more than one, and possibly all, of the sets of coefficient values (e.g., for at least the filters that have been associated with localized sources). FIG. 18B shows a block diagram of an implementation UM22 of filter updating module UM20 that includes an implementation AJM12 of adjustment module AJM10 that is also configured to adjust adapted values AV20, based on a maximum response of the adapted set of values AV20 with respect to direction, to produce the updated set of values UV20.

It is understood that such respective adjustment may be extended in the same manner to additional adapted filters (e.g., to other rows of adapted matrix W). For example, filter updating module UM12 as shown in FIG. 17 may be configured as an implementation of filter updating module UM22 to include an implementation of adaptation module APM10, configured to adapt the four sets of coefficient values CV10, CV20, CV30, and CV40 to produce four corresponding adapted sets of values, and an implementation of adjustment module AJM12, configured to produce each of one or both of the updated sets of values UV30 and UV40 based on a maximum response of the corresponding adapted set of values.

A traditional audio processing solution may include calculation of a noise reference and a post-processing step to apply the calculated noise reference. An adaptive solution as described herein may be implemented to rely less on post-processing and more on filter adaptation to improve interference cancellation and de-reverberation by eliminating interfering point-sources. Reverberation may be considered as a transfer function (e.g., the room response transfer function) that has a gain response which varies with frequency, attenuating some frequency components and amplifying others. For example, the room geometry may affect the relative strengths of the signal at different frequencies, causing some frequencies to be dominant. By constraining a filter to have a desired gain response in a direction that varies from one frequency to another (i.e., in the direction of the main beam at each frequency), a normalization operation as described herein may help to de-reverberate the signal by compensating for differences in the degree to which the energy of the signal is spread out in space at different frequencies.

To achieve the best separation and de-reverberation results, it may be desirable to configure a filter of filter bank BK10 to have a spatial response that passes energy arriving from a source within some range of angles of arrival and blocks energy arriving from interfering sources at other angles. As described herein, it may be desirable to configure filter updating module UM10 to use a BSS adaptation to allow the filter to find a better solution in the vicinity of the initial solution. Without a constraint to preserve a main beam that is directed at the desired source, however, the filter adaptation may allow an interfering source from a similar direction to erode the main beam (for example, by creating a wide null beam to remove energy from the interfering source).

Filter updating module UM10 may be configured to use adaptive null beamforming via constrained BSS to prevent large deviations from the source localization solution while allowing for correction of small localization errors. However, it may also be desirable to enforce a spatial constraint on the filter update rule that prevents the filter from changing direction to a different source. For example, it may be desirable for the process of adapting a filter to include a null constraint in the direction of arrival of an interfering source. Such a constraint may be desirable to prevent the beam pattern from changing its orientation to that interfering direction in the low frequencies.

It may be desirable to implement filter updating module UM10 (e.g., to implement adaptation module APM10) to adapt only part of the BSS unmixing matrix. For example, it may be desirable to fix one or more of the filters of filter bank BK10. Such a constraint may be implemented by preventing the filter adaptation process (e.g., as shown in expression (2) above) from changing the corresponding rows of coefficient matrix W.

In one example, such a constraint is applied from the start of the adaptation process in order to preserve the initial set of coefficient values (e.g., as produced by filter orientation module OM10) that corresponds to each filter to be fixed. Such an implementation may be appropriate, for example, for a filter whose beam pattern is directed toward a stationary interferer. In another example, such a constraint is applied at a later time to prevent further adaptation of the adapted set of coefficient values (e.g., upon detecting that the filter has converged). Such an implementation may be appropriate, for example, for a filter whose beam pattern is directed toward a stationary interferer in a stable reverberant environment. It is noted that once a normalized set of filter coefficient values has been fixed, it is not necessary for adjustment module AJM10 to perform adjustment of those values while the set remains fixed, even though adjustment module AJM10 may continue to adjust other sets of coefficient values (e.g., in response to their adaptation by adaptation module APM10).

Alternatively or additionally, it may be desirable to implement filter updating module UM10 (e.g., to implement adaptation module APM10) to adapt one or more of the filters over only part of its frequency range. Such fixing of a filter may be achieved by not adapting the filter coefficient values that correspond to frequencies (e.g., to values of w in expression (2) above) which are outside of that range.

It may be desirable to adapt each of one or more (possibly all) of the filters only in a frequency range that contains useful information, and to fix the filter in another frequency range. The range of frequencies to be adapted may be based on factors such as the expected distance of the speaker from the microphone array, the distance between microphones (e.g., to avoid adapting the filter in frequencies at which spatial filtering will fail anyway, for example because of spatial aliasing), the geometry of the room, and/or the arrangement of the device within the room. For example, the input signals may not contain enough information over a particular range of frequencies (e.g., a high-frequency range) to support correct BSS learning over that range. In such case, it may be desirable to continue to use the initial (or otherwise most recent) filter coefficient values for this range without adaptation.

When a source is three to four meters or more away from the array, it is typical that very little high-frequency energy emitted by the source will reach the microphones. As little information may be available in the high-frequency range to properly support filter adaptation in such a case, it may be desirable to fix the filters in high frequencies and adapt them only in low frequencies.

Additionally or alternatively, the decision of which frequencies to adapt may change during runtime, according to factors such as the amount of energy currently available in a frequency band and/or the estimated distance of the current speaker from the microphone array, and may differ for different filters. For example, it may be desirable to adapt a filter at frequencies of up to two kHz (or three or five kHz) at one time, and to adapt the filter at frequencies of up to four kHz (or five, eight, or ten kHz) at another time. It is noted that it is not necessary for adjustment module AJM10 to adjust filter coefficient values that are fixed for a particular frequency and have already been adjusted (e.g., normalized), even though adjustment module AJM10 may continue to adjust coefficient values at other frequencies (e.g., in response to their adaptation by adaptation module APM10).

Filter bank BK10 applies the updated coefficient values (e.g., UV10 and UV20) to corresponding channels of the multi-channel signal. The updated coefficient values are the values of the corresponding rows of un-mixing matrix W (e.g., as adapted by adaptation module APM10), after adjustment as described herein (e.g., by adjustment module AJM10) except where such values have been fixed as described herein. Each updated set of coefficient values will typically describe multiple filters. For example, each updated set of coefficient values may describe a filter for each element of the corresponding row of unmixing matrix W.

In general, each estimated source direction (e.g., DA10 and/or DA20) may be measured, calculated, predicted, projected, and/or selected and may indicate a direction of arrival of sound from a desired source, an interfering source, or a reflection. Filter orientation module OM10 may be arranged to receive the estimated source directions from another module or device (e.g., from a source localization module). Such a module or device may be configured to produce the estimated source directions based on image information from a camera (e.g., by performing face and/or motion detection) and/or ranging information from ultrasound reflections. Such a module or device may also be configured to estimate the number of sources and/or to track one or more sources in motion. FIG. 19A shows a top view of one example of an arrangement of a four-microphone implementation R104 of array R100 with a camera CM10 that may be used to capture such image information.

Alternatively, apparatus A100 may be implemented to include a direction estimation module DM10 that is configured to calculate the estimated source directions (e.g., DA10 and DA20) based on information within multichannel signal MCS10 and/or information within the output signals produced by filter bank BK10. In such cases, direction estimation module DM10 may also be implemented to calculate the estimated source directions based on image and/or ranging information as described above. For example, direction estimation module DM10 may be implemented to estimate source DOA using a generalized cross-correlation (GCC) algorithm, or a beamformer algorithm, applied to multichannel signal MCS10.

Figure 20:
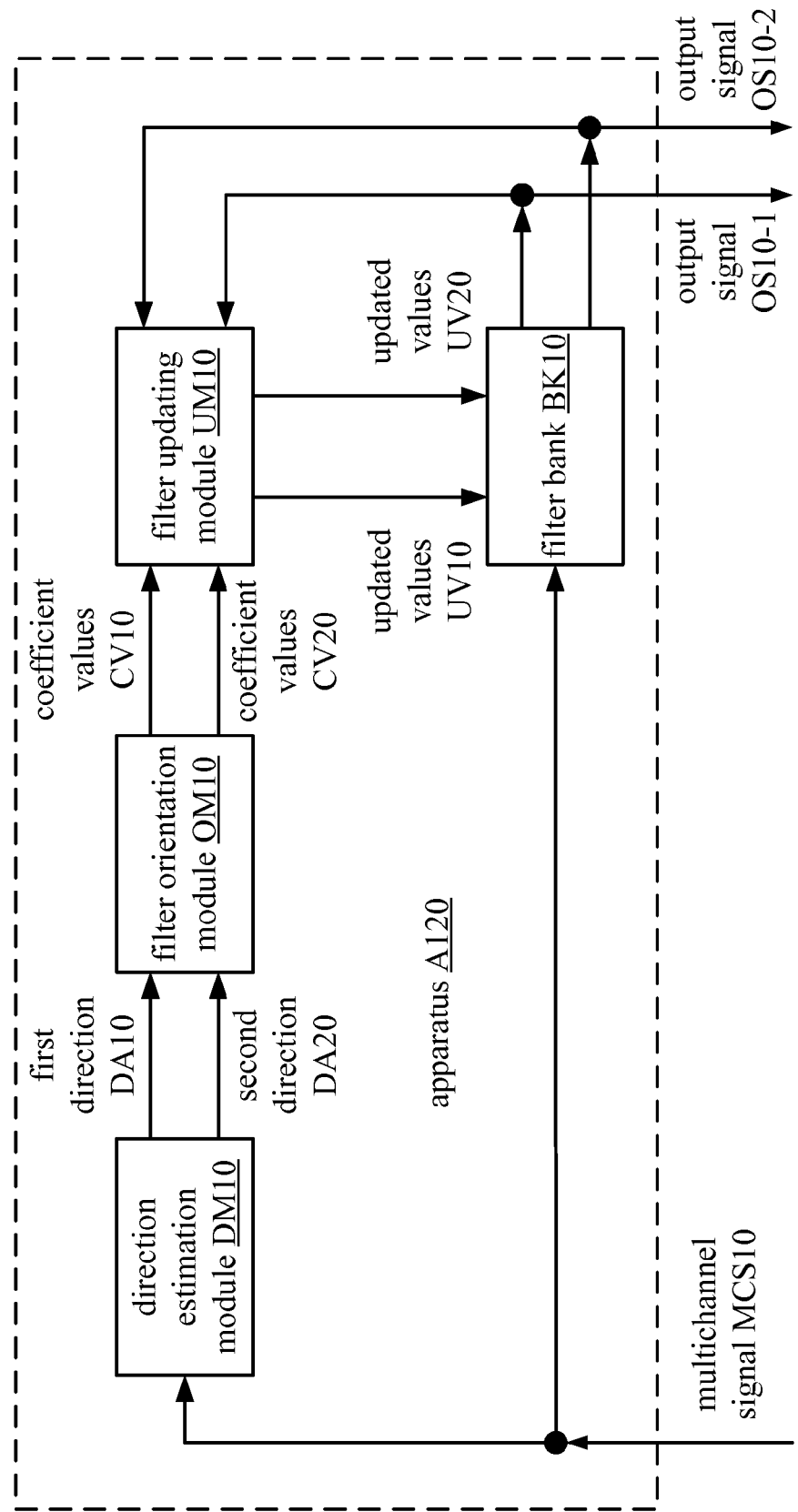
FIG. 20 shows a block diagram of an implementation A120 of apparatus A100.
Figure 21:
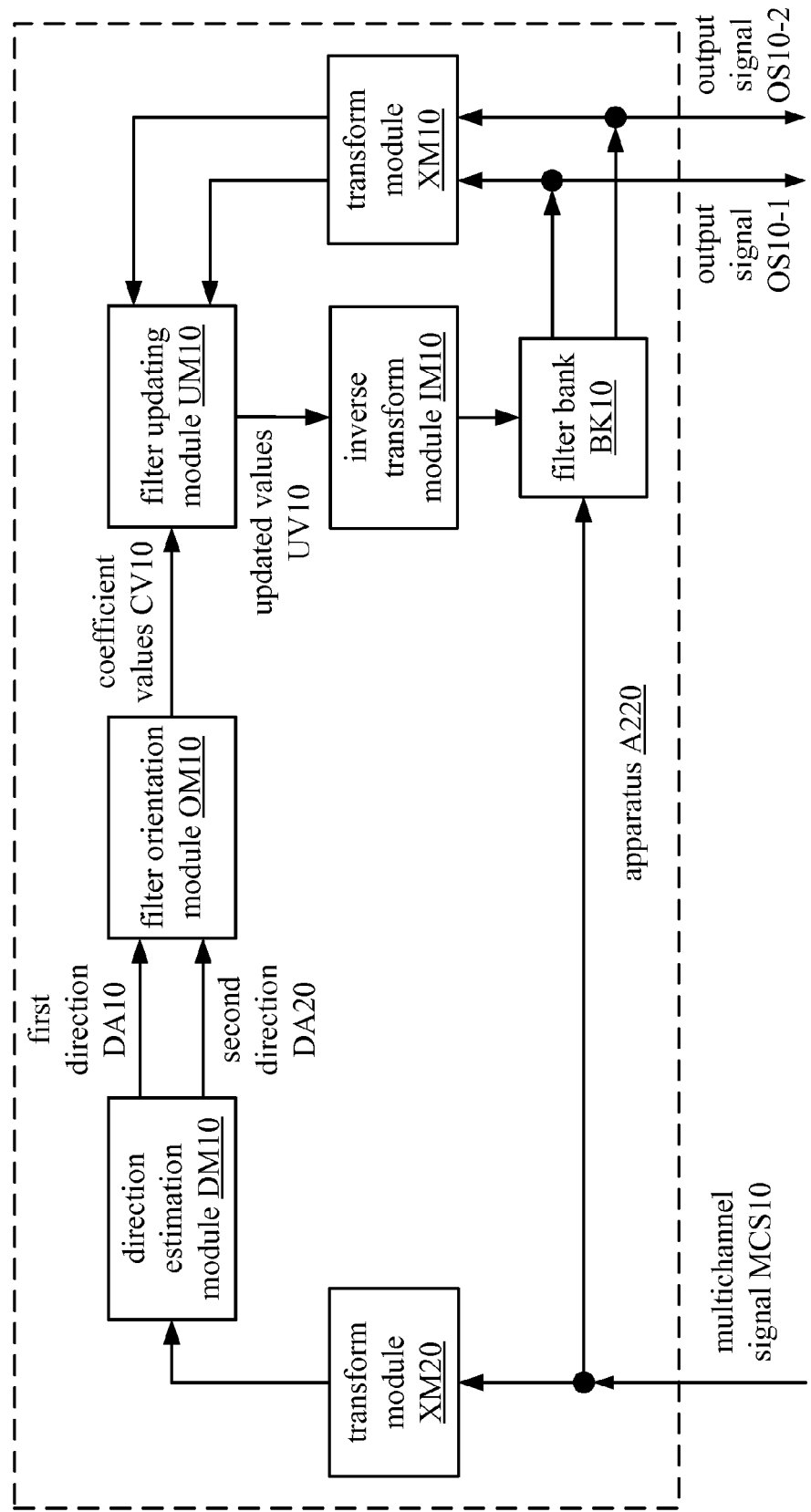
FIG. 21 shows a block diagram of an implementation A220 of apparatus A120 and A200.

FIG. 20 shows a block diagram of an implementation A120 of apparatus A100 that includes an instance of direction estimation module DM10 which is configured to calculate the estimated source directions DA10 and DA20 based on information within multichannel signal MCS10. In this case, direction estimation module DM10 and filter bank BK10 are implemented to operate in the same domain (e.g., to receive and process multichannel signal MCS10 as a frequency-domain signal). FIG. 21 shows a block diagram of an implementation A220 of apparatus A120 and A200 in which direction estimation module DM10 is arranged to receive the information from multichannel signal MCS10 in the frequency domain from a transform module XM20.

In one example, direction estimation module DM10 is implemented to calculate the estimated source directions, based on information within multichannel signal MCS10, using the steered response power using the phase transform (SRP-PHAT) algorithm. The SRP-PHAT algorithm, which follows from maximum likelihood source localization, determines the time delays at which a correlation of the output signals is maximum. The cross-correlation is normalized by the power in each bin, which gives a better robustness. In a reverberant environment, SRP-PHAT may be expected to provide better results than competing source localization methods.

The SRP-PHAT algorithm may be expressed in terms of received signal vector X (i.e., multichannel signal MCS10) in a frequency domain $$X(\omega)=[X_1(\omega),\ldots,X_P(\omega)]^T=S(\omega)G(\omega)+S(\omega)H(\omega)+N(\omega),$$

where S indicates the source signal vector and gain matrix G, room transfer function vector H, and noise vector N may be expressed as follows:

$$X(\omega)=[X_1(\omega),\ldots,X_P(\omega)]^T,$$

$$G(\omega)=[\alpha_1(\omega)e^{-j\omega\tau_1},\ldots,\alpha_P(\omega)e^{-j\omega\tau_P}]^T,$$

$$H(\omega)=[H_1(\omega),\ldots,H_P(\omega)]^T,$$

$$N(\omega)=[N_1(\omega),\ldots,N_P(\omega)]^T.$$

In these expressions, P denotes the number of sensors (i.e., the number of input channels), α denotes a gain factor, and τ denotes a time of propagation from the source.

In this example, the combined noise vector $N^c(\omega)=S(\omega)H(\omega)N(\omega)$ may be assumed to have the following zero-mean, frequency-independent, joint Gaussian distribution:

$$p(N^c(\omega))=\rho\exp\left\{-\frac{1}{2}[N^c(\omega)]^H Q^{-1}(\omega)N^c(\omega)\right\}.$$

where $Q(\omega)$ is the covariance matrix and ρ is a constant. The source direction may be estimated by maximizing the expression $$J_2=\int_\omega \frac{[G^H(\omega)Q^{-1}(\omega)X(\omega)]^H G^H(\omega)Q^{-1}(\omega)X(\omega)}{G^H(\omega)Q^{-1}(\omega)G(\omega)}d\omega.$$

Under the assumption that $N(\omega)=0$, this expression may be rewritten as $$J_2=\frac{1}{\gamma^P}\int\left|\sum_{i=1}^P \frac{X_i(\omega)e^{j\omega\tau_i}}{|X_i(\omega)|}\right|^2 d\omega, \quad (4)$$

where $0<\gamma<1$ is a design constant, and the time delay $\tau_i$ that maximizes the right-hand-side of expression (4) indicates the source direction of arrival.

FIG. 22 shows examples of plots resulting from using such an implementation of SRP-PHAT for DOA estimation for different two-source scenarios over a range of frequencies ω. In these plots, the y axis indicates the value of $$\left|\sum_{i=1}^P \frac{X_i(\omega)e^{j\omega\tau_i}}{|X_i(\omega)|}\right|^2$$

and the x axis indicates estimated source direction of arrival $\theta_i$ ($=\cos^{-1}(\tau_i c/d)$) relative to the array axis. In each plot, each line corresponds to a different frequency in the range, and each plot is symmetric around the endfire direction of the microphone array (i.e., θ=0). The top-left plot shows a histogram for two sources at a distance of four meters from the array. The top-right plot shows a histogram for two close sources at a distance of four meters from the array. The bottom-left plot shows a histogram for two sources at a distance of two-and-one-half meters from the array. The bottom-right plot shows a histogram for two close sources at a distance of two-and-one-half meters from the array. It may be seen that each of these plots indicates the estimated source direction as a range of angles which may be characterized by a center of gravity, rather than as a single peak across all frequencies.

In another example, direction estimation module DM10 is implemented to calculate the estimated source directions, based on information within multichannel signal MCS10, using a blind source separation (BSS) algorithm. A BSS method tends to generate reliable null beams to remove energy from interfering sources, and the directions of these null beams may be used to indicate the directions of arrival of the corresponding sources. Such an implementation of direction estimation module DM10 may be implemented to calculate the direction of arrival (DOA) of source i at frequency f, relative to the axis of an array of microphones j and j', according to an expression such as $$\hat{\theta}_{i,jj'}(f)=\cos^{-1}\left(\frac{\arg\left(\frac{[W^{-1}]_{ij}}{[W^{-1}]_{ij'}}\right)}{2\pi f c^{-1}\|p_j-p_{j'}\|}\right), \quad (5)$$

where W denotes the unmixing matrix and $p_j$ and $p_{j'}$ denote the spatial coordinates of microphones j and j', respectively. In this case, it may be desirable to implement the BSS filters (e.g., unmixing matrix W) of direction estimation module DM10 separately from the filters that are updated by filter updating module UM10 as described herein.

Figure 23:
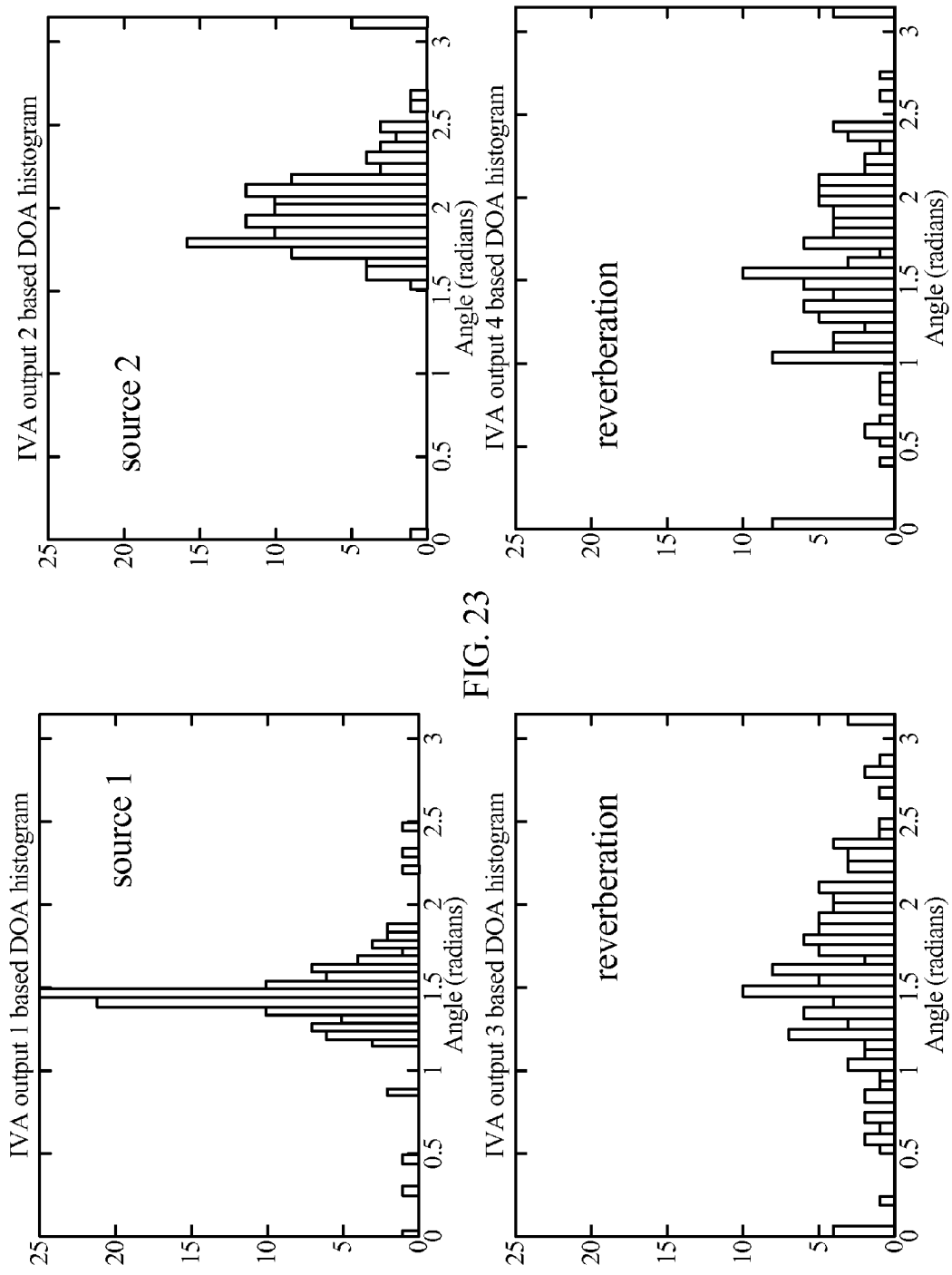
FIG. 23 shows an example of a set of four histograms for different output channels of an un-mixing matrix that is adapted using an IVA adaptation rule (source separation of 40-60 degrees).

FIG. 23 shows an example of a set of four histograms, each indicating the number of frequency bins that expression (5) maps to each incident angle (relative to the array axis) for a corresponding instance of a four-row unmixing matrix W, where W is based on information within multichannel signal MCS10 and is calculated by an implementation of direction estimation module DM10 according to an IVA adaptation rule as described herein. In this example, the input multichannel signal contains energy from two active sources that are separated by an angle of about 40 to 60 degrees. The top left plot shows the histogram for IVA output 1 (indicating the direction of source 1), and the top right plot shows the histogram for IVA output 2 (indicating the direction of source 2). It may be seen that each of these plots indicates the estimated source direction as a range of angles which may be characterized by a center of gravity, rather than as a single peak across all frequencies. The bottom plots show the histograms for IVA outputs 3 and 4, which block energy from both sources and contain energy from reverberation.

In another example, direction estimation module DM10 is implemented to calculate the estimated source directions based on phase differences between channels of multichannel signal MCS10 for each of a plurality of different frequency components. In the ideal case of a single point source in the far field (e.g., such that the assumption of plane wavefronts as shown in FIG. 19B is valid) and no reverberation, the ratio of phase difference to frequency is constant with respect to frequency. With reference to the model illustrated in FIG. 15B, such an implementation of direction estimation module DM10 may be configured to calculate the source direction $\theta_i$ as the inverse cosine (also called the arccosine) of the quantity $$\frac{c\Delta\varphi_i}{d2\pi f_i},$$

where c denotes the speed of sound (approximately 340 m/sec), d denotes the distance between the microphones, $\Delta\varphi_i$ denotes the difference in radians between the corresponding phase estimates for the two microphone channels, and $f_i$ is the frequency component to which the phase estimates correspond (e.g., the frequency of the corresponding FFT samples, or a center or edge frequency of the corresponding subbands).

Objection Depth Determination in Image

The following describes exemplary configurations for determining object depth information from the image. In the first configuration, a multi-camera image disparity technique is used to determine an estimated depth of an object in the image. In a second configuration, a single camera auto-focusing technique may be used to estimate object range in an image scene. The SIFT keypoint search can be made more robust by including estimated keypoint depth information.

Figure 24:
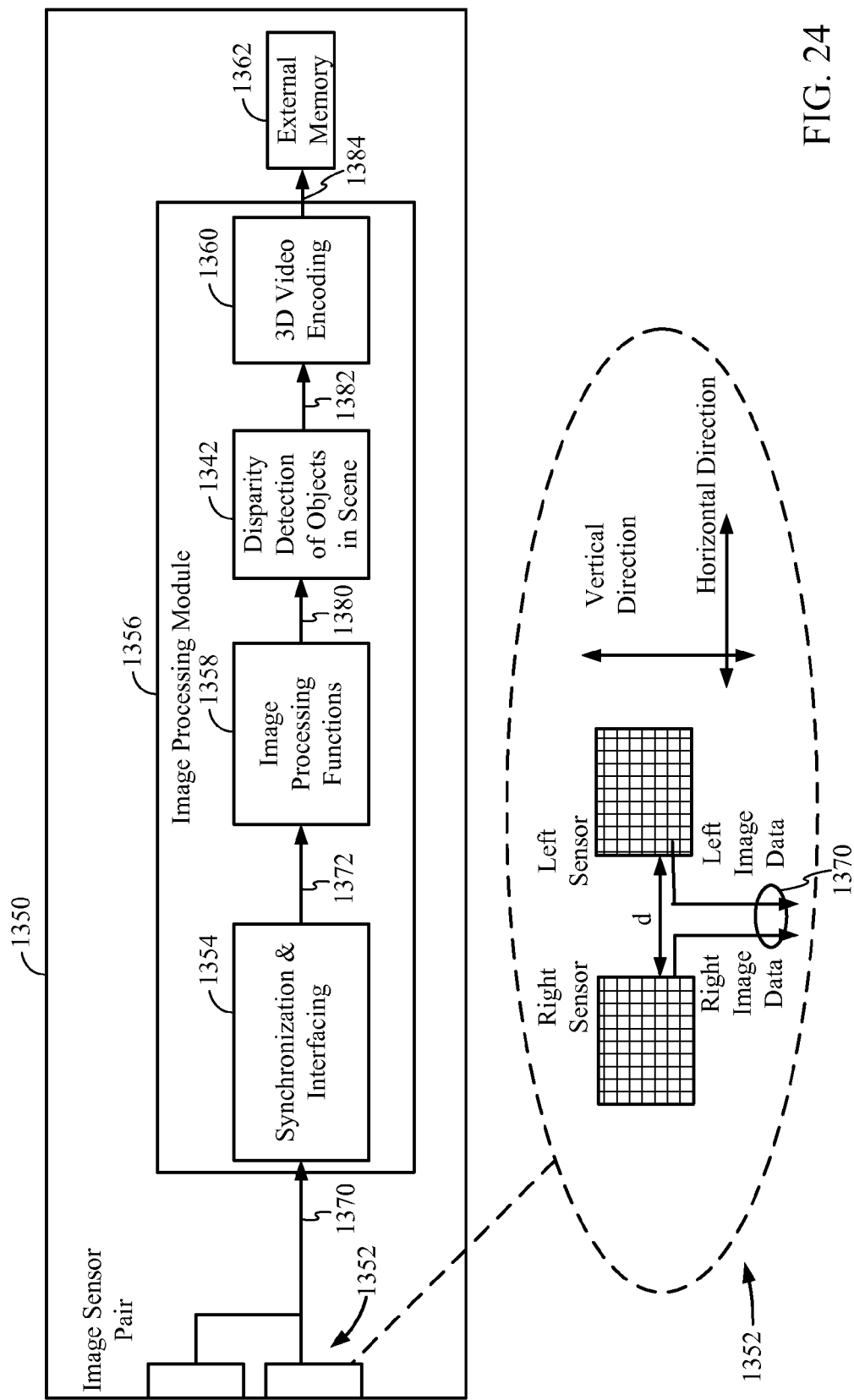
FIG. 24 is a diagram of an exemplary image capture device configured to detect disparity of objects in a scene during image or video capture.

FIG. 24 is a diagram of a particular configuration of an image capture device 1350 configured to detect disparity of objects in a scene during image or video capture. The image capture device 1350 includes an image sensor pair 1352 coupled to an image processing module 1356. The image processing module 1356 is coupled to an external memory 1362. The image processing module 1356 includes a synchronization and interfacing module 1354, an image processing functions module 1358, a disparity detection module 1342, and an encoding module 1360.

The image sensor pair 1352 is configured to provide image data 1370 to the image processing module 1356. The object depth determination may be performed using a first image and a second image that correspond to a single scene. The first image may correspond to a first image capture of the scene by a first sensor (e.g., the right sensor) and the second image may correspond to a second image capture of the scene by a second sensor (e.g., the left sensor), where the second image capture is substantially concurrent with the first image capture, such as by the sensor pair 1352 depicted in FIG. 24.

The synchronization and interfacing module 1354 is configured to provide data 1372 to the image processing functions module 1358. The image processing functions module 1358 is configured to provide processed image data 1380 to the disparity detection module 1342. The encoding module 1360 is configured to receive image/video data 1382 and to generate image/video data encoded with object depth data 1384.

The disparity detection module 1342 may be configured to determine disparity values corresponding to objects within a scene captured by the image sensor pair 1352. In a particular configuration, the disparity detection module 1342 incorporates scene-specific object detection or keypoint detection and disparity determination functionality.

The image sensor pair 1352 is illustrated in a representative view as a pair of sensors including a right sensor (i.e. a first sensor that captures the image that is associated with the scene perceived by a viewer's right eye) and a left sensor (i.e. a second sensor that captures the image that is associated with the scene perceived by a viewer's left eye). The image data 1370 includes left image data generated by the left sensor and right image data generated by the right sensor. Each sensor is illustrated as having rows of photo-sensitive components extending in a horizontal direction and columns of photo-sensitive components extending in a vertical direction. The left sensor and the right sensor are substantially aligned at a distance d from each other along a horizontal direction. As used herein, a "horizontal" direction within image data is a direction of displacement between a location of an object in the right image data and a location of the same object in the left image data.

Figure 25:
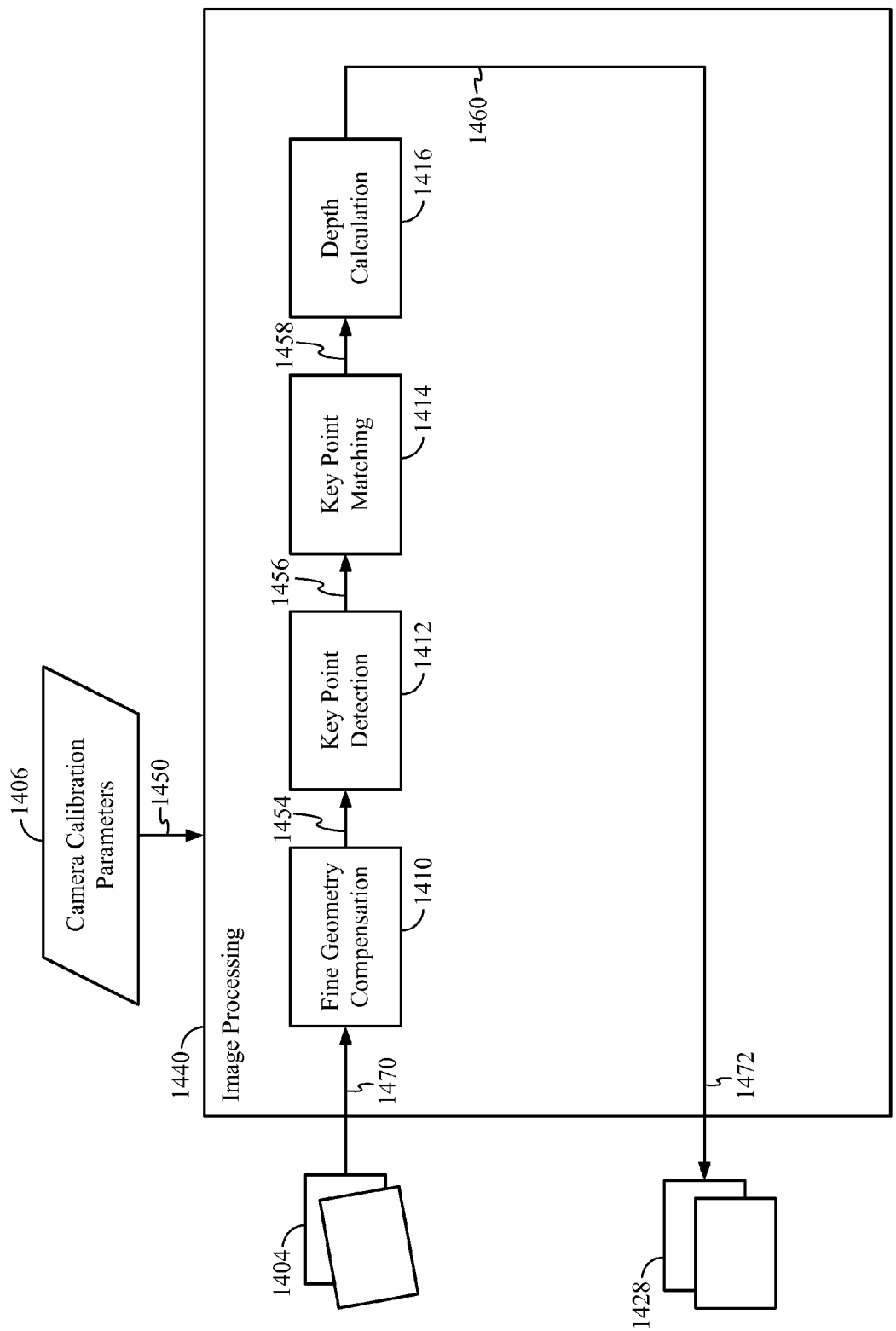
FIG. 25 is a block diagram of an exemplary image processing system that can be included in the device of FIG. 24.

FIG. 25 is a diagram of a particular embodiment of an image processing system 1440 that can be included in the system of FIG. 24. The processing system 1440 is configured to receive input image data 1404 and to generate output image data 1428. The processing system 1440 may be responsive to camera calibration parameters 1406 received via a calibration input 1450.

The image processing system 1440 includes a fine geometry compensation module 1410, a keypoint detection module 1412, a keypoint matching module 1414, and a depth calculation module 1416.

The geometry compensation module 1410 is configured to receive the input image data 1404 via a data path 1470 and to generate compensated image data 1454. The geometry compensation module 1410 may use data from the camera calibration parameters 1406 and may adjust the input image data 1404 to correct for misalignment, aberration, or other calibration conditions that may adversely impact rendering of the image data 1404. To illustrate, the geometry compensation module 1410 may effectively perform a resampling of the image data 1404 on an arbitrary grid to adjust for the calibration parameters 1406.

In a configuration where the processing system 1440 may be implemented in a computing device and the camera calibration parameters 1406 may be received with the input image data 1404, such as in a header of an image/video data file. In a configuration where the processing system 1440 is implemented in an image capture device, such as the image capture device 1350 of FIG. 24, the camera calibration parameters 1406 may correspond to an image sensor pair of the image capture device and may be stored in a memory accessible to the fine geometry compensation module 1410.

The keypoint detection module 1412 is configured to receive the compensated image data 1454 and to generate keypoint location data 1456. The keypoint detection module 1412 is configured to identify distinctive points in the compensated image data 1454. For example, the distinctive points may correspond to vertical edges of objects in a scene or other points of the scene having a high-frequency component in the horizontal direction. Although such distinctive elements in the image data are referred to herein as "keypoints" or "objects" it should be understood that such identified elements may correspond to individual pixels, groups of pixels, fractional pixel portions, other image components, or any combination thereof. For example, the keypoints may correspond to pixels with a sub-sampled luma component of received image data and may be detected using a vertical edge detection filter.

The keypoint matching module 1414 is configured to receive the keypoint location data 1454 and to generate disparity data 1458 corresponding to the identified keypoints. The keypoint matching module 1414 may be configured to search around the keypoints within a search range and produce reliability measures of disparity vectors.

The depth calculation module 1416 is configured to receive the disparity data 1458 and to range data 1460 indicating the estimated distance of a keypoint from the sensors 1352.

During operation of the processing system 1440, a range estimation process is performed. A calibration procedure designed to estimate and compensate the relative position between the two sensors that captured the image data 1404 may be performed off-line (e.g. prior to delivery to an end-user of the device), but the geometry compensation may be performed for every frame of the image data 1404.

Processing continues with keypoint detection (e.g. at the keypoint detection module 1412). A set of objects or pixels (keypoints) of the image are selected that can be used to reliably estimate disparities. A high confidence in the estimated disparity may be achieved, and not all regions or objects in the scene may be used. Selection of the set of keypoints may include image sub-sampling to produce appropriate resolution(s). An image high pass filter may be applied (e.g. only looking for horizontal frequencies, corresponding to vertical features), followed by taking a square or absolute value of a result generated by applying the filter. Results exceeding a predetermined threshold may be identified as potential keypoints. A keypoints pruning process may be performed to the potential keypoints to select the best keypoint within some local neighborhood (e.g. the keypoint corresponding to a largest filter result of all keypoints within a predetermined region).

Keypoint matching may be performed using the detected keypoints (e.g., at the keypoint matching module 1414). Correspondence between a keypoint in a first image (e.g. the left image or the right image) and the corresponding area in a second image (e.g. the other of the left image and the right image) may be determined. A reliability estimator may be produced, which together with keypoint selection may improve significantly the disparity estimation accuracy. Matching may be performed using a normalized cross-covariance to enable determination of how close the match is between the keypoints in the left image and the right image. A reliability measure may be based on the normalized cross-covariance. In a particular embodiment, a search range for locating a keypoint in a second image that corresponds to a keypoint in the first image is only horizontal because image compensation for sensor calibration has already been performed, and the search range is adjusted to only cover a certain range around the keypoint in the first image. The disparity values are calculated from these comparisons.

Figure 26B:
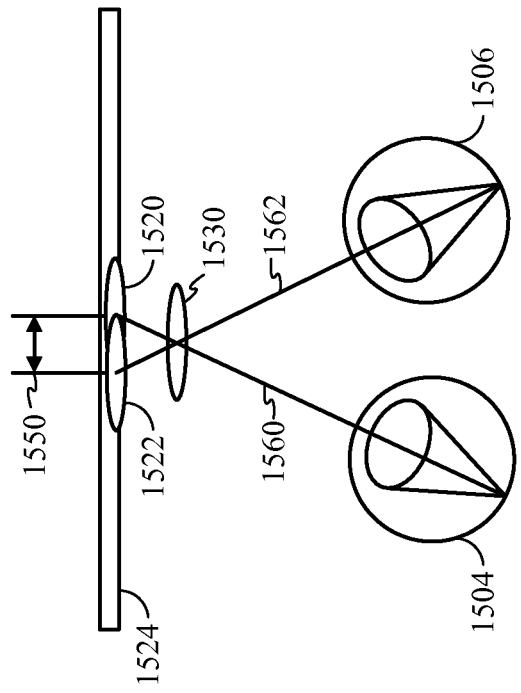
FIGS. 26A-B are diagrams of illustrative examples of object disparities correlated with perceived object depths.
Figure 26A:
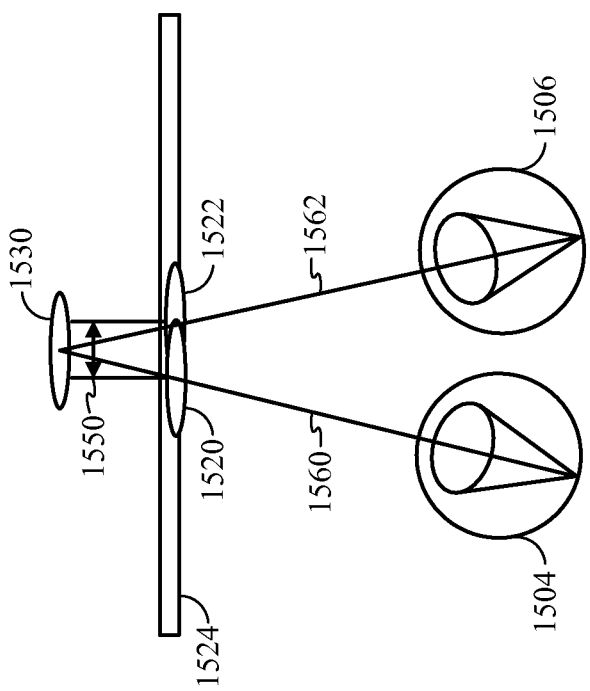

FIGS. 26A and 26B are diagrams of illustrative embodiments of object disparities correlated with perceived object depths. Object depth determination relies on directing different images to each eye 1504, 1506. The purpose is to recreate depth illusion from left and right (L/R) images, as object disparities (horizontal shift) are correlated with depths. FIG. 26A shows a positive disparity 1550 corresponding to an object 1530 perceived past a display surface 1524. The disparity 1550 indicates a distance between a location 1520 of the object in a left image and a location 1522 of the object in a right image. An observer will fuse the image of the object 1530 in the left image and the image of the object 1530 in the right image to perceive the object 1530 at an intersection of a line of sight 1560 of the left eye 1504 and a line of sight 1562 of the right eye 1506.

FIG. 26B shows a negative disparity 1550 corresponding to the object 1530 perceived in front of the display surface 1524. The disparity 1550 indicates a distance between a location 1520 of the object in a left image and a location 1522 of the object in a right image. An observer will fuse the image of the object 1530 in the left image and the image of the object 1530 in the right image to perceive the object 1530 in front of the display surface 1534 at an intersection of the line of sight 1560 of the left eye 1504 and the line of sight 1562 of the right eye 1506.

Object displacement as seen from the two eyes is interpreted by the visual cortex as depth. Disparity between two captured images will depend on the scene. Sensing the scene depth can be used to narrow the keypoint search in an image to only objects at or near a particular depth, thus increasing the reliability of object recognition.

Scene range estimation performed by the depth calculation module 602 may be generalized as sparse motion vectors estimation between the left and right images. The scene range estimation process can include key (distinctive) point identification. Vertical variations are not needed since only horizontal shift is present (and will be measured). Horizontal variations (edges with some vertical component) are used. In some configurations, keypoints may be detected at different resolutions. The object range estimation process can also include keypoint matching. Keypoint matching may be performed using normalized cross-covariance in order to be light-level independent and to produce a robust disparity reliability metric. As a result, matching keypoints with different resolutions may be unnecessary.

Audio Scene Decomposition

The acoustic decomposition subsystem 22 can employ the techniques describe in this section to decompose audio signals recorded from the scene. Disclosed herein is the decomposition of an audio signal using a basis function inventory and a sparse recovery technique, wherein the basis function inventory includes information relating to the changes in the spectrum of a musical note over the pendency of the note. Such decomposition may be used to support analysis, encoding, reproduction, and/or synthesis of the signal. Examples of quantitative analyses of audio signals that include mixtures of sounds from harmonic (i.e., non-percussive) and percussive instruments are shown herein.

The disclosed techniques may be configured to process the captured audio signal as a series of segments. Typical segment lengths range from about five or ten milliseconds to about forty or fifty milliseconds, and the segments may be overlapping (e.g., with adjacent segments overlapping by 25% or 50%) or non-overlapping. In one particular example, the signal is divided into a series of non-overlapping segments or "frames", each having a length of ten milliseconds. A segment as processed by such a method may also be a segment (i.e., a "subframe") of a larger segment as processed by a different operation, or vice versa.

It may be desirable to decompose music scenes to extract individual note/pitch profiles from a mixture of two or more instrument and/or vocal signals. Potential use cases include taping concert/video game scenes with multiple microphones, decomposing musical instruments and vocals with spatial/sparse recovery processing, extracting pitch/note profiles, partially or completely up-mixing individual sources with corrected pitch/note profiles. Such operations may be used to extend the capabilities of music applications (e.g., Qualcomm's QUSIC application, video games such as Rock Band or Guitar Hero) to multi-player/singer scenarios.

It may be desirable to enable a music application to process a scenario in which more than one vocalist is active and/or multiple instruments are played at the same time (e.g., as shown in FIG. 34). Such capability may be desirable to support a realistic music-taping scenario (multi-pitch scene). Although a user may want the ability to edit and re-synthesize each source separately, producing the sound track may entail recording the sources at the same time.

This disclosure describes methods that may be used to enable a use case for a music application in which multiple sound sources may be active at the same time. Such a method may be configured to analyze an audio mixture signal using basis-function inventory-based sparse recovery (e.g., sparse decomposition) techniques.

It may be desirable to decompose mixture signal spectra into source components by finding the sparsest vector of activation coefficients (e.g., using efficient sparse recovery algorithms) for a set of basis functions. The set of basis functions can be reduced to specific types of instruments indicated as being present in the scene by the image/video processing block 54 of FIG. 2. The activation coefficient vector may be used (e.g., with the set of basis functions) to reconstruct the mixture signal or to reconstruct a selected part (e.g., from one or more selected instruments) of the mixture signal. It may also be desirable to post-process the sparse coefficient vector (e.g., according to magnitude and time support).

FIG. 27A shows a flowchart for a method M100 of decomposing an audio signal. Method M100 includes a task T100 that calculates, based on information from a frame of the audio signal, a corresponding signal representation over a range of frequencies. Method M100 also includes a task T200 that calculates a vector of activation coefficients, based on the signal representation calculated by task T100 and on a plurality of basis functions, in which each of the activation coefficients corresponds to a different one of the plurality of basis functions.

Task T100 may be implemented to calculate the signal representation as a frequency-domain vector. Each element of such a vector may indicate the energy of a corresponding one of a set of subbands, which may be obtained according to a mel or Bark scale. However, such a vector is typically calculated using a discrete Fourier transform (DFT), such as a fast Fourier transform (FFT), or a short-time Fourier transform (STFT). Such a vector may have a length of, for example, 64, 128, 256, 512, or 1024 bins. In one example, the audio signal has a sampling rate of eight kHz, and the 0-4 kHz band is represented by a frequency-domain vector of 256 bins for each frame of length 32 milliseconds. In another example, the signal representation is calculated using a modified discrete cosine transform (MDCT) over overlapping segments of the audio signal.

In a further example, task T100 is implemented to calculate the signal representation as a vector of cepstral coefficients (e.g., mel-frequency cepstral coefficients or MFCCs) that represents the short-term power spectrum of the frame. In this case, task T100 may be implemented to calculate such a vector by applying a mel-scale filter bank to the magnitude of a DFT frequency-domain vector of the frame, taking the logarithm of the filter outputs, and taking a DCT of the logarithmic values. Such a procedure is described, for example, in the Aurora standard described in ETSI document ES 201 108, entitled "STQ: DSR—Front-endfeature extraction algorithm; compression algorithm" (European Telecommunications Standards Institute, 2000).

Musical instruments typically have well-defined timbres. The timbre of an instrument may be described by its spectral envelope (e.g., the distribution of energy over a range of frequencies), such that a range of timbres of different musical instruments may be modeled using an inventory of basis functions that encode the spectral envelopes of the individual instruments.

Each basis function comprises a corresponding signal representation over a range of frequencies. It may be desirable for each of these signal representations to have the same form as the signal representation calculated by task T100. For example, each basis function may be a frequency-domain vector of length 64, 128, 256, 512, or 1024 bins. Alternatively, each basis function may be a cepstral-domain vector, such as a vector of MFCCs. In a further example, each basis function is a wavelet-domain vector.

The basis function inventory A may include a set $A_n$ of basis functions for each instrument n (e.g., piano, flute, guitar, drums, etc.). For example, the timbre of an instrument is generally pitch-dependent, such that the set $A_n$ of basis functions for each instrument n will typically include at least one basis function for each pitch over some desired pitch range, which may vary from one instrument to another. A set of basis functions that corresponds to an instrument tuned to the chromatic scale, for example, may include a different basis function for each of the twelve pitches per octave. The set of basis functions for a piano may include a different basis function for each key of the piano, for a total of eighty-eight basis functions. In another example, the set of basis functions for each instrument includes a different basis function for each pitch in a desired pitch range, such as five octaves (e.g., 56 pitches) or six octaves (e.g., 67 pitches). These sets $A_n$ of basis functions may be disjoint, or two or more sets may share one or more basis functions.

Each basis function of a set may encode a timbre of the instrument at a different corresponding pitch. In the context of a musical signal, a human voice may be considered as a musical instrument, such that the inventory may include a set of basis functions for each of one or more human voice models.

The inventory of basis functions may be based on a generic musical instrument pitch database, learned from an ad hoc recorded individual instrument recording, and/or based on separated streams of mixtures (e.g., using a separation scheme such as independent component analysis (ICA), expectation-maximization (EM), etc.).

The selection of a set of basis functions for processing audio may be based on the list of instrument candidates provided by the image/video processing block 54 of FIG. 2. For example, the set of basis functions may be limited to only those instruments identified in the scene by the objection recognition processes of the image/video processing block 54.

Figure 32:
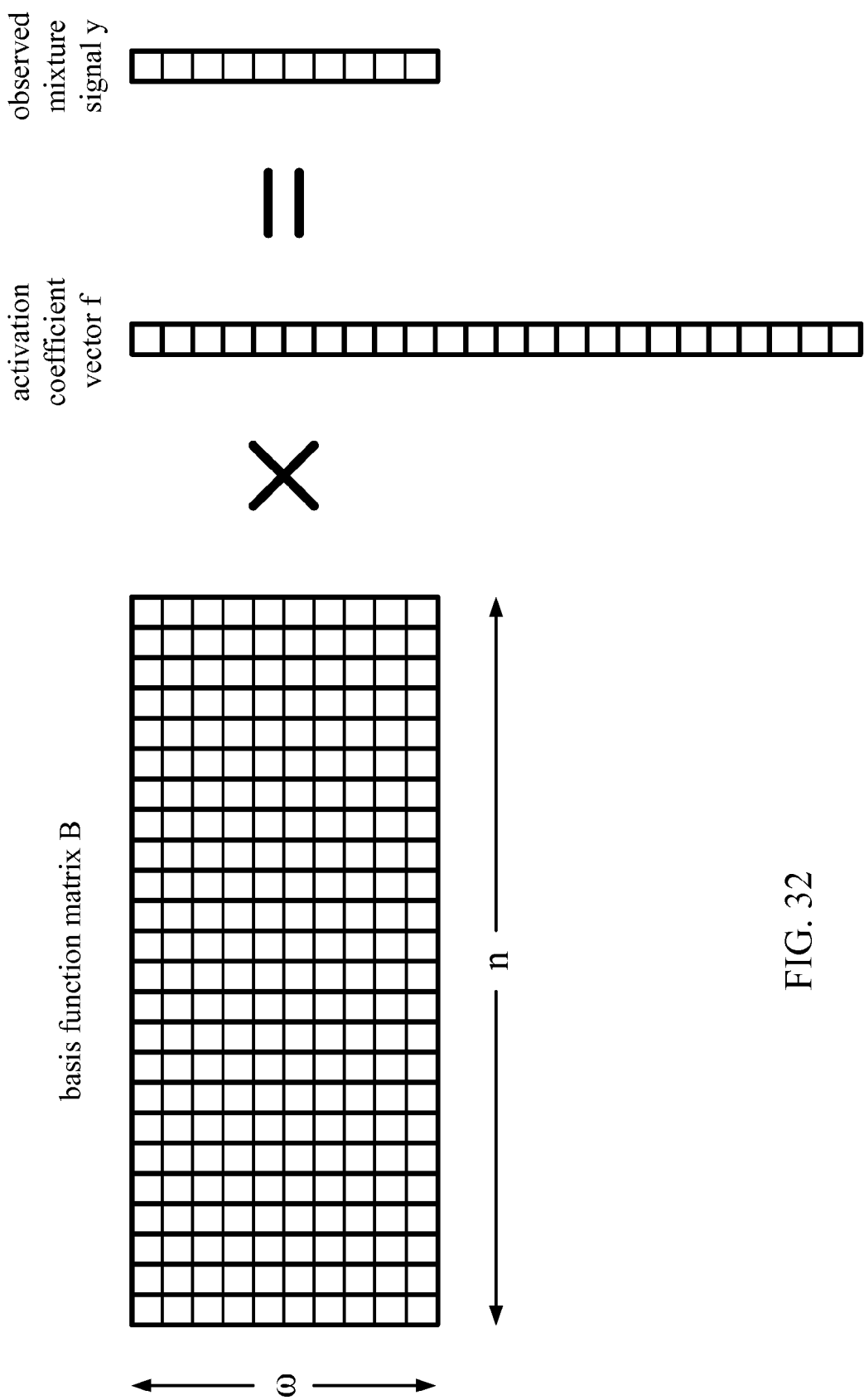
FIG. 32 illustrates a model Bf=y.

Based on the signal representation calculated by task T100 and on a plurality B of basis functions from the inventory A, task T200 calculates a vector of activation coefficients. Each coefficient of this vector corresponds to a different one of the plurality B of basis functions. For example, task T200 may be configured to calculate the vector such that it indicates the most probable model for the signal representation, according to the plurality B of basis functions. FIG. 32 illustrates such a model Bf=y in which the plurality B of basis functions is a matrix such that the columns of B are the individual basis functions, f is a column vector of basis function activation coefficients, and y is a column vector of a frame of the recorded mixture signal (e.g., a five-, ten-, or twenty-millisecond frame, in the form of a spectrogram frequency vector).

Task T200 may be configured to recover the activation coefficient vector for each frame of the audio signal by solving a linear programming problem. Examples of methods that may be used to solve such a problem include nonnegative matrix factorization (NNMF). A single-channel reference method that is based on NNMF may be configured to use expectation-maximization (EM) update rules (e.g., as described below) to compute basis functions and activation coefficients at the same time.

It may be desirable to decompose the audio mixture signal into individual instruments (which may include one or more human voices) by finding the sparsest activation coefficient vector in a known or partially known basis function space. For example, task T200 may be configured to use a set of known instrument basis functions to decompose an input signal representation into source components (e.g., one or more individual instruments) by finding the sparsest activation coefficient vector in the basis function inventory (e.g., using efficient sparse recovery algorithms).

It is known that the minimum L1-norm solution to an underdetermined system of linear equations (i.e., a system having more unknowns than equations) is often also the sparsest solution to that system. Sparse recovery via minimization of the L1-norm may be performed as follows.

We assume that our target vector $f_0$ is a sparse vector of length N having K<N nonzero entries (i.e., is "K-sparse") and that projection matrix (i.e., basis function matrix) A is incoherent (random-like) for a set of size ~K. We observe the signal $y=Af_o$. Then solving $$\min_{f} \|f\|_{l_2}$$

subject to Af=y (where $\|f\|_i$ is defined as $$\sum_{i=1}^{n} |f_i|$$

will recover $f_0$ exactly. Moreover, we can recover $f_0$ from M≥K·log N incoherent measurements by solving a tractable program. The number of measurements M is approximately equal to the number of active components.

One approach is to use sparse recovery algorithms from compressive sensing. In one example of compressive sensing (also called "compressed sensing") signal recovery $\Phi x=y$, y is an observed signal vector of length M, x is a sparse vector of length N having K<N nonzero entries (i.e., a "K-sparse model") that is a condensed representation of y, and $\Phi$ is a random projection matrix of size M×N. The random projection $\Phi$ is not full rank, but it is invertible for sparse/compressible signal models with high probability (i.e., it solves an ill-posed inverse problem).

The activation coefficient vector f may be considered to include a subvector $f_n$ for each instrument n that includes the activation coefficients for the corresponding basis function set $A_n$. These instrument-specific activation subvectors may be processed independently (e.g., in a post-processing operation). For example, it may be desirable to enforce one or more sparsity constraints (e.g., at least half of the vector elements are zero, the number of nonzero elements in an instrument-specific subvector does not exceed a maximum value, etc.). Processing of the activation coefficient vector may include encoding the index number of each non-zero activation coefficient for each frame, encoding the index and value of each non-zero activation coefficient, or encoding the entire sparse vector. Such information may be used (e.g., at another time and/or location) to reproduce the mixture signal using the indicated active basis functions, or to reproduce only a particular part of the mixture signal (e.g., only the notes played by a particular instrument).

An audio signal produced by a musical instrument may be modeled as a series of events called notes. The sound of a harmonic instrument playing a note may be divided into different regions over time: for example, an onset stage (also called attack), a stationary stage (also called sustain), and an offset stage (also called release). Another description of the temporal envelope of a note (ADSR) includes an additional decay stage between attack and sustain. In this context, the duration of a note may be defined as the interval from the start of the attack stage to the end of the release stage (or to another event that terminates the note, such as the start of another note on the same string). A note is assumed to have a single pitch, although the inventory may also be implemented to model notes having a single attack and multiple pitches (e.g., as produced by a pitch-bending effect, such as vibrato or portamento). Some instruments (e.g., a piano, guitar, or harp) may produce more than one note at a time in an event called a chord.

Notes produced by different instruments may have similar timbres during the sustain stage, such that it may be difficult to identify which instrument is playing during such a period. The timbre of a note may be expected to vary from one stage to another, however. For example, identifying an active instrument may be easier during an attack or release stage than during a sustain stage.

To increase the likelihood that the activation coefficient vector will indicate an appropriate basis function, it may be desirable to maximize differences between the basis functions. For example, it may be desirable for a basis function to include information relating to changes in the spectrum of a note over time.

It may be desirable to select a basis function based on a change in timbre over time. Such an approach may include encoding information relating to such time-domain evolution of the timbre of a note into the basis function inventory. For example, the set $A_n$ of basis functions for a particular instrument n may include two or more corresponding signal representations at each pitch, such that each of these signal representations corresponds to a different time in the evolution of the note (e.g., one for attack stage, one for sustain stage, and one for release stage). These basis functions may be extracted from corresponding frames of a recording of the instrument playing the note.

FIG. 27C shows a block diagram for an apparatus MF100 for decomposing an audio signal according to a general configuration. Apparatus MF100 includes means F100 for calculating, based on information from a frame of the audio signal, a corresponding signal representation over a range of frequencies (e.g., as described herein with reference to task T100). Apparatus MF100 also includes means F200 for calculating a vector of activation coefficients, based on the signal representation calculated by means F100 and on a plurality of basis functions, in which each of the activation coefficients corresponds to a different one of the plurality of basis functions (e.g., as described herein with reference to task T200).

FIG. 27D shows a block diagram for an apparatus A100 for decomposing an audio signal according to another general configuration that includes transform module 2100 and coefficient vector calculator 2200. Transform module 2100 is configured to calculate, based on information from a frame of the audio signal, a corresponding signal representation over a range of frequencies (e.g., as described herein with reference to task T100). Coefficient vector calculator 2200 is configured to calculate a vector of activation coefficients, based on the signal representation calculated by transform module 2100 and on a plurality of basis functions, in which each of the activation coefficients corresponds to a different one of the plurality of basis functions (e.g., as described herein with reference to task T200).

FIG. 27B shows a flowchart of an implementation M200 of method M100 in which the basis function inventory includes multiple signal representations for each instrument at each pitch. Each of these multiple signal representations describes a plurality of different distributions of energy (e.g., a plurality of different timbres) over the range of frequencies. The inventory may also be configured to include different multiple signal representations for different time-related modalities. In one such example, the inventory includes multiple signal representations for a string being bowed at each pitch and different multiple signal representations for the string being plucked (e.g., pizzicato) at each pitch.

Figure 33:
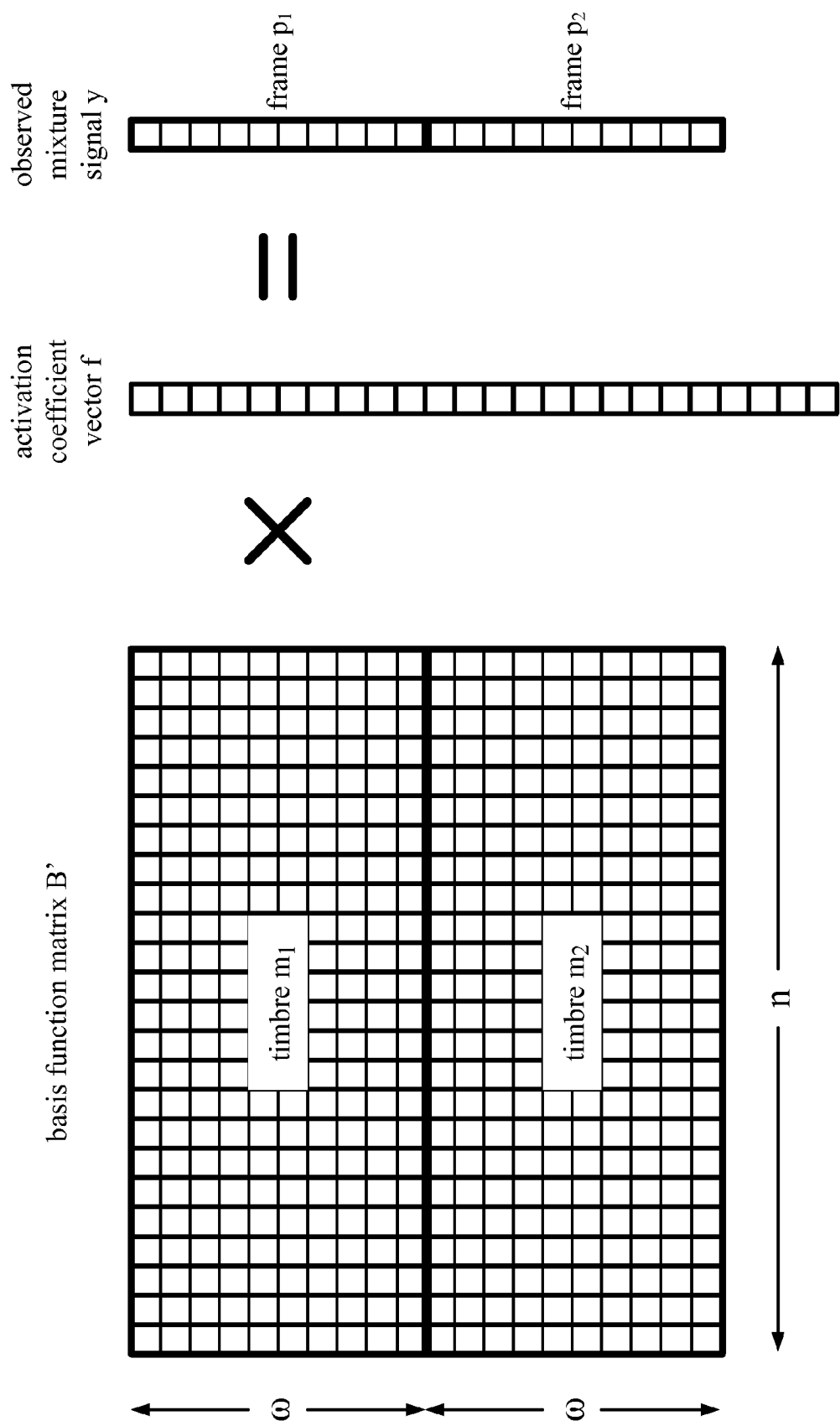
FIG. 33 illustrates a modification B'f=y of the model of FIG. 32.

Method M200 includes multiple instances of task T100 (in this example, tasks T100A and T100B), wherein each instance calculates, based on information from a corresponding different frame of the audio signal, a corresponding signal representation over a range of frequencies. The various signal representations may be concatenated, and likewise each basis function may be a concatenation of multiple signal representations. In this example, task T200 matches the concatenation of mixture frames against the concatenations of the signal representations at each pitch. FIG. 33 shows an example of a modification B'f=y of the model Bf=y of FIG. 32 in which frames p1, p2 of the mixture signal y are concatenated for matching.

The inventory may be constructed such that the multiple signal representations at each pitch are taken from consecutive frames of a training signal. In other implementations, it may be desirable for the multiple signal representations at each pitch to span a larger window in time (e.g., to include frames that are separated in time rather than consecutive). For example, it may be desirable for the multiple signal representations at each pitch to include signal representations from at least two among an attack stage, a sustain stage, and a release stage. By including more information regarding the time-domain evolution of the note, the difference between the sets of basis functions for different notes may be increased.

Figure 28B:
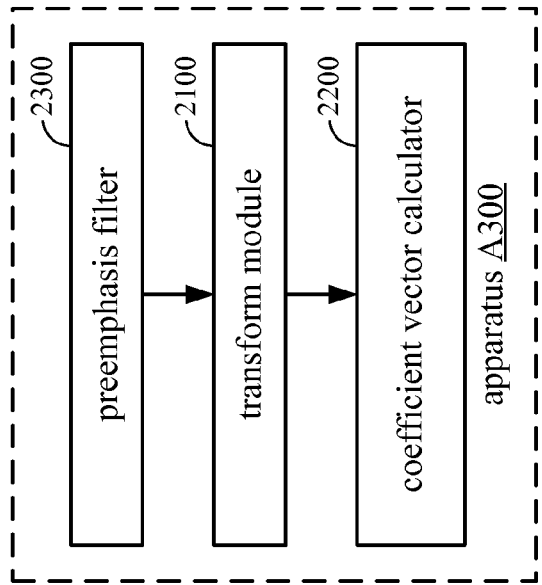
FIG. 28B shows a block diagram of an implementation A300 of apparatus A100.
Figure 28C:
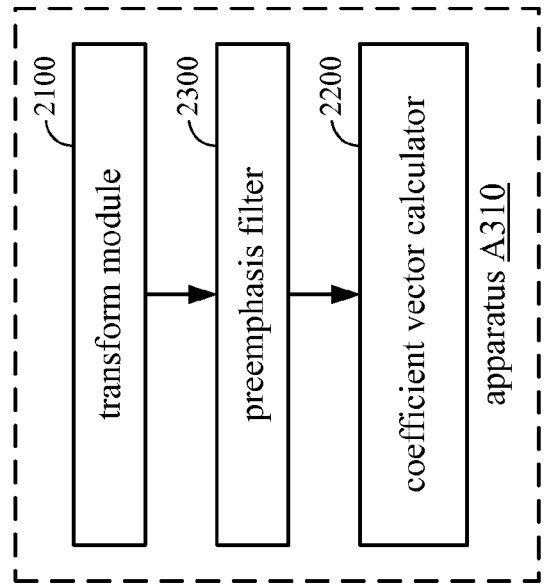
FIG. 28C shows a block diagram of another implementation A310 of apparatus A100.
Figure 28A:
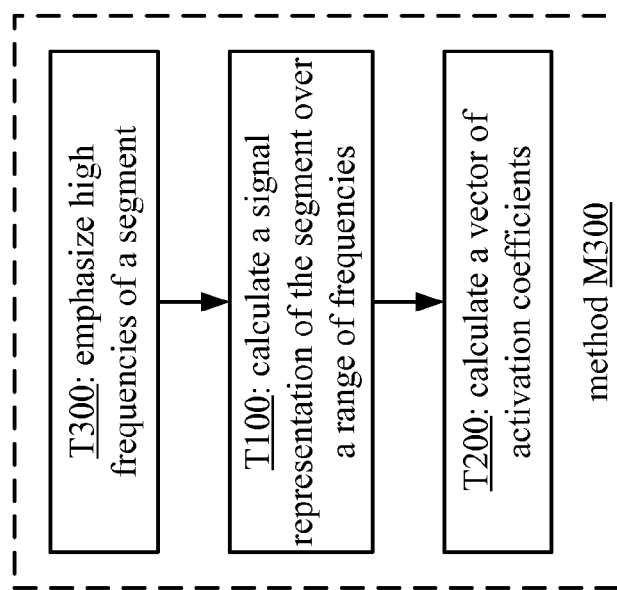
FIG. 28A shows a flowchart of an implementation M300 of method M100.

FIG. 28A shows a flowchart of an implementation M300 of method M100 that includes a task T300 which emphasizes high frequencies of the segment. In this example, task T100 is arranged to calculate the signal representation of the segment after preemphasis. FIG. 29A shows a flowchart of an implementation M400 of method M200 that includes multiple instances T300A, T300B of task T300. In one example, preemphasis task T300 increases the ratio of energy above 200 Hz to total energy.

FIG. 28B shows a block diagram of an implementation A300 of apparatus A100 that includes a preemphasis filter 2300 (e.g., a highpass filter, such as a first-order highpass filter) that is arranged to perform high-frequency emphasis on the audio signal upstream of transform module 2100. FIG. 28C shows a block diagram of another implementation A310 of apparatus A100 in which preemphasis filter 2300 is arranged to perform high-frequency preemphasis on the transform coefficients. In these cases, it may also be desirable to perform high-frequency pre-emphasis (e.g., highpass filtering) on the plurality B of basis functions.

A musical note may include coloration effects, such as vibrato and/or tremolo. Vibrato is a frequency modulation, with a modulation rate that is typically in a range of from four or five to seven, eight, ten, or twelve Hertz. A pitch change due to vibrato may vary between 0.6 to two semitones for singers, and is generally less than +/−0.5 semitone for wind and string instruments (e.g., between 0.2 and 0.35 semitones for string instruments). Tremolo is an amplitude modulation typically having a similar modulation rate.

It may be difficult to model such effects in the basis function inventory. It may be desirable to detect the presence of such effects. For example, the presence of vibrato may be indicated by a frequency-domain peak in the range of 4-8 Hz. It may also be desirable to record a measure of the level of the detected effect (e.g., as the energy of this peak), as such a characteristic may be used to restore the effect during reproduction. Similar processing may be performed in the time domain for tremolo detection and quantification. Once the effect has been detected and possibly quantified, it may be desirable to remove the modulation by smoothing the frequency over time for vibrato or by smoothing the amplitude over time for tremolo.

FIG. 30B shows a block diagram of an implementation A700 of apparatus A100 that includes a modulation level calculator (MLC). The MLC is configured to calculate, and possibly to record, a measure of a detected modulation (e.g., an energy of a detected modulation peak in the time or frequency domain) in a segment of the audio signal as described above.

This disclosure describes methods that may be used to enable a use case for a music application in which multiple sources may be active at the same time. In such case, it may be desirable to separate the sources, if possible, before calculating the activation coefficient vector. To achieve this goal, a combination of multi- and single-channel techniques is proposed.

FIG. 29B shows a flowchart of an implementation M500 of method M100 that includes a task T500 which separates the signal into spatial clusters. Task T500 may be configured to isolate the sources into as many spatial clusters as possible. In one example, task T500 uses multi-microphone processing to separate the recorded acoustic scenario into as many spatial clusters as possible. Such processing may be based on gain differences and/or phase differences between the microphone signals, where such differences may be evaluated across an entire frequency band or at each of a plurality of different frequency subbands or frequency bins.

Spatial separation methods alone may be insufficient to achieve a desired level of separation. For example, some sources may be too close or otherwise sub-optimally arranged with respect to the microphone array (e.g. multiple violinists and/or harmonic instruments may be located in one corner; percussionists are usually located in the back). In a typical music-band scenario, sources may be located close together or even behind other sources (e.g., as shown in FIG. 34), such that using spatial information alone to process a signal captured by an array of microphones that are in the same general direction to the band may fail to discriminate all of the sources from one another. Tasks T100 and T200 may analyze the individual spatial clusters using single-channel, basis-function inventory-based sparse recovery (e.g., sparse decomposition) techniques as described herein to separate the individual instruments (e.g., as shown in FIG. 34).

For computational tractability, it may be desirable for the plurality B of basis functions to be considerably smaller than the inventory A of basis functions. It may be desirable to narrow down the inventory for a given separation task, starting from a large inventory. The selection of a set of basis functions B may be reduced based on the visual recognition of instruments in a recorded scene. For example, the B basis functions may be limited to those corresponding to the list of instrument candidates provided by the image/video processing block 54 of FIG. 2 or those identified by the system 500 of FIG. 6.

In another example, such a reduction may also be performed by determining whether a segment includes sound from percussive instruments or sound from harmonic instruments, and selecting an appropriate plurality B of basis functions from the inventory for matching. Percussive instruments tend to have impulse-like spectrograms (e.g., vertical lines) as opposed to horizontal lines for harmonic sounds.

A harmonic instrument may typically be characterized in the spectrogram by a certain fundamental pitch and associated timbre, and a corresponding higher-frequency extension of this harmonic pattern. Consequently, in another example it may be desirable to reduce the computational task by only analyzing lower octaves of these spectra, as their higher frequency replica may be predicted based on the low-frequency ones. After matching, the active basis functions may be extrapolated to higher frequencies and subtracted from the mixture signal to obtain a residual signal that may be encoded and/or further decomposed.

Such a reduction may also be performed through user selection in a graphical user interface and/or by pre-classification of most likely instruments and/or pitches based on a first sparse recovery run or maximum likelihood fit. For example, a first run of the sparse recovery operation may be performed to obtain a first set of recovered sparse coefficients, and based on this first set, the applicable note basis functions may be narrowed down for another run of the sparse recovery operation.

One reduction approach includes detecting the presence of certain instrument notes by measuring sparsity scores in certain pitch intervals. Such an approach may include refining the spectral shape of one or more basis functions, based on initial pitch estimates, and using the refined basis functions as the plurality B in method M100.

A reduction approach may be configured to identify pitches by measuring sparsity scores of the music signal projected into corresponding basis functions. Given the best pitch scores, the amplitude shapes of basis functions may be optimized to identify instrument notes. The reduced set of active basis functions may then be used as the plurality B in method M100.

FIG. 30A shows a flowchart for an implementation M600 of method M100 that includes a first-run inventory reduction of basis functions. Method M600 includes a task T600 that calculates a signal representation of a segment in a nonlinear frequency domain (e.g., in which the frequency distance between adjacent elements increases with frequency, as in a mel or Bark scale). In one example, task T600 is configured to calculate the nonlinear signal representation using a constant-Q transform. Method M600 also includes a task T700 that calculates a second vector of activation coefficients, based on the nonlinear signal representation and on a plurality of similarly nonlinear basis functions. Based on information from the second activation coefficient vector (e.g., from the identities of the activated basis functions, which may indicate an active pitch range), task T800 selects the plurality B of basis functions for use in task T200. It is expressly noted that methods M200, M300, and M400 may also be implemented to include such tasks T600, T700, and T800.

Figure 31:
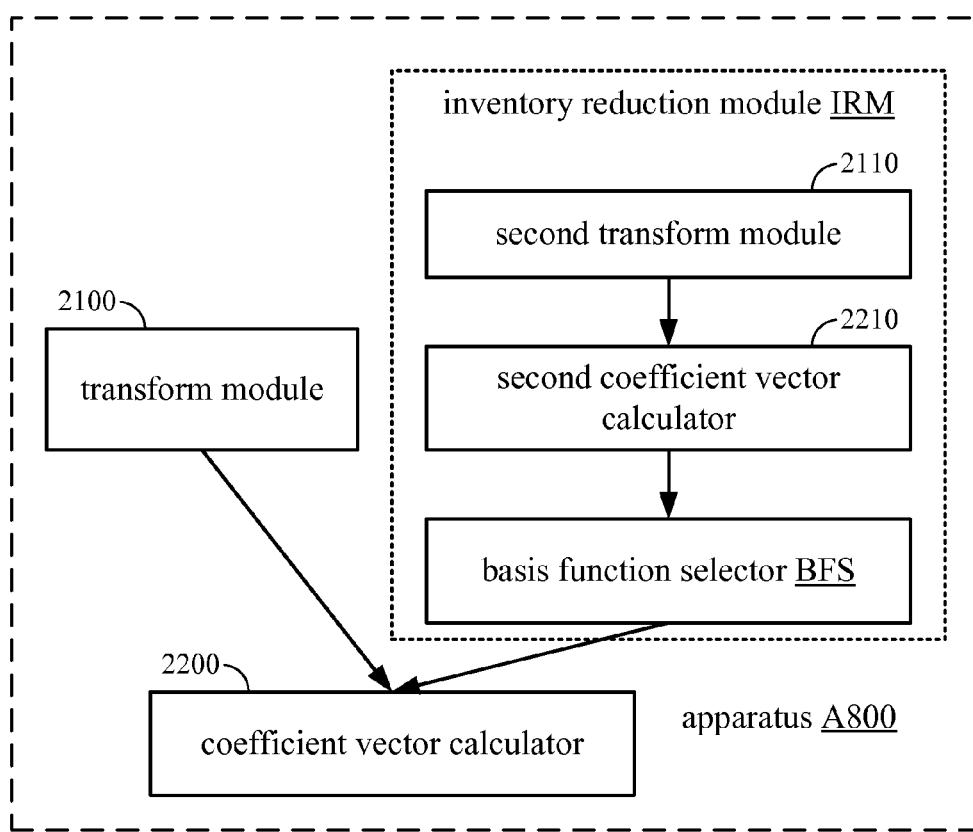
FIG. 31 shows a block diagram of an implementation A800 of apparatus A100.

FIG. 31 shows a block diagram of an implementation A800 of apparatus A100 that includes an inventory reduction module (IRM) configured to select the plurality of basis functions from a larger set of basis functions (e.g., from an inventory). Module IRM includes a second transform module 2110 configured to calculate a signal representation for a segment in a nonlinear frequency domain (e.g., according to a constant-Q transform). Module IRM also includes a second coefficient vector calculator 2210 configured to calculate a second vector of activation coefficients, based on the calculated signal representation in the nonlinear frequency domain and on a second plurality of basis functions as described herein. Module IRM also includes a basis function selector that is configured to select the plurality of basis functions from among an inventory of basis functions, based on information from the second activation coefficient vector as described herein.

It may be desirable for method M100 to include onset detection (e.g., detecting the onset of a musical note) and post-processing to refine harmonic instrument sparse coefficients. The activation coefficient vector f may be considered to include a corresponding subvector $f_n$ for each instrument n that includes the activation coefficients for the instrument-specific basis function set $B_n$, and these subvectors may be processed independently.

A general onset detection method may be based on spectral magnitude (e.g., energy difference). For example, such a method may include finding peaks based on spectral energy and/or peak slope.

It may be desirable also to detect an onset of each individual instrument. For example, a method of onset detection among harmonic instruments may be based on corresponding coefficient difference in time. In one such example, onset detection of a harmonic instrument n is triggered if the index of the highest-magnitude element of the coefficient vector for instrument n(subvector $f_n$) for the current frame is not equal to the index of the highest-magnitude element of the coefficient vector for instrument n for the previous frame. Such an operation may be iterated for each instrument.

It may be desirable to perform post-processing of the sparse coefficient vector of a harmonic instrument. For example, for harmonic instruments it may be desirable to keep a coefficient of the corresponding subvector that has a high magnitude and/or an attack profile that meets a specified criterion (e.g., is sufficiently sharp), and/or to remove (e.g., to zero out) residual coefficients.

For each harmonic instrument, it may be desirable to post-process the coefficient vector at each onset frame (e.g., when onset detection is indicated) such that the coefficient that has the dominant magnitude and an acceptable attack time is kept and residual coefficients are zeroed. The attack time may be evaluated according to a criterion such as average magnitude over time. In one such example, each coefficient for the instrument for the current frame t is zeroed out (i.e., the attack time is not acceptable) if the current average value of the coefficient is less than a past average value of the coefficient (e.g., if the sum of the values of the coefficient over a current window, such as from frame (t−5) to frame (t+4)) is less than the sum of the values of the coefficient over a past window, such as from frame (t−15) to frame (t−6)). Such post-processing of the coefficient vector for a harmonic instrument at each onset frame may also include keeping the coefficient with the largest magnitude and zeroing out the other coefficients. For each harmonic instrument at each non-onset frame, it may be desirable to post-process the coefficient vector to keep only the coefficient whose value in the previous frame was nonzero, and to zero out the other coefficients of the vector.

As mentioned above, an EM algorithm may be used to generate an initial basis function matrix and/or to update the basis function matrix (e.g., based on the activation coefficient vectors). An example of update rules for an EM approach is now described. Given a spectrogram $V_{ft}$, we wish to estimate spectral basis vectors P(f|z) and weight vectors $P_t(z)$ for each time frame. These distributions give us a matrix decomposition.

The EM algorithm is applied as follows: First, randomly initialize weight vectors $P_t(z)$ and spectral basis vectors P(f|z). Then iterate between the following steps until convergence: 1) Expectation (E) step—estimate the posterior distribution $P_t(z|f)$, given the spectral basis vectors P(f|z) and the weight vectors $P_t(z)$. This estimation may be expressed as follows:

$$P_t(z|f) = \frac{P_t(f|z)P(z)}{\sum_s P_t(f|z)P(z)}.$$

2) Maximization (M) step—estimate the weight vectors $P_t(z)$ and the spectral basis vectors $P(f|z)$, given the posterior distribution $P_t(z|f)$. Estimation of the weight vectors may be expressed as follows:

$$P_t(z) = \frac{\sum_f V_{ft} P_t(z|f)}{\sum_s \sum_f V_{ft} P_t(z|f)}.$$

Estimation of the spectral basis vector may be expressed as follows:

$$P(f|z) = \frac{\sum_f V_{ft} P_t(z|f)}{\sum_t \sum_f V_{ft} P_t(z|f)}.$$

The systems and methods disclosed herein can be included in any suitable audio visual system, including a computer, gaming console, or handheld device such as a cellular phone, personal digital assistant (PDA), smart phone, or the like. The predominant functions of the components described herein are generally implemented in the digital processing domain. However, these components may be alternatively implemented in the analog domain using suitable analog components, or any suitable combination of analog and digital electronic components.

It may be desirable to implement the systems and methods as described herein within a portable audio-visual sensing device that has an array of two or more microphones configured to receive acoustic signals and one or more cameras. Examples of a portable audio sensing device that may be implemented to include such an array and may be used for audio recording and/or voice communications applications include a telephone handset (e.g., a cellular telephone handset); a handheld audio and/or video recorder; a personal digital assistant (PDA) or other handheld computing device; and a notebook computer, laptop computer, netbook computer, tablet computer, or other portable computing device. The class of portable computing devices currently includes devices having names such as laptop computers, notebook computers, netbook computers, ultra-portable computers, tablet computers, mobile Internet devices, smartbooks, and smartphones. Such a device may have a top panel that includes a display screen and a bottom panel that may include a keyboard, wherein the two panels may be connected in a clamshell or other hinged relationship. Such a device may be similarly implemented as a tablet computer that includes a touchscreen display on a top surface. Other examples of audio sensing devices that may be constructed to perform such a method and may be used for audio recording and/or voice communications applications include television displays, set-top boxes, and audio- and/or video-conferencing devices.

The systems and methods disclosed herein may be implemented to process audio-visual information in real-time, as well as process previously recorded audio-visual information.

The functionality of the systems, apparatuses, devices and their respective components, as well as the method steps and modules described herein may be implemented in hardware, software/firmware executed by hardware, or any suitable combination thereof. The software/firmware may be a program having sets of instructions (e.g., programming code segments) executable by one or more digital circuits, such as microprocessors, DSPs, embedded controllers, or intellectual property (IP) cores. If implemented in software/firmware, the functions may be stored as instructions or code on one or more computer-readable media. The computer-readable media may include computer storage media. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Certain examples of audio-visual scene analysis system and methods have been disclosed. These systems and methods are examples, and the possible integrations are not limited to what is described herein. Moreover, various modifications to these examples are possible, and the principles presented herein may be applied to other systems as well. For example, the principles disclosed herein may be applied to devices such as personal computers, entertainment counsels, video games and the like. In addition, the various components and/or method steps/blocks may be implemented in arrangements other than those specifically disclosed without departing from the scope of the claims.

Accordingly, other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A method performed by a device, the method comprising:
computing a plurality of acoustic-recognition features from audio recorded at a scene;
comparing the acoustic-recognition features to predetermined acoustic-recognition features corresponding to one or more objects to determine a sound source type of an object;
selecting keypoints corresponding to the object based on the sound source type;
and
identifying the object based on the selected keypoints and the sound source type.

2. The method of claim 1, further comprising:
selecting one or more keypoint signatures corresponding to one or more objects, based on audio recorded at the scene;
identifying a plurality of keypoints in an image of the scene; and
comparing the keypoints to the keypoint signatures to identify the object.

3. The method of claim 1, further comprising:
selecting a portion of a scene image based on the audio recorded at the scene; and selecting the keypoints only from within the portion of the image.

4. The method of claim 3, wherein selecting a portion of the image based on the audio recorded at the scene includes:
   determining an audio direction of arrival (DOA) from the audio; and
   selecting the portion of the image based on the audio DOA.

5. The method of claim 4, wherein determining the audio DOA includes:
   receiving the audio at a plurality of microphones located at the scene, whereby producing a plurality of microphone signals; and
   determining the audio DOA based on the microphone signals.

6. The method of claim 1, further comprising:
   computing a plurality of local motion vectors from a video recording of the scene; and
   identifying the object by comparing the local motion vectors to a database of predetermined local motion vectors corresponding to one or more objects and by comparing the keypoints to one or more keypoint signatures.

7. The method of claim 1,
   wherein identifying the object is based on comparing the keypoints to one or more keypoint signatures.

8. The method of claim 7, wherein the acoustic-recognition features include mel-frequency cepstral coefficients.

9. The method of claim 1, further comprising:
   determining range information for one or more objects appearing in an image; and
   analyzing the keypoints based on the range information.

10. The method of claim 9, wherein determining range information is selected from the group consisting of determining range information using an auto-focus camera, determining range information using a multi-camera image disparity estimation and any combination of the foregoing.

11. An apparatus, comprising:
   an audio processor configured to compute a plurality of acoustic-recognition features from audio recorded at a scene;
   a keypoint selector configured to select keypoints corresponding to an object based on a sound source type; and
   a matching device configured to identify the object based on the selected keypoints and comparing the acoustic-recognition features to predetermined acoustic-recognition features corresponding to one or more objects to determine the sound source type of the object.

12. The apparatus of claim 11, further comprising:
   a keypoint detector configured to identify a plurality of keypoints in an image of a scene;
   wherein the keypoint selector is configured to select one or more keypoint signatures corresponding to one or more objects, based on audio recorded at the scene; and
   wherein the matching device is configured to compare the keypoints to the keypoint signatures to identify an object in the scene.

13. The apparatus of claim 11, further comprising:
   a first selector configured to select a portion of an image of the scene based on the audio recorded at the scene; and
   a second selector configured to select the keypoints only from within the portion of the image.

14. The apparatus of claim 13, wherein the first selector includes:
   a detector configured to determine an audio direction of arrival (DOA) from the audio; and
   a third selector configured to select the portion of the image based on the audio DOA.

15. The apparatus of claim 14, wherein the detector includes:
   a plurality of microphones located at the scene for receiving the audio, producing a plurality of microphone signals; and
   an audio processor configured to determine the audio DOA based on the microphone signals.

16. The apparatus of claim 11, further comprising:
   a video processor configured to compute a plurality of local motion vectors from a video recording of the scene;
   wherein the matching device is configured to identify the object by comparing the local motion vectors to a database of predetermined local motion vectors corresponding to one or more objects and by comparing the keypoints to one or more keypoint signatures.

17. The apparatus of claim 11,
   wherein the matching device is configured to identify the object by comparing the keypoints to one or more keypoint signatures.

18. The apparatus of claim 17, wherein the acoustic-recognition features include mel-frequency cepstral coefficients.

19. The apparatus of claim 11, further comprising:
   a range detector configured to determine range information for one or more objects appearing in an image; and
   a keypoint detector configured to analyze the keypoints based on the range information.

20. The apparatus of claim 19, wherein the range detector includes a detector selected from the group consisting of an auto-focus camera, a multi-camera array and any combination of the foregoing.

21. An apparatus, comprising:
   means for computing a plurality of acoustic-recognition features from audio recorded at a scene;
   means for comparing the acoustic-recognition features to predetermined acoustic-recognition features corresponding to one or more objects to determine a sound source type of an object;
   means for selecting keypoints corresponding to the object based on the sound source type; and
   means for identifying the object based on the selected keypoints and the sound source type.

22. The apparatus of claim 21, further comprising:
   means for selecting one or more keypoint signatures corresponding to one or more objects, based on audio recorded at the scene;
   means for identifying a plurality of keypoints in an image of the scene; and
   means for comparing the keypoints to the keypoint signatures to identify the object in the scene.

23. The apparatus of claim 21, further comprising:
   means for selecting a portion of an image of the scene based on the audio recorded at the scene; and
   means for selecting the keypoints only from within the portion of the image.

24. The apparatus of claim 23, wherein the means for selecting a portion of the image based on the audio recorded at the scene includes:
   means for determining an audio direction of arrival (DOA) from the audio; and
   means for selecting the portion of the image based on the audio DOA.

25. The apparatus of claim 24, wherein means for determining the audio DOA includes:
means for receiving the audio at a plurality of microphones located at the scene, whereby producing a plurality of microphone signals; and
means for determining the audio DOA based on the microphone signals.

26. The apparatus of claim 21, further comprising:
means for computing a plurality of local motion vectors from a video recording of the scene; and
means for identifying the object by comparing the local motion vectors to a database of predetermined local motion vectors corresponding to one or more objects and by comparing the keypoints to one or more keypoint signatures.

27. The apparatus of claim 21, further comprising
means for comparing the keypoints to one or more keypoint signatures.

28. The apparatus of claim 27, wherein the acoustic-recognition features include mel-frequency cepstral coefficients.

29. The apparatus of claim 21, further comprising:
means for determining range information for one or more objects appearing in an image; and
means for analyzing the keypoints based on the range information.

30. The apparatus of claim 29, wherein means for determining range information is selected from the group consisting of means for determining range information using an auto-focus camera, means for determining range information using a multi-camera image disparity estimation and any combination of the foregoing.

31. A non-transitory tangible computer-readable medium embodying a set of instructions executable by one or more processors, comprising:
code for computing a plurality of acoustic-recognition features from audio recorded at a scene;
code for comparing the acoustic-recognition features to predetermined acoustic-recognition features corresponding to one or more objects to determine a sound source type of an object;
code for selecting keypoints corresponding to the object based on the sound source type; and
code for identifying the object based on the selected keypoints and the sound source type.

32. The computer-readable medium of claim 31, further comprising:
code for selecting one or more keypoint signatures corresponding to one or more objects, based on audio recorded at the scene;
code for identifying a plurality of keypoints in an image of the scene; and
code for comparing the keypoints to the keypoint signatures to identify the object in the scene.

33. The computer-readable medium of claim 31, further comprising:
code for selecting a portion of an image based on the audio recorded at the scene; and
code for selecting the keypoints only from within the portion of the image.

34. The computer-readable medium of claim 33, wherein the code for selecting a portion of the image based on the audio recorded at the scene includes:
code for determining an audio direction of arrival (DOA) from the audio; and
code for selecting the portion of the image based on the audio DOA.

35. The computer-readable medium of claim 34, wherein code for determining the audio DOA includes:
code for receiving the audio at a plurality of microphones located at the scene, whereby producing a plurality of microphone signals; and
code for determining the audio DOA based on the microphone signals.

36. The computer-readable medium of claim 31, further comprising:
code for computing a plurality of local motion vectors from a video recording of the scene; and
code for identifying the object by comparing the local motion vectors to a database of predetermined local motion vectors corresponding to one or more objects and by comparing the keypoints to one or more keypoint signatures.

37. The computer-readable medium of claim 31, further comprising
code for comparing the keypoints to one or more keypoint signatures.

38. The computer-readable medium of claim 37, wherein the acoustic-recognition features include mel-frequency cepstral coefficients.

39. The computer-readable medium of claim 31, further comprising:
code for determining range information for one or more objects appearing in an image; and
code for analyzing the keypoints based on the range information.

40. The computer-readable medium of claim 39, wherein code for determining range information is selected from the group consisting of code for determining range information using an auto-focus camera, code for determining range information using a multi-camera image disparity estimation and any combination of the foregoing.

* * * * *